(12) United States Patent
Adjakple et al.

(10) Patent No.: US 12,137,490 B2
(45) Date of Patent: Nov. 5, 2024

(54) APPARATUS, SYSTEM, METHOD, AND COMPUTER-READABLE MEDIUM FOR CONNECTION-ORIENTED VEHICLE-TO-X (VTX) COMMUNICATION IN 5G

(71) Applicant: InterDigital Patent Holdings, Inc., Wilmington, DE (US)

(72) Inventors: Pascal Adjakple, Great Neck, NY (US); Qing Li, Princeton Junction, NJ (US); Joseph Murray, Schwenksville, PA (US); Rocco Di Girolamo, Laval (CA); Zhuo Chen, Claymont, DE (US); Lakshmi Iyer, King of Prussia, PA (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 87 days.

(21) Appl. No.: 17/429,837

(22) PCT Filed: Feb. 13, 2020

(86) PCT No.: PCT/US2020/018114
§ 371 (c)(1),
(2) Date: Aug. 10, 2021

(87) PCT Pub. No.: WO2020/168080
PCT Pub. Date: Aug. 20, 2020

(65) Prior Publication Data
US 2022/0132603 A1 Apr. 28, 2022

Related U.S. Application Data

(60) Provisional application No. 62/805,121, filed on Feb. 13, 2019, provisional application No. 62/841,579, filed on May 1, 2019.

(51) Int. Cl.
*H04W 76/14* (2018.01)
*H04W 4/40* (2018.01)
*H04W 8/00* (2009.01)

(52) U.S. Cl.
CPC ............. *H04W 76/14* (2018.02); *H04W 4/40* (2018.02); *H04W 8/005* (2013.01)

(58) Field of Classification Search
CPC ....... H04W 76/14; H04W 4/40; H04W 8/005; H04W 4/46; H04W 28/24; H04W 92/18;
(Continued)

(56) References Cited

U.S. PATENT DOCUMENTS 9,560,686 B2 * 1/2017 Cho .................. H04W 52/0219
9,699,154 B2 7/2017 Stojanovski et al.
(Continued)

FOREIGN PATENT DOCUMENTS

CN 107005841 A 8/2017
CN 107615844 A 1/2018
(Continued)

OTHER PUBLICATIONS

3rd Generation Partnership Project, "CR to 38.331 on pendingRnaUpdate setting", Ericsson, R2-1817981 (Revision of R2-1815578), 3GPP TSG-RAN WG2#104, Nov. 2018, 6 pages.
(Continued)

*Primary Examiner* — Andrew Wendell
(74) *Attorney, Agent, or Firm* — Flaster Greenberg P.C.

(57) ABSTRACT

A first apparatus including: a processor; a memory; and communication circuitry. The first apparatus is connected to a communications network via the communication circuitry. The first apparatus further includes computer-executable instructions stored in the memory which, when executed by the processor, causes the first apparatus to: discover a second apparatus that the first apparatus can communicate with;
(Continued)

obtain device information related to the second apparatus; and configure a radio protocol of the first apparatus for direct sidelink communication with the second apparatus.

20 Claims, 48 Drawing Sheets

(58) Field of Classification Search
CPC ......... H04W 28/0263; H04W 28/0257; H04W 28/0268
See application file for complete search history.

(56) References Cited

U.S. PATENT DOCUMENTS

| | | | |
|---|---|---|---|
| 11,357,064 B2* | 6/2022 | Pan | H04W 72/542 |
| 2017/0150490 A1 | 5/2017 | Ou et al. | |
| 2017/0215119 A1* | 7/2017 | Hong | H04L 67/12 |
| 2017/0280406 A1* | 9/2017 | Sheng | H04W 4/40 |
| 2017/0280493 A1 | 9/2017 | Aminaka | |
| 2018/0139724 A1 | 5/2018 | Loehr et al. | |
| 2018/0192457 A1* | 7/2018 | Yi | H04L 5/0053 |
| 2018/0242190 A1* | 8/2018 | Khoryaev | H04W 28/0284 |
| 2018/0255499 A1 | 9/2018 | Loehr et al. | |
| 2019/0097936 A1* | 3/2019 | Yang | H04W 12/033 |
| 2019/0124015 A1 | 4/2019 | Loehr et al. | |
| 2019/0124489 A1* | 4/2019 | Ahmad | H04W 4/70 |
| 2019/0230572 A1* | 7/2019 | Cheng | H04W 40/12 |
| 2019/0373618 A1* | 12/2019 | Medina | H04L 5/0037 |
| 2019/0373652 A1* | 12/2019 | Hong | H04W 76/14 |
| 2020/0106588 A1* | 4/2020 | Gulati | H04L 5/0062 |
| 2020/0107236 A1* | 4/2020 | Tseng | H04W 4/40 |
| 2020/0178048 A1* | 6/2020 | Kim | H04W 12/062 |
| 2020/0296619 A1* | 9/2020 | Pan | H04W 76/14 |
| 2020/0314613 A1* | 10/2020 | Lee | H04W 4/70 |
| 2020/0374745 A1* | 11/2020 | Sayenko | H04W 28/0284 |
| 2021/0076250 A1* | 3/2021 | Wang | H04W 28/0221 |
| 2021/0084542 A1* | 3/2021 | Ahmad | H04W 28/24 |
| 2021/0144727 A1* | 5/2021 | Pan | H04W 4/40 |
| 2021/0329487 A1* | 10/2021 | Wang | H04W 28/24 |
| 2022/0014901 A1* | 1/2022 | Li | H04W 4/70 |
| 2022/0150730 A1* | 5/2022 | Freda | H04L 1/188 |
| 2022/0159751 A1* | 5/2022 | Bangolae | H04W 76/14 |
| 2022/0217575 A1* | 7/2022 | Wang | H04W 76/14 |

FOREIGN PATENT DOCUMENTS

| | | |
|---|---|---|
| CN | 109314841 A | 2/2019 |
| CN | 110831075 A | 2/2020 |
| EP | 3220715 A1 | 9/2017 |
| WO | 2013/162166 A1 | 10/2013 |
| WO | WO 2016/075848 A1 | 5/2016 |

OTHER PUBLICATIONS

3rd Generation Partnership Project, "NR V2X sidelink protocol stack overview", Ericsson, TDoc R2-1817961, 3GPP TSG-RAN WG2 #104, Nov. 2018, 4 pages.

3rd Generation Partnership Project, "Technical Specification Group Services and System Aspects; Study on enhancement of 3GPP Support for 5G V2X Services (Release 15)", 3GPP TR 22.886 V15.1.0, Mar. 2017, 58 pages.

3rd Generation Partnership Project, "Technical Specification Group Services and System Aspects; Enhancement of 3GPP support for V2X scenarios; Stage 1 (Release 16)", 3GPP TS 22.186 V16.0.0, Sep. 2018, 16 pages.

$3^{rd}$ Generation Partnership Project, "Discussion on Connection-based versus Connectionless NR Sidelink", Nokia, Nokia Shanghai Bell, R2-1817681, 3GPP TSG-RAN WG2 Meeting #104, Spokane, USA, Nov. 12-16, 2018, 4 pages.

* cited by examiner

APPARATUS, SYSTEM, METHOD, AND COMPUTER-READABLE MEDIUM FOR CONNECTION-ORIENTED VEHICLE-TO-X (VTX) COMMUNICATION IN 5G

CROSS-REFERENCE TO RELATED APPLICATIONS

This application is the National Stage Application of International Patent Application No. PCT/US2020/018114, filed Feb. 13, 2020 which claims the benefit of U.S. Provisional Application No. 62/805,121, filed on Feb. 13, 2019, and U.S. Provisional Application No. 62/841,579, filed on May 1, 2019, the entire contents of which are incorporated by reference herein.

FIELD

The present disclosure relates generally to wireless communications, and more particularly to wireless communications systems, devices, methods, and computer readable medium for performing vehicle-to-x communications.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Existing vehicle-to-x systems and methods are connectionless, and do not support the higher data rates, higher reliability, and lower latency requirements that are needed in a 5G system. Further, in existing systems, connectionless transmission results in several drawbacks, such as, higher protocol overhead, higher processing overhead, and it is hard to enable physical layer feedback.

SUMMARY

An exemplary embodiment of the present disclosure provides a first apparatus including: a processor; a memory; and communication circuitry. The first apparatus is connected to a communications network via the communication circuitry. The first apparatus further includes computer-executable instructions stored in the memory which, when executed by the processor, causes the first apparatus to: discover a second apparatus that the first apparatus can communicate with; obtain device information related to the second apparatus; and configure a radio protocol of the first apparatus for direct sidelink communication with the second apparatus.

An exemplary embodiment of the present disclosure provides a method for direct sidelink communication using a first apparatus that includes a processor, a memory, communication circuitry, and the first apparatus is connected to a communications network via the communication circuitry. The method includes: discovering a second apparatus that the first apparatus can communicate with; obtaining device information related to the second apparatus; and configuring a radio protocol of the first apparatus for direct sidelink communication with the second apparatus.

An exemplary embodiment of the present disclosure provides a non-transitory computer readable storage medium having computer-readable instructions tangibly recorded thereon which, when executed by processing circuitry, cause the processing circuitry to perform a method for direct sideling communication using a first apparatus. The method including: discovering a second apparatus that the first apparatus can communicate with; obtaining device information related to the second apparatus; and configuring a radio protocol of the first apparatus for direct sidelink communication with the second apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
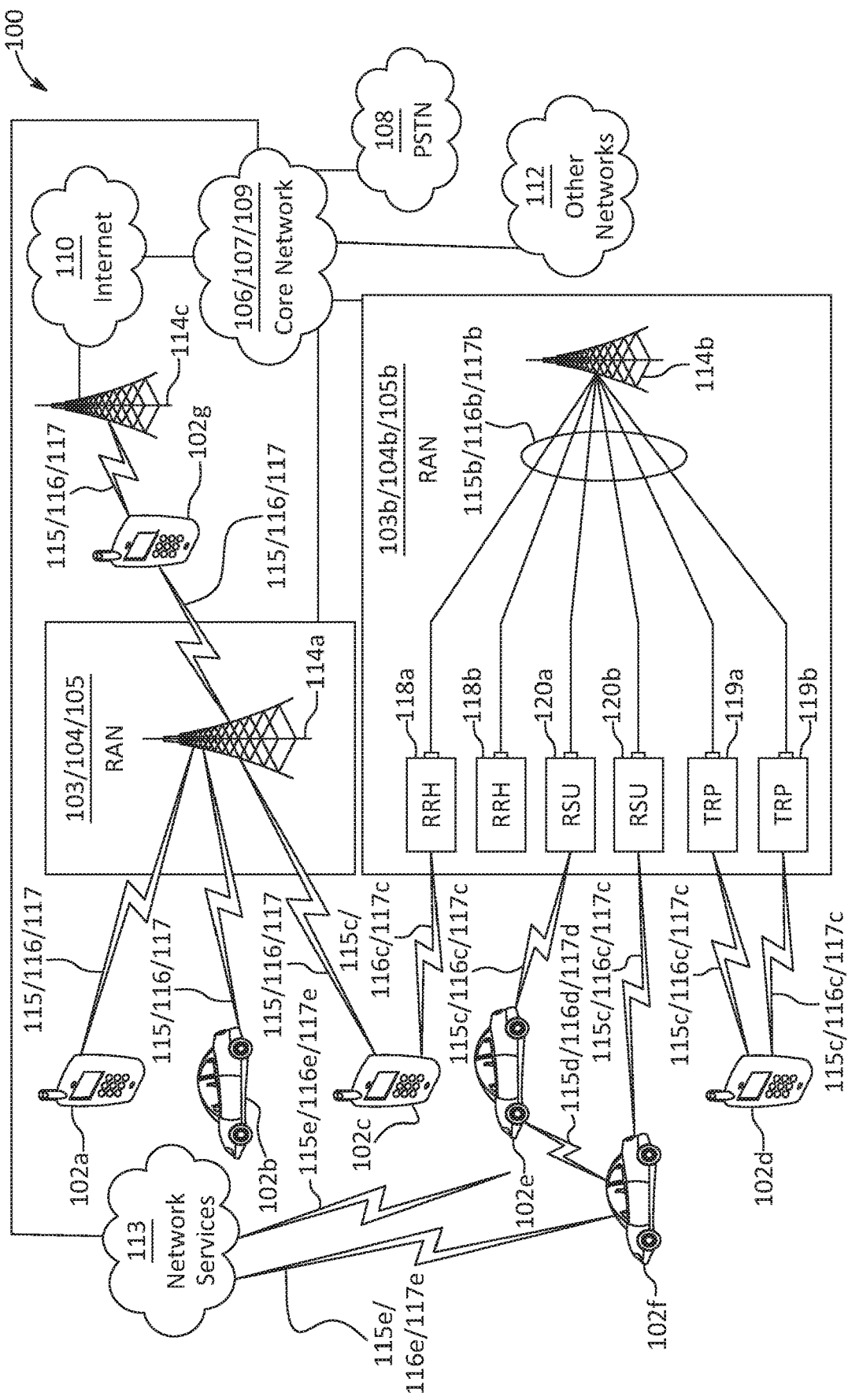
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which can include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

ABBREVIATIONS

3GPP—$3^{rd}$ Generation Partnership Project
5G—5th Generation
5QI—5G QoS identifier
ACK—ACKnowledgement
AM—Acknowledged Mode
AMF—Access and Mobility Function
APP—APPlication
AS—Access Stratum
BWP—Bandwidth Part
BSD—Bucket Size Duration
BSR—Buffer Status Report
CBR—Channel Busy Ratio
Config—Configuration
CSR—Channel State Report
CR—Channel occupancy Ratio
D2D—Device to Device Communication DCI—Downlink Control Information
eNB—Evolved Node B
eV2X—Enhanced Vehicle-to-X Communication
E-UTRA—Evolved UMTS Terrestrial Radio Access
E-UTRAN—Evolved UMTS Terrestrial Radio Access Network
eNB—evolved NodeB
gNB—NR NodeB
GBR—Guarantee Bit Rate
GSM—Global System for Mobile communication
HARQ—Hybrid Automatic Repeat Request
IAB—Integrated Access Backhaul
ID—Identity or Identifier
Info—Information
IP—Internet Protocol
ITS—Intelligent Transport System
ITS-AID—ITS Application Identifier
I-UE—Initiating UE
L2—Layer-2
LBT—Listen Before Talk
LCH—Logical Channel
LCID—Logical Channel Identity
LCG—Logical Channel Group
LTE—Long Term Evolution
MAC—Medium Access Control
MCH—Multicast transport Channel
ME—Mobile Equipment
MTCH—Multicast Traffic Channel
MSB—Most Significant Bit
NAS—Non AS
NB—NodeB
NR—New Radio
PBR—Prioritized Bite Rate
PC3—The reference point between the UE and the ProSe Function
PC5—The reference point between ProSe-enabled UEs used for control and user plane for ProSe Direct Discovery, ProSe Direct Communication and ProSe UE-to-Network Relay
PDCP—Packet Data Convergence Protocol
PDU—Protocol Data Unit
PHY—PHYsical layer
PLMN—Public Land Mobile Network
PPPP—ProSe Per Packet Priority
PPPR—ProSe Per Packet Reliability
ProSe—Proximity-Based Services
PSDCH Physical Sidelink Discovery Channel
PSSCH—Physical Sidelink Shared Channel
PSID—Provider Service Identifier
QAM—Quadrature Amplitude Modulation
QFI—QoS Flow Identifier
QoS—Quality of Service
SA1—System Architecture Working Group 1
SAP—Service Access Point
SBCCH—Sidelink Broadcast Channel
SCI—Sidelink Control Information
SCS—SubCarrier Spacing
SDAP—Service Data Adaptation Protocol
SDU—Service Data Unit
SIM—Subscriber Identity Module
SL—Sidelink
SL-BCH—SL Broadcast Channel
SL-DCH—SL Discovery Channel
SL-MCH—SL MCH
SL-MTCH—SL MTCH
SR—Scheduling Request
SRB—Signaling Radio Bearer
RAN—Radio Access Network
RAT—Radio Access Technology
RLC—Radio Link Control
RNTI—Radio Network Temporary Identifier
ROHC—RObust Header Compression
RRC—Radio Resource Control
RSRP—Reference Signal Received Power
RSRQ—Reference Signal Received Quality
RSSI—Received Signal Strength Indicator
RSU—Road Side Unit
RX—Receiver or Receiving
SAP—Service Access Point
SBCCH—Sidelink Broadcast Control Channel
SCCH—Sidelink Control Channel
SL-SCH—Sidelink Shared Channel
TM—Transparent Mode
T-UE—Target UE
TX—Transmitter or Transmitting
UDC—Header Data Compression
UE—User Equipment
UL—Uplink
UM—Unacknowledged Mode
UMTS—Universal Mobile Telecommunications System
UpL—Upper Layer
USIM—Universal Subscriber Identify Module
Uu—Uu Interface connecting UE to RAN
V2V—Vehicle-to-Vehicle Communication
V2X—Vehicle-to-X Communication
VQI—V2X QoS Identifier
WG2—Working Group 2
WiFi—WLAN radio wireless technology, used interchangeably with WLAN in this document.
WLAN—Wireless Local Area Network The following features/procedures/functions will be discussed in this disclosure:

NR V2X Sidelink L2 Structure.

V2 Connection Configuration procedures including connection V2X upper connection configuration, V2X AS connection configuration, V2X AS support for V2X upper layer connection, covering unicast, groupcast and broadcast transmission mode.

Providing for V2X transmitter side and Receiver side.

V2X RAT and Interface Selection.

V2X Communication Mode Selection.

Specifically, the following concepts and topics will be discussed:

1. Layer 2 protocol structure;
2. Provisioning of V2X transmitter and Receiver;
3. Triggers for V2X Transmission or V2X reception;
4. Transmitter side and Receiver Side RAT and Interface selection, who does it and based on what criteria;
5. Transmitter side and Receiver side Transmission mode selection and criteria for the selection;
6. Unicast Connection Management detail procedures including description of assistance parameters from the UE (e.g., receiver capability), and unicast configuration parameters configured into the UE by the scheduling entity or an assisting UE in coordination with the scheduling entity;
7. Different alternatives for connection management;
8. Group Connection Configuration and idea of V2X upper layer group mapping to AS layer subgroups, maintenance in AS of mapping table and indication by AS to PHY. Broadcast configuration and various options for broadcast configuration signaling.

9. Methods for UE handling of multiple simultaneous sidelink RRC connections.
10. Modeling of PC5 Unicast Link granularity, Unicast Link Update and Unicast Link Addition Procedures.

Example Communication System and Networks

FIG. 1A illustrates one embodiment of an example communications system 100 in which the methods and apparatuses described and claimed herein may be embodied. As shown, the example communications system 100 can include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g can be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for wireless communications, each WTRU can comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 can also include a base station 114a and a base station 114b. Base stations 114a can be any type of device configured to wirelessly interface with at least one of the WTRUs 102a, 102b, 102c to facilitate access to one or more communication networks, such as the core network 106/107/109, the Internet 110, Network Services 113, and/or the other networks 112. Examples of Network Services can include V2X Services, ProSe Services, IoT Services, Video Streaming, Edge Computing, etc. Base stations 114b can be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, other networks 112, and/or Network Services 113. RRHs 118a, 118b can be any type of device configured to wirelessly interface with at least one of the WTRU 102c, to facilitate access to one or more communication networks, such as the core network 106/107/109, the Internet 110, Network Services 113, and/or other networks 112. TRPs 119a, 119b can be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b can be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b can be a base transceiver station (BTS), a Node-B, an eNode B, a Home Node B, a Home eNode B, a next generation node-B (gNode B), a satellite, a site controller, an access point (AP), a wireless router, and the like. While the base stations 114a, 114b are each depicted as a single element, it will be appreciated that the base stations 114a, 114b can include any number of interconnected base stations and/or network elements.

The base station 114a can be part of the RAN 103/104/105, which can also include other base stations and/or network elements (not shown), such as a base station controller (BSC), a radio network controller (RNC), relay nodes, etc. The base station 114b can be part of the RAN 103b/104b/105b, which can also include other base stations and/or network elements (not shown), such as a base station controller (BSC), a radio network controller (RNC), relay nodes, etc. The base station 114a can be configured to transmit and/or receive wireless signals within a particular geographic region, which can be referred to as a cell (not shown). The base station 114b can be configured to transmit and/or receive wired and/or wireless signals within a particular geographic region, which can be referred to as a cell (not shown). The cell can further be divided into cell sectors. For example, the cell associated with the base station 114a can be divided into three sectors. Thus, in an embodiment, the base station 114a can include three transceivers, e.g., one for each sector of the cell. In an embodiment, the base station 114a can employ multiple-input multiple output (MIMO) technology and, therefore, can utilize multiple transceivers for each sector of the cell.

The base stations 114a can communicate with one or more of the WTRUs 102a, 102b, 102c over an air interface 115/116/117, which can be any suitable wireless communication link (e.g., radio frequency (RF), microwave, infrared (IR), ultraviolet (UV), visible light, cmWave, mmWave, etc.). The air interface 115/116/117 can be established using any suitable radio access technology (RAT).

The base stations 114b can communicate with one or more of the RRHs 118a, 118b, TRPs 119a, 119b, and/or RSUs 120a and 120b, over a wired or air interface 115b/116b/117b, which can be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b can be established using any suitable radio access technology (RAT).

The RRHs 118a, 118b, TRPs 119a, 119b and/or RSUs 120a, 120b, can communicate with one or more of the WTRUs 102c, 102d, 102e, 102f over an air interface 115c/116c/117c, which can be any suitable wireless communication link (e.g., radio frequency (RF), microwave, infrared (IR), ultraviolet (UV), visible light, cmWave, mmWave, etc.). The air interface 115c/116c/117c can be established using any suitable radio access technology (RAT).

The WTRUs 102a, 102b, 102c, 102d, 102e, 102f, and/or 102g can communicate with one another over a direct air interface 115d/116d/117d, such as Vehicle-to-Vehicle (V2V) sidelink communication, and WTRUs 102a, 102b, 102c, 102d, 102e, 102f, and/or 102g can communicate with Network Service 113 over a direct air interface 115e/116e/117e, such as Vehicle-to-Infrastructure (V2I) sidelink communication, (not shown in the figures), which can be any suitable wireless communication link (e.g., radio frequency (RF), microwave, infrared (IR), ultraviolet (UV), visible light, cmWave, mmWave, etc.). The air interface 115d/116d/117d can be established using any suitable radio access technology (RAT).

More specifically, as noted above, the communications system 100 can be a multiple access system and can employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f, can implement a radio technology such as Universal Mobile Telecommunications System (UMTS) Terrestrial Radio Access (UTRA), which can establish the air interface 115/116/117 or 115c/116c/117c respectively using wideband CDMA (WCDMA). WCDMA can include communication protocols such as High-Speed Packet Access (HSPA) and/or Evolved HSPA (HSPA+). HSPA can include High-Speed Downlink Packet Access (HSDPA) and/or High-Speed Uplink Packet Access (HSUPA).

In an embodiment, the base station 114a in the RAN 103/104/105 and the WTRUs 102a, 102b, 102c, or RRHs 118a, 118b, TRPs 119a, 119b, and/or RSUs 120a, 120b in the RAN 103b/104b/105b and the WTRUs 102c, 102d, can implement a radio technology such as Evolved UMTS Terrestrial Radio Access (E-UTRA), which can establish the air interface 115/116/117 or 115c/116c/117c respectively using Long Term Evolution (LTE) and/or LTE-Advanced (LTE-A). The air interface 115/116/117 or 115c/116c/117c can implement 3GPP NR technology. The LTE and LTE-A technology includes LTE D2D and V2X technologies and interface (such as Sidelink communications, etc.). The 3GPP NR technology includes NR V2X technologies and interface (such as Sidelink communications, etc.).

In an embodiment, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f can implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A can be a wireless router, Home Node B, Home eNode B, or access point, for example, and can utilize any suitable RAT for facilitating wireless connectivity in a localized area, such as a place of business, a home, a vehicle, a train, an aerial, a satellite, a manufactory, a campus, and the like. In an embodiment, the base station 114c and the WTRUs 102e, can implement a radio technology such as IEEE 802.11 to establish a wireless local area network (WLAN). In an embodiment, the base station 114c and the WTRUs 102d, can implement a radio technology such as IEEE 802.15 to establish a wireless personal area network (WPAN). In yet another embodiment, the base station 114c and the WTRUs 102e, can utilize a cellular-based RAT (e.g., WCDMA, CDMA2000, GSM, LTE, LTE-A, NR, etc.) to establish a picocell or femtocell. As shown in FIG. 1A, the base station 114c can have a direct connection to the Internet 110. Thus, the base station 114c may not be needed to access the Internet 110 via the core network 106/107/109.

The RAN 103/104/105 and/or RAN 103b/104b/105b can be in communication with the core network 106/107/109, which can be any type of network configured to provide voice, data, messaging, authorization and authentication, applications, and/or voice over internet protocol (VoIP) services to one or more of the WTRUs 102a, 102b, 102c, 102d, and 102f. For example, the core network 106/107/109 can provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 can be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which can be utilizing an E-UTRA radio technology, the core network 106/107/109 can also be in communication with another RAN (not shown) employing a GSM or NR radio technology.

The core network 106/107/109 can also serve as a gateway for the WTRUs 102a, 102b, 102c, 102d, 102e, and 102f to access the PSTN 108, the Internet 110, and/or other networks 112. The PSTN 108 can include circuit-switched telephone networks that provide plain old telephone service (POTS). The Internet 110 can include a global system of interconnected computer networks and devices that use common communication protocols, such as the transmission control protocol (TCP), user datagram protocol (UDP) and the internet protocol (IP) in the TCP/IP internet protocol suite. The other networks 112 can include wired or wireless communications networks owned and/or operated by other service providers. For example, the networks 112 can include any type of packet data network (i.e., an IEEE 802.3 ethernet network) or another core network connected to one or more RANs, which can employ the same RAT as the RAN 103/104/105 and/or RAN 103b/104b/105b or a different RAT.

Some or all of the WTRUs 102a, 102b, 102c, 102d, 102e, and 102f in the communications system 100 can include multi-mode capabilities, e.g., the WTRUs 102a, 102b, 102c, 102d, 102e, and 102f can include multiple transceivers for communicating with different wireless networks over different wireless links. For example, the WTRU 102g shown in FIG. 1A can be configured to communicate with the base station 114a, which can employ a cellular-based radio technology, and with the base station 114c, which can employ an IEEE 802 radio technology.

Although not shown in FIG. 1A, it will be appreciated that a User Equipment can make a wired connection to a gateway. The gateway can be a Residential Gateway (RG). The RG can provide connectivity to a Core Network 106/107/109. It will be appreciated that many of the ideas contained herein can equally apply to UEs that are WTRUs and UEs that use a wired connection to connect to a network. For example, the ideas that apply to the wireless interfaces 115, 116, 117 and 115c/116c/117c can equally apply to a wired connection.

Figure 1B:
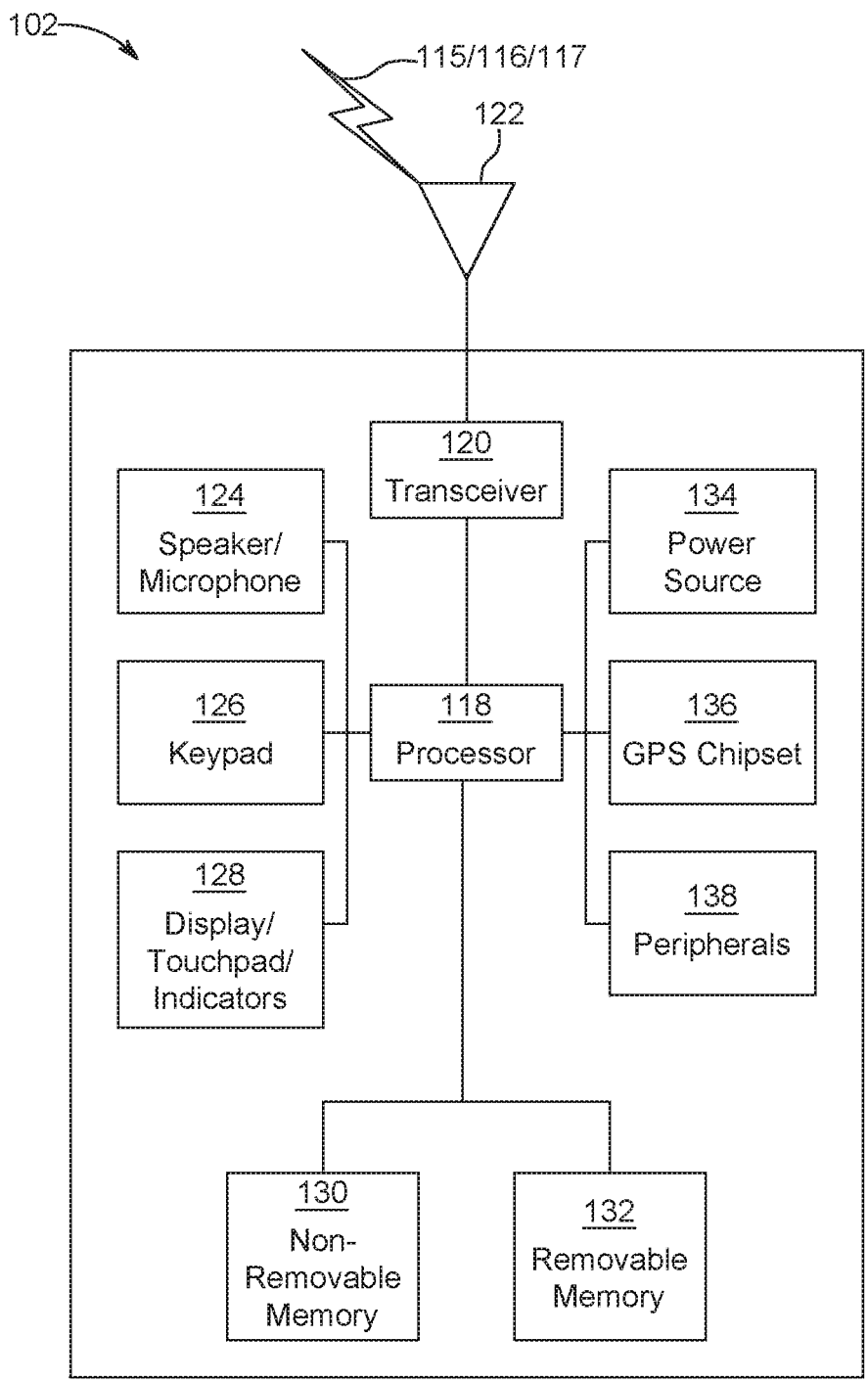
FIG. 1B is a system diagram of an example apparatus or device configured for wireless communications.

FIG. 1B is a block diagram of an example apparatus or device configured for wireless communications in accordance with the embodiments illustrated herein, such as for example, a WTRU 102. As shown in FIG. 1B, the example WTRU 102 can include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 can include any sub-combination of the foregoing elements while remaining consistent with an embodiment. Also, embodiments contemplate that the base stations 114a and 114b, and/or the nodes that base stations 114a and 114b can represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, can include some or all of the elements depicted in FIG. 1B and described herein.

The processor 118 can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 can perform signal coding, data processing, power control, input/output processing, and/or any other functionality that enables the WTRU 102 to operate in a wireless environment. The processor 118 can be coupled to the transceiver 120, which can be coupled to the transmit/receive element 122. While FIG. 1B depicts the processor 118 and the transceiver 120 as separate components, it will be appreciated that the processor 118 and the transceiver 120 can be integrated together in an electronic package or chip.

The transmit/receive element 122 of a UE can be configured to transmit signals to, or receive signals from, a base station (e.g., the base station 114a) over the air interface 115/116/117 or another UE over the air interface 115d/116d/117d. For example, in an embodiment, the transmit/receive element 122 can be an antenna configured to transmit and/or receive RF signals. In an embodiment, the transmit/receive element 122 can be an emitter/detector configured to transmit and/or receive IR, UV, or visible light signals, for example. In yet an embodiment, the transmit/receive element 122 can be configured to transmit and receive both RF and light signals. It will be appreciated that the transmit/receive element 122 can be configured to transmit and/or receive any combination of wireless or wired signals.

In addition, although the transmit/receive element 122 is depicted in FIG. 1B as a single element, the WTRU 102 can include any number of transmit/receive elements 122. More specifically, the WTRU 102 can employ MIMO technology. Thus, in an embodiment, the WTRU 102 can include two or more transmit/receive elements 122 (e.g., multiple antennas) for transmitting and receiving wireless signals over the air interface 115/116/117.

The transceiver 120 can be configured to modulate the signals that are to be transmitted by the transmit/receive element 122 and to demodulate the signals that are received by the transmit/receive element 122. As noted above, the WTRU 102 can have multi-mode capabilities. Thus, the transceiver 120 can include multiple transceivers for enabling the WTRU 102 to communicate via multiple RATs, for example, NR and IEEE 802.11 or NR and E-UTRA, or to communicate with the same RAT via multiple beams to different RRHs, TRPs, RSUs, or nodes.

The processor 118 of the WTRU 102 can be coupled to, and can receive user input data from, the speaker/microphone 124, the keypad 126, and/or the display/touchpad/indicators 128 (e.g., a liquid crystal display (LCD) display unit or organic light-emitting diode (OLED) display unit. The processor 118 can also output user data to the speaker/microphone 124, the keypad 126, and/or the display/touchpad/indicators 128. In addition, the processor 118 can access information from, and store data in, any type of suitable memory, such as the non-removable memory 130 and/or the removable memory 132. The non-removable memory 130 can include random-access memory (RAM), read-only memory (ROM), a hard disk, or any other type of memory storage device. The removable memory 132 can include a subscriber identity module (SIM) card, a memory stick, a secure digital (SD) memory card, and the like. In an embodiment, the processor 118 can access information from, and store data in, memory that is not physically located on the WTRU 102, such as on a server that is hosted in the cloud or in an edge computing platform or in a home computer (not shown).

The processor 118 can receive power from the power source 134, and can be configured to distribute and/or control the power to the other components in the WTRU 102. The power source 134 can be any suitable device for powering the WTRU 102. For example, the power source 134 can include one or more dry cell batteries, solar cells, fuel cells, and the like.

The processor 118 can also be coupled to the GPS chipset 136, which can be configured to provide location information (e.g., longitude and latitude) regarding the current location of the WTRU 102. In addition to, or in lieu of, the information from the GPS chipset 136, the WTRU 102 can receive location information over the air interface 115/116/117 from a base station (e.g., base stations 114a, 114b) and/or determine its location based on the timing of the signals being received from two or more nearby base stations. It will be appreciated that the WTRU 102 can acquire location information by way of any suitable location-determination method while remaining consistent with an embodiment.

The processor 118 can further be coupled to other peripherals 138, which can include one or more software and/or hardware modules that provide additional features, functionality and/or wired or wireless connectivity. For example, the peripherals 138 can include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 can be embodied in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 can connect to other components, modules, or systems of such apparatuses or devices via one or more interconnect interfaces, such as an interconnect interface that can comprise one of the peripherals 138.

Figure 1C:
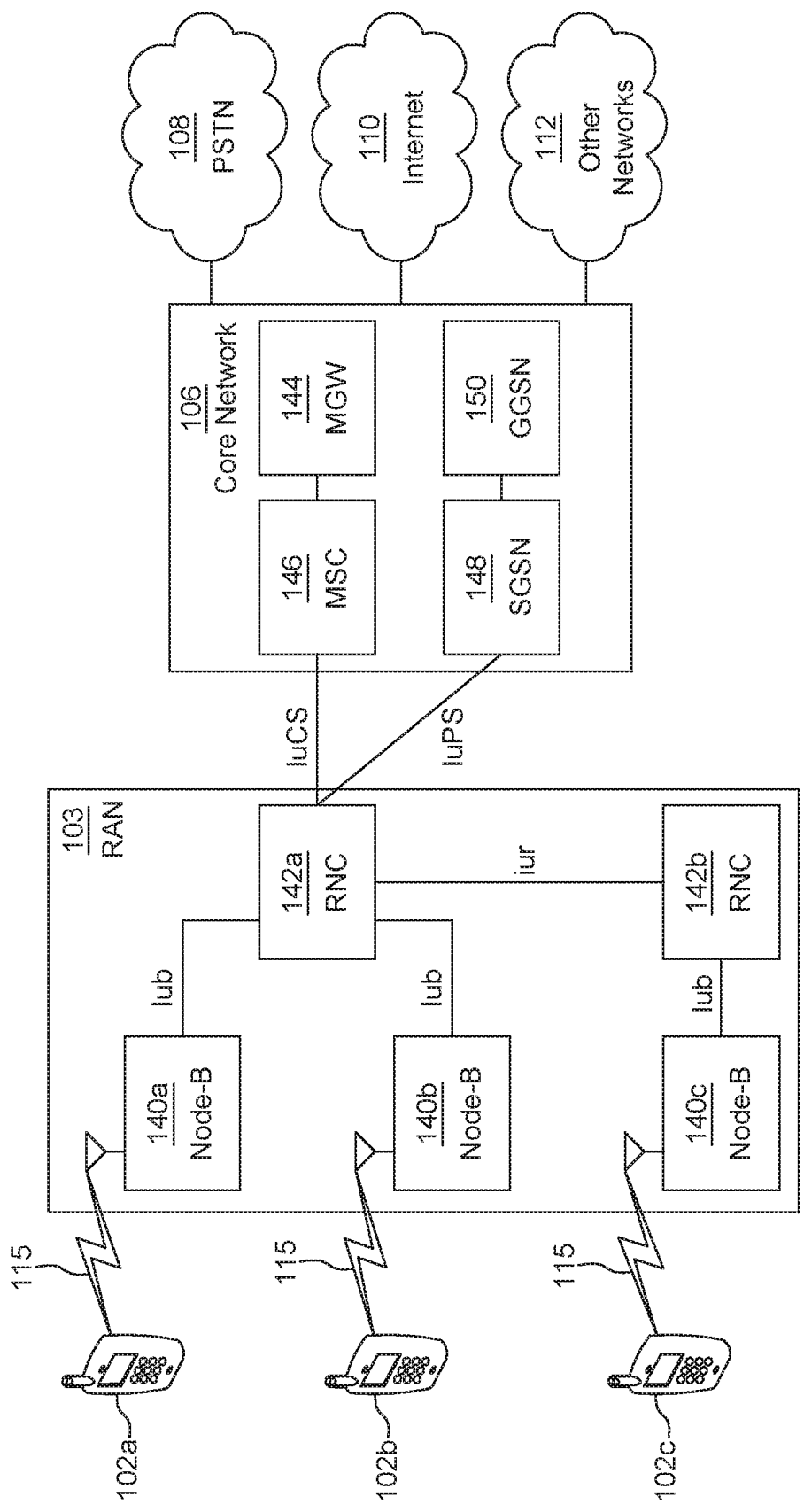
FIG. 1C is a system diagram that shows an example of a Radio Access Network (RAN) architecture and a core network architecture.

FIG. 1C is a system diagram of the RAN 103 and the core network 106 according to an embodiment. As noted above, the RAN 103 can employ a UTRA radio technology to communicate with the WTRUs 102a, 102b, and 102c over the air interface 115. The RAN 103 can also be in communication with the core network 106. As shown in FIG. 1C, the RAN 103 can include Node-Bs 140a, 140b, 140c, which can each include one or more transceivers for communicating with the WTRUs 102a, 102b, 102c over the air interface 115. The Node-Bs 140a, 140b, 140c can each be associated with a particular cell (not shown) within the RAN 103. The RAN 103 can also include RNCs 142a, 142b. It will be appreciated that the RAN 103 can include any number of Node-Bs and RNCs while remaining consistent with an embodiment.

As shown in FIG. 1C, the Node-Bs 140a, 140b can be in communication with the RNC 142a. Additionally, the Node-B 140c can be in communication with the RNC 142b. The Node-Bs 140a, 140b, 140c can communicate with the respective RNCs 142a, 142b via an Iub interface. The RNCs 142a, 142b can be in communication with one another via an Iur interface. Each of the RNCs 142a, 142b can be configured to control the respective Node-Bs 140a, 140b, 140c to which it is connected. In addition, each of the RNCs 142a, 142b can be configured to carry out or support other functionality, such as outer loop power control, load control, admission control, packet scheduling, handover control, macro-diversity, security functions, data encryption, and the like.

The core network 106 shown in FIG. 1C can include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements can be owned and/or operated by an entity other than the core network operator.

The RNC 142a in the RAN 103 can be connected to the MSC 146 in the core network 106 via an IuCS interface. The MSC 146 can be connected to the MGW 144. The MSC 146 and the MGW 144 can provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 can also be connected to the SGSN 148 in the core network 106 via an IuPS interface. The SGSN 148 can be connected to the GGSN 150. The SGSN 148 and the GGSN 150 can provide the WTRUs 102a, 102b, 102c with access to packet-switched networks, such as the Internet 110, to facilitate communications between and the WTRUs 102a, 102b, 102c and IP-enabled devices.

As noted above, the core network 106 can also be connected to the other networks 112, which can include other wired or wireless networks that are owned and/or operated by other service providers.

Figure 1D:
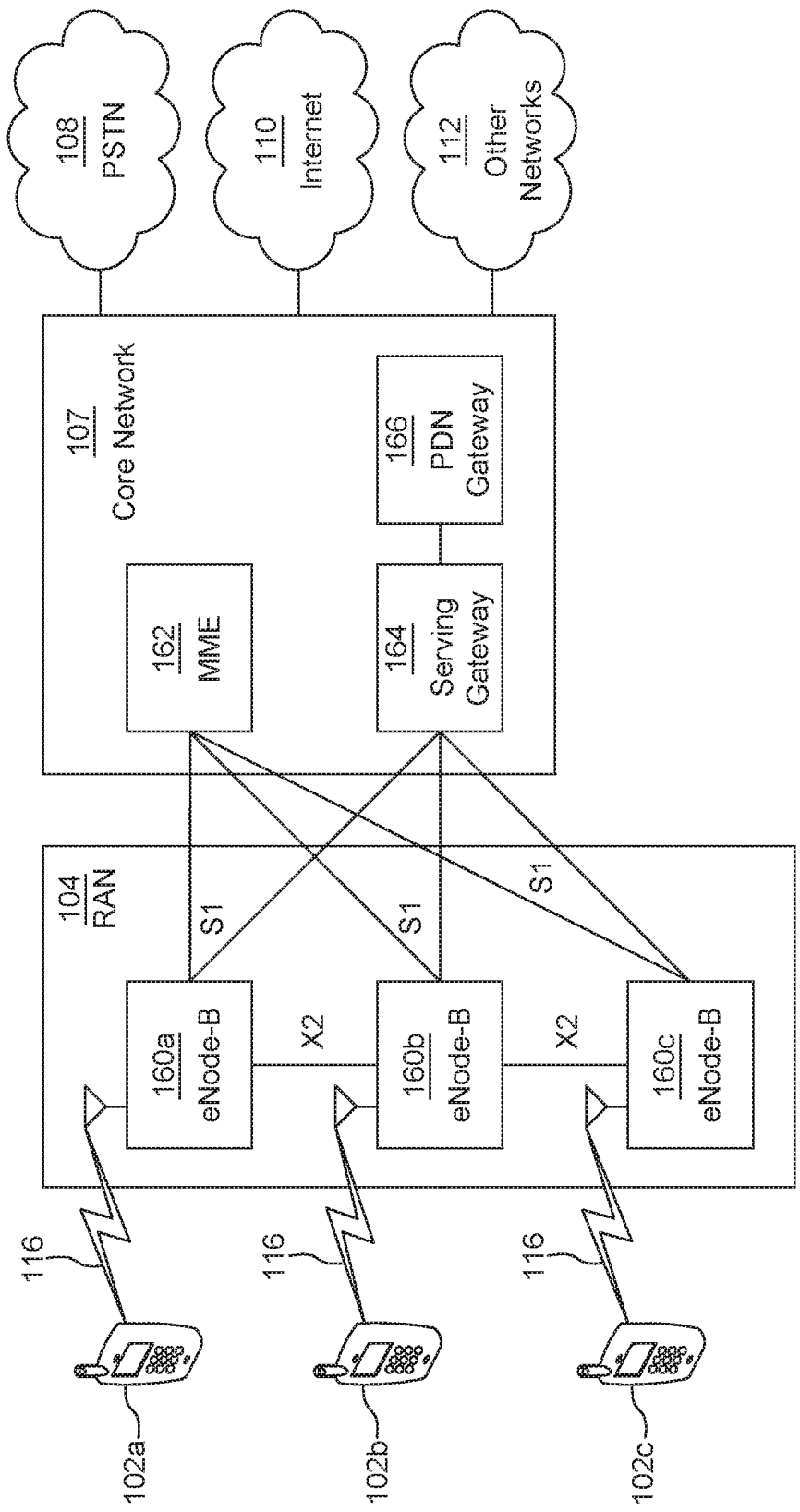
FIG. 1D is a system diagram that shows an example of a Radio Access Network (RAN) architecture and a core network architecture.

FIG. 1D is a system diagram of the RAN 104 and the core network 107 according to an embodiment. As noted above, the RAN 104 can employ an E-UTRA radio technology to communicate with the WTRUs 102a, 102b, and 102c over the air interface 116. The RAN 104 can also be in communication with the core network 107.

The RAN 104 can include eNode-Bs 160a, 160b, 160c, though it will be appreciated that the RAN 104 can include any number of eNode-Bs while remaining consistent with an embodiment. The eNode-Bs 160a, 160b, 160c can each include one or more transceivers for communicating with the WTRUs 102a, 102b, 102c over the air interface 116. In an embodiment, the eNode-Bs 160a, 160b, 160c can implement MIMO technology. Thus, the eNode-B 160a, for example, can use multiple antennas to transmit wireless signals to, and receive wireless signals from, the WTRU 102a.

Each of the eNode-Bs 160a, 160b, and 160c can be associated with a particular cell (not shown) and can be configured to handle radio resource management decisions, handover decisions, scheduling of users in the uplink and/or downlink, and the like. As shown in FIG. 1D, the eNode-Bs 160a, 160b, 160c can communicate with one another over an X2 interface.

The core network 107 shown in FIG. 1D can include a mobility management gateway (MME) 162, a serving gateway 164, and a packet data network (PDN) gateway 166. While each of the foregoing elements are depicted as part of the core network 107, it will be appreciated that any one of these elements can be owned and/or operated by an entity other than the core network operator.

The MME 162 can be connected to each of the eNode-Bs 160a, 160b, and 160c in the RAN 104 via an S1 interface and can serve as a control node. For example, the MME 162 can be responsible for authenticating users of the WTRUs 102a, 102b, 102c, bearer activation/deactivation, selecting a particular serving gateway during an initial attach of the WTRUs 102a, 102b, 102c, and the like. The MME 162 can also provide a control plane function for switching between the RAN 104 and other RANs (not shown) that employ other radio technologies, such as GSM or WCDMA.

The serving gateway 164 can be connected to each of the eNode-Bs 160a, 160b, and 160c in the RAN 104 via the S1 interface. The serving gateway 164 can generally route and forward user data packets to/from the WTRUs 102a, 102b, 102c. The serving gateway 164 can also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 can also be connected to the PDN gateway 166, which can provide the WTRUs 102a, 102b, 102c with access to packet-switched networks, such as the Internet 110, to facilitate communications between the WTRUs 102a, 102b, 102c and IP-enabled devices.

The core network 107 can facilitate communications with other networks. For example, the core network 107 can provide the WTRUs 102a, 102b, 102c with access to circuit-switched networks, such as the PSTN 108, to facilitate communications between the WTRUs 102a, 102b, 102c and traditional land-line communications devices. For example, the core network 107 can include, or can communicate with, an IP gateway (e.g., an IP multimedia subsystem (IMS) server) that serves as an interface between the core network 107 and the PSTN 108. In addition, the core network 107 can provide the WTRUs 102a, 102b, 102c with access to the networks 112, which can include other wired or wireless networks that are owned and/or operated by other service providers.

Figure 1E:
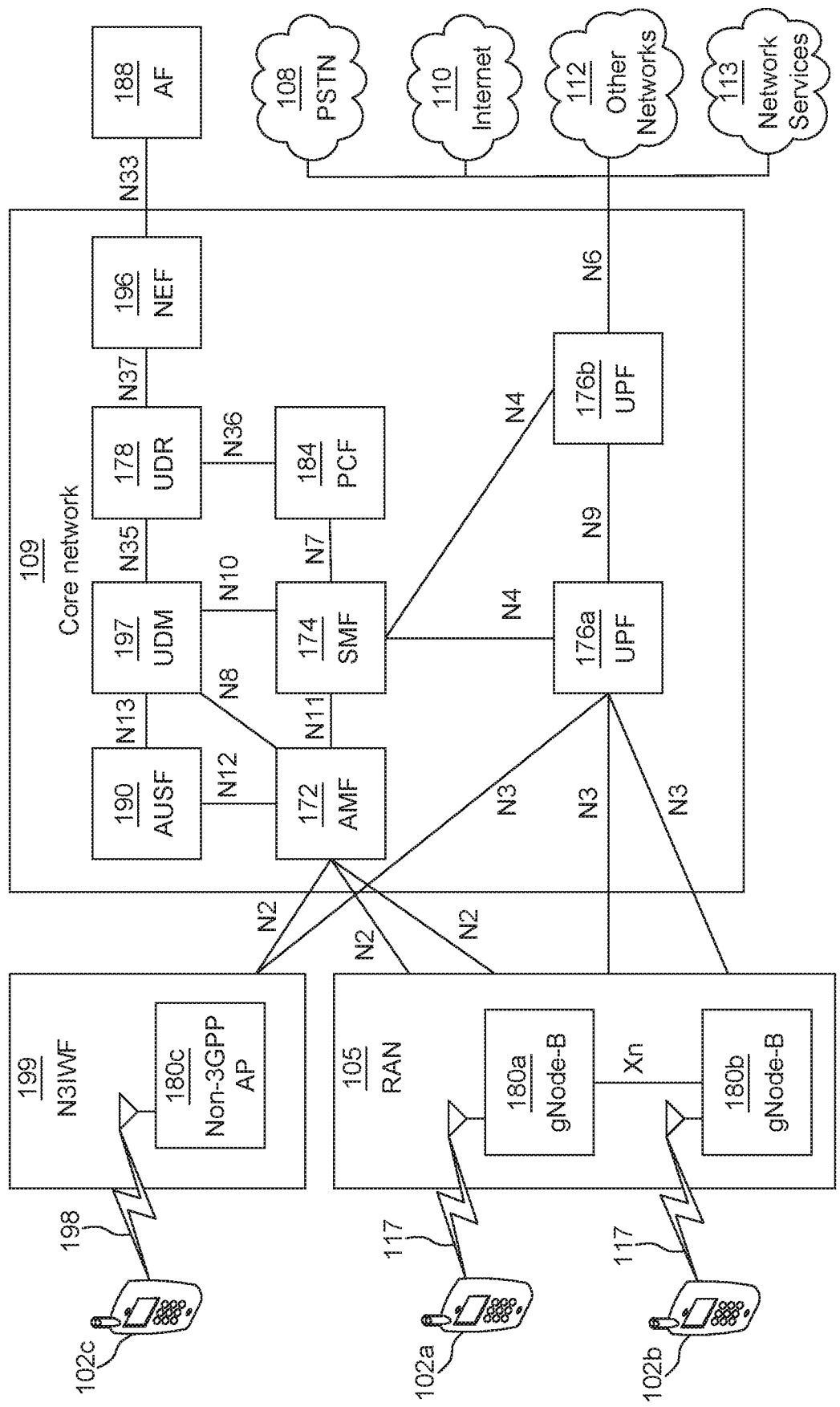
FIG. 1E is a system diagram that shows an example of a Radio Access Network (RAN) architecture and a core network architecture.

FIG. 1E is a system diagram of the RAN 105 and the core network 109 according to an embodiment. The RAN 105 can employ an NR radio technology to communicate with the WTRUs 102a and 102b over the air interface 117. The RAN 105 can also be in communication with the core network 109. The N3IWF 199 can employ a non-3GPP radio technology to communicate with the WTRU 102c over the air interface 198. The N3IWF 199 can also be in communication with the core network 109.

The RAN 105 can include gNode-Bs 180a and 180b though it will be appreciated that the RAN 105 can include any number of gNode-Bs while remaining consistent with an embodiment. The gNode-Bs 180a and 180b can each include one or more transceivers for communicating with the WTRUs 102a and 102b over the air interface 117. In an embodiment that uses an integrated access and backhaul connection, the same air interface can be used between the WTRUs and gNode-Bs which can be the core network 109 via one or multiple gNBs. In an embodiment, the gNode-Bs 180a and 180b can implement MIMO, MU-MIMO, and/or digital beamforming technology. Thus, the gNode-B 180a, for example, can use multiple antennas to transmit wireless signals to, and receive wireless signals from, the WTRU 102a. It should be appreciated that the RAN 105 can employ of other types of base stations such as an eNode-B. It should also be appreciated that the RAN 105 can employ more than one type of base station. For example, the RAN can employ eNode-Bs and gNode-Bs.

The N3IWF 199 can include a non-3GPP Access Point 180c though it will be appreciated that the N3IWF 199 can include any number of non-3GPP Access Points while remaining consistent with an embodiment. The non-3GPP Access Point 180c can include one or more transceivers for communicating with the WTRUs 102c over the air interface 198. In an embodiment, the non-3GPP Access Point 180c can use the 802.11 protocol to communicate with the WTRU 102c over the air interface 198.

Each of the gNode-Bs 180a and 180b can be associated with a particular cell (not shown) and can be configured to handle radio resource management decisions, handover decisions, scheduling of users in the uplink and/or downlink, and the like. As shown in FIG. 1E, the gNode-Bs 180a and 180b can communicate with one another over an Xn interface.

The core network 109 shown in FIG. 1E can be a 5G core network (5GC) The 5GC can offer numerous communication services to customers who are interconnected by the radio access network. The 5G Core Network 109 comprises a number of entities that perform the functionality of the core network. As used herein, the term "core network entity" or "network function" refers to any entity that performs one or more functionalities of a core network. It is understood that such core network entities can be logical entities that are implemented in the form of software (i.e., computer-executable instructions) stored in a memory of, and executing on a processor of, an apparatus configured for wireless and/or network communications or a computer system such as those illustrated in FIG. 1F.

As shown in FIG. 1E, the 5G Core Network 109 can include an access and mobility management function (AMF) 172, a session management function (SMF) 174, user plane functions (UPF) 176a and 176b, a user data management function (UDM) 197, an authentication server function (AUSF) 190, a Network Exposure Function (NEF) 196, a policy control function (PCF) 184, a non-3GPP interworking function (N3IWF) 199 an application function (AF) 188, a User Data Repository (UDR) 178. While each of the foregoing elements are depicted as part of the 5G core network 109, it will be appreciated that any one of these elements can be owned and/or operated by an entity other than the core network operator. It should also be appreciated that a 5G core network may not consist of all of these elements, can consist of additional elements, and can consist of multiple instances of each of these elements. FIG. 1E shows that network functions directly connect to one another, however, it should be appreciated that they can communicate via routing agents such as a diameter routing agent or message buses. Although FIG. 1E shows that connectivity between network functions is achieved via a set of interfaces, or reference points, it should be appreciated that network functions could be modeled, described, or implemented as a set of services that are invoked, or called, by other network functions or services. Invocation of a Network Function service can be achieved via a direct connection between network functions, an exchange of messaging on a message bus, calling a software function, etc.

The AMF 172 can be connected to the RAN 105 via an N2 interface and can serve as a control node. For example, the AMF 172 can be responsible for registration management, connection management, reachability management, access authentication, access authorization. The AMF can be responsible for forwarding user plane tunnel configuration information to the RAN 105 via the N2 interface. The AMF 172 can receive the user plane tunnel configuration information from the SMF via an N11 interface. The AMF 172 can generally route and forward NAS packets to/from the WTRUs 102a, 102b, 102c via an N1 interface. The N1 interface is not shown in FIG. 1E.

The SMF 174 can be connected to the AMF 172 via an N11 interface, can be connected to a PCF 184 via an N7 interface, and can be connected to the UPF 176 via an N4 interface. The SMF 174 can serve as a control node. For example, the SMF 174 can be responsible for Session Management, IP address allocation for the WTRUs 102a, 102b, 102c, management and configuration of traffic steering rules in the UPF 176a and UPF 176b, and generation of downlink data notifications to the AMF 172.

The UPF 176a and UPF 176b can provide the WTRUs 102a, 102b, 102c with access to a packet data network (DN), such as the Internet 110, to facilitate communications between the WTRUs 102a, 102b, 102c and other devices. The UPF 176a and UPF 176b can also provide the WTRUs 102a, 102b, 102c with access to other types of packet data networks. For example, Other Networks 112 can be Ethernet Networks or any type of network that exchanges packets of data. The UPF 176a and UPF 176b can receive traffic steering rules from the SMF 174 via the N4 interface. The UPF 176a and UPF 176b can provide access to a packet data network by connecting a packet data network with an N6 interface or by connecting to other UPFs via an N9 interface. In addition to providing access to packet data networks, the UPF 176 can be responsible for packet routing and forwarding, policy rule enforcement, quality of service handling for user plane traffic, downlink packet buffering.

The AMF 172 can also be connected to the N3IWF 199 via an N2 interface. The N3IWF facilities a connection between the WTRU 102c and the 5G core network 170 via radio interface technologies that are not defined by 3GPP. The AMF can interact with the N3IWF 199 in the same, or similar, manner that it interacts with the RAN 105.

The PCF 184 can be connected to the SMF 174 via an N7 interface, connected to the AMF 172 via an N15 interface, and connected to an application function (AF) 188 via an N5 interface. The N15 and N5 interfaces are not shown in FIG. 1E. The PCF 184 can provide policy rules to control plane nodes such as the AMF 172 and SMF 174, allowing the control plane nodes to enforce these rules. The PCF 184, can send policies to the AMF 172 for the WTRUs 102a, 102b, 102c so that the AMF can deliver the policies to the WTRUs 102a, 102b, 102c via an N1 interface. Policies can then be enforced, or applied, at the WTRUs 102a, 102b, 102c.

The UDR 178 acts as a repository for authentication credentials and subscription information. The UDR can connect to Network Functions so that Network Function can add to, read from, and modify the data that is in the repository. For example, the UDR 178 can connect to the PCF 184 via an N36 interface, the UDR 178 can connect to the NEF 196 via an N37 interface, and the UDR 178 can connect to the UDM 197 via an N35 interface.

The UDM 197 can serve as an interface between the UDR 178 and other Network Functions. The UDM 197 can authorize Network Functions access of the UDR 178. For example, the UDM 197 can connect to the AMF 172 via an N8 interface, the UDM 197 can connect to the SMF 174 via an N10 interface, and the UDM 197 can connect to the AUSF 190 via an N13 interface. The UDR 178 and UDM 197 can be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions 188. Exposure occurs on the N33 API interface. The NEF can connect to an AF 188 via an N33 interface and it can connect to other network functions in order to expose the capabilities and services of the 5G core network 109.

Application Functions 188 can interact with network functions in the 5G Core Network 109. Interaction between the Application Functions 188 and network functions can be via a direct interface or can occur via the NEF 196. The Application Functions 188 can be considered part of the 5G Core Network 109 or can be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network based on the concept of Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of Network Slicing techniques, it is likely that the network architecture would not be flexible and scalable enough to efficiently support a wider range of use cases need when each use case has its own specific set of performance, scalability and availability requirements. Furthermore, introduction of new network services should be made more efficient.

In a network slicing scenario, a WTRU 102*a*, 102*b*, 102*c* can connect to an AMF 172, via an N1 interface. The AMF can be logically part of one or more slices. The AMF can coordinate the WTRU's connection or communication with one or more UPF(s) 176, SMF(s) 174, and other Network Functions. Each of the UPF(s) 176, SMF(s) 174, and other Network Functions can be part of different or the same slices. When they are part of different slices, they can be isolated from each other in the sense that they can utilize different computing resources, security credentials, etc.

The 5G core network 109 can facilitate communications with other networks. For example, the 5G core network 109 can include, or can communicate with, an IP gateway (e.g., an IP multimedia subsystem (IMS) server) that serves as an interface between the 5G core network 109 and the PSTN 108. For example, the core network 109 can include, or communicate with a short message service (SMS) service center that facilities communication via the short message service. For example, the 5G core network 109 can facilitate the exchange of non-IP data packets between the WTRUs 102*a*, 102*b*, 102*c* and servers or applications functions 188. In addition, the core network 170 can provide the WTRUs 102*a*, 102*b*, 102*c* with access to the networks 112, which can include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities can be identified by other names and certain entities or functions can be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein can be embodied or implemented in any similar communication system, whether presently defined or defined in the future.

Figure 1F:
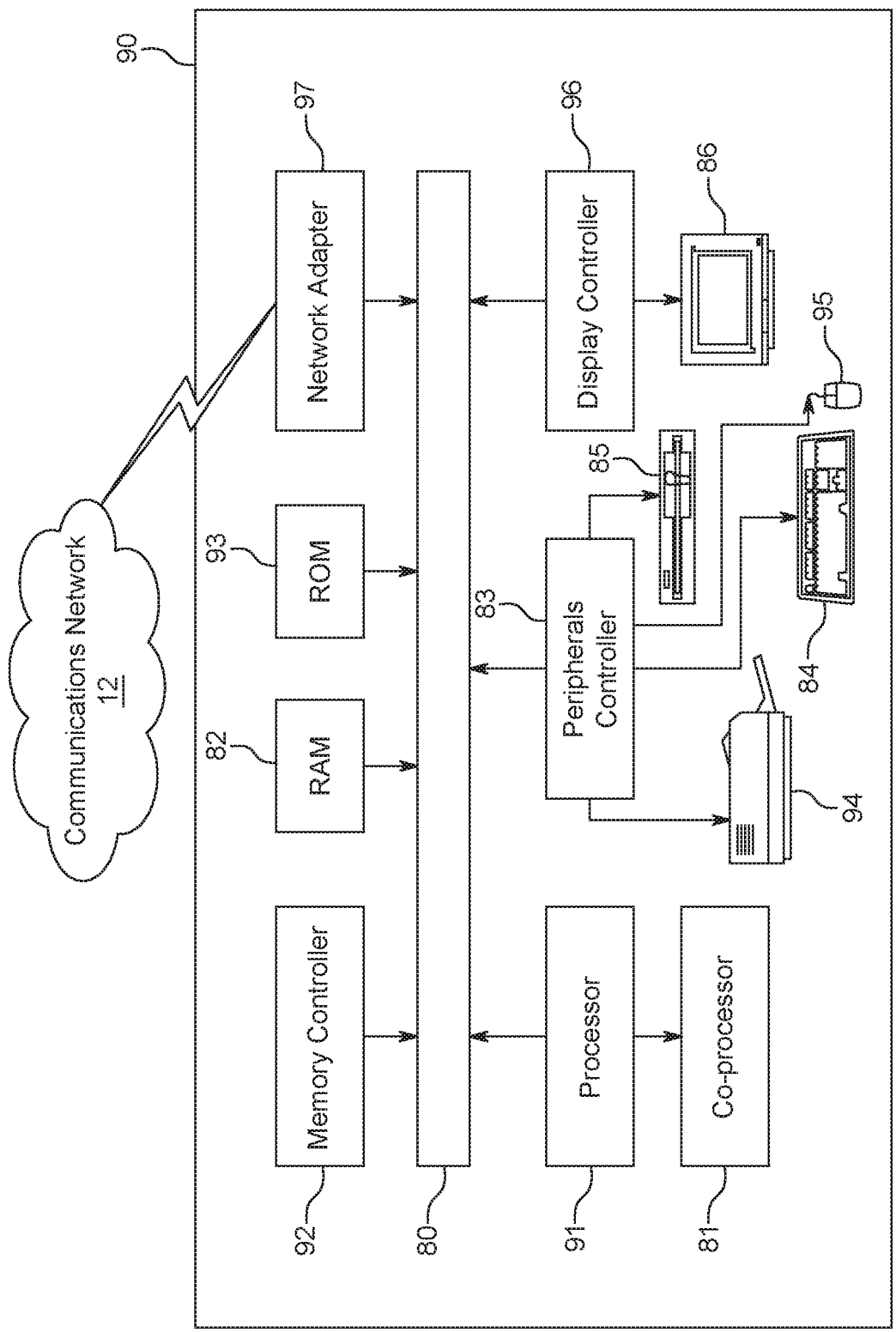
FIG. 1F is a system diagram that shows an example of a computing system used in a communication network.

FIG. 1F is a block diagram of an exemplary computing system 90 in which one or more apparatuses of the communications networks illustrated in FIGS. 1A, 1C, 1D and 1E can be embodied, such as certain nodes or functional entities in the RAN 103/104/105, Core Network 106/107/109, PSTN 108, Internet 110, Other Networks 112, or Network Services 113. Computing system 90 can comprise a computer or server and can be controlled primarily by computer readable instructions, which can be in the form of software, wherever, or by whatever means such software is stored or accessed. Such computer readable instructions can be executed within a processor 91, to cause computing system 90 to do work. The processor 91 can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 can perform signal coding, data processing, power control, input/output processing, and/or any other functionality that enables the computing system 90 to operate in a communications network. Coprocessor 81 is an optional processor, distinct from main processor 91, that can perform additional functions or assist processor 91. Processor 91 and/or coprocessor 81 can receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 can be controlled by memory controller 92. Memory controller 92 can provide an address translation function that translates virtual addresses into physical addresses as instructions are executed. Memory controller 92 can also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 can contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output can include text, graphics, animated graphics, and video. The visual output can be provided in the form of a graphical user interface (GUI). Display 86 can be implemented with a CRT-based video display, an LCD-based flat-panel display, gas plasma-based flat-panel display, or a touch-panel. Display controller 96 includes electronic components required to generate a video signal that is sent to display 86.

Further, computing system 90 can contain communication circuitry, such as, for example, a wireless or wired network adapter 97, that can be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, can be used to perform the transmitting and receiving steps of certain apparatuses, nodes, or functional entities described herein.

Figure 1G:
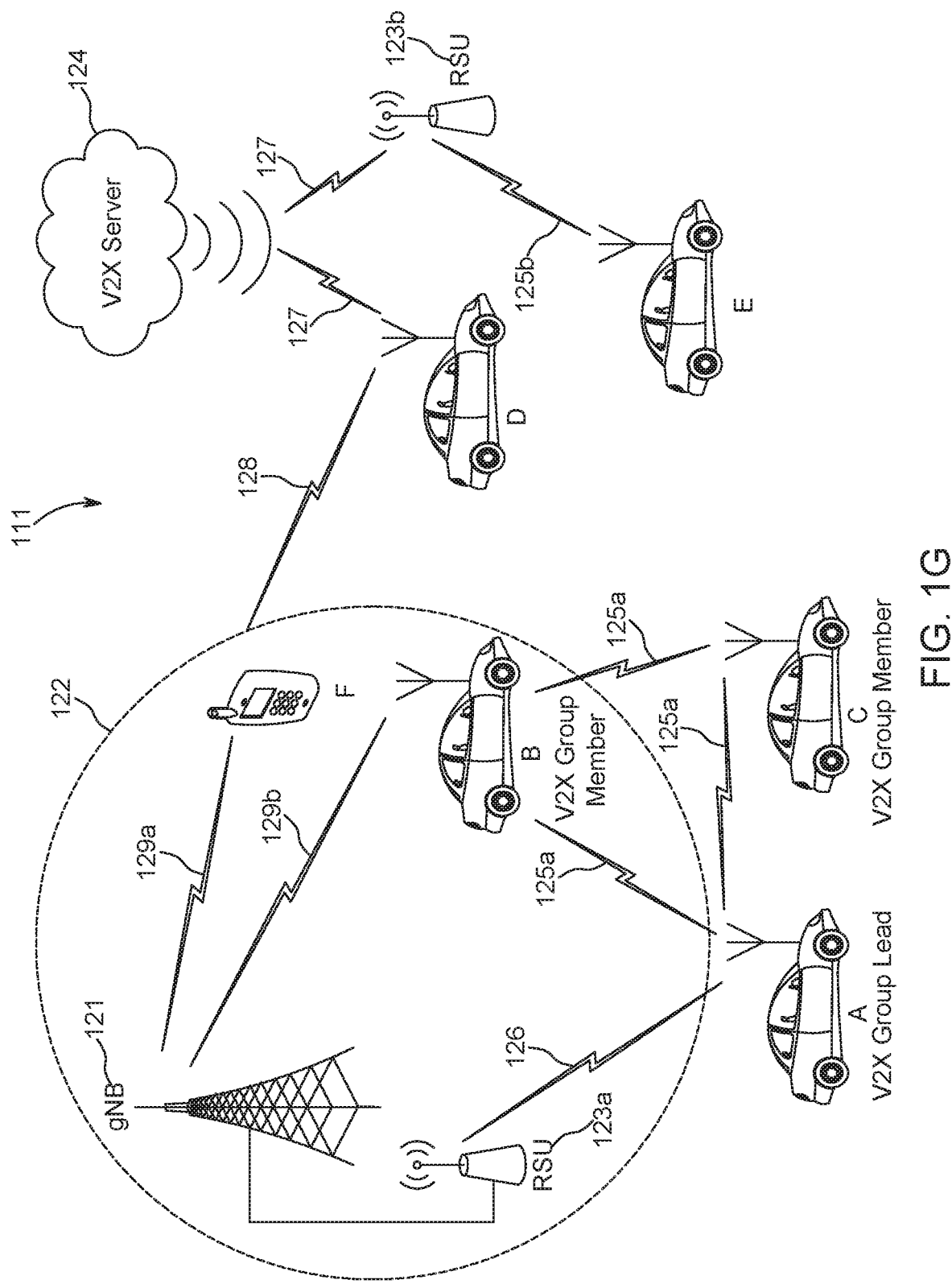
FIG. 1G is a system diagram that shows an example 3GPP architecture.

FIG. 1G illustrates one embodiment of an example communications system 111 in which the methods and apparatuses described and claimed herein can be embodied. As shown, the example communications system 111 can include wireless transmit/receive units (WTRUs) A, B, C, D, E, F, a base station gNB 121, a V2X server 124, and RSU 123a and RSU 123b, though it will be appreciated that the disclosed embodiments contemplate any number of WTRUs, base station gNBs, V2X networks, and/or network elements. One or several or all WTRUs A, B, C, D, E can be out of range of the access network coverage 122. WTRUs A, B, C form a V2X group, among which WTRU A is the group lead and WTRU B and WTRU C are group members. WTRUs A, B, C, D, E, F can communicate among them over Uu interface 129a/129b if under the access network coverage or sidelink (PC5 or NR PC5) interface 125a if under or out of the access network coverage. WTRUs A, B, C, D, E, F can communicate to an RSU via a Vehicle-to-Network (V2N) interface 126 or sidelink interface 125b. WTRUs A, B, C, D, E, F can communicate to a V2X Server 124 via a Vehicle-to-Infrastructure (V2I) interface 127. WTRUs A, B, C, D, E, F can communicate to another UE via a Vehicle-to-Person (V2P) interface 128.

It is understood that any or all of the apparatuses, systems, methods and processes described herein can be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein can be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information, and which can be accessed by a computing system.

Connection Management in LTE D2D Sidelink

One-to-Many ProSe Direct Communication

In ProSe and specifically LTE D2D Sidelink communication, One-to-many ProSe Direct Communication has the following characteristics:

- One-to-many ProSe Direct Communication is connectionless. Thus, there is no signaling over PC5 control plane.
- The radio layer provides a user plane communication service for transmission of IP packets between UEs engaged in direct communication.
- Members of a group share a secret from which a group security key can be derived to encrypt all user data for that group.
- Authorization for one-to-many ProSe Direct Communication is configured in the UE by the ProSe Function using PC3 reference point.
- ProSe UE configuration parameters (e.g. including ProSe Group IP multicast addresses, ProSe Group IDs, Group security material, radio related parameters for transmission and reception) are configured in the UE.

One-to-One ProSe Direct Communication

Figure 2:
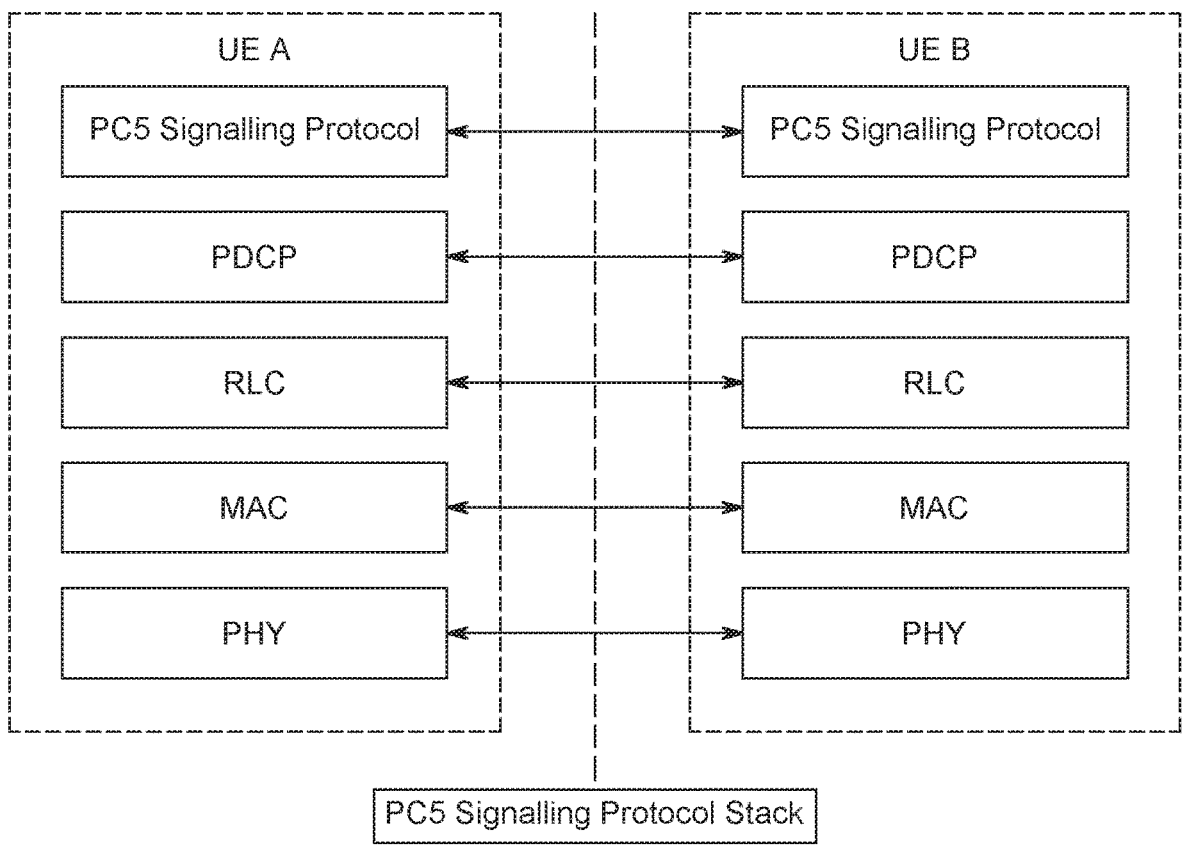
FIG. 2 shows a Control-Plane protocol stack for one-to-one sidelink communication in accordance with an exemplary embodiment.

One-to-one ProSe Direct Communication is connection oriented and realized by establishing a secure layer-2 link over PC5 between two UEs. The control plane for establishing, maintaining and releasing the logical connection for one-to-one sidelink communication is shown in the FIG. 2. Note that throughout this disclosure, PC5 and sidelink interface are used interchangeably.

Each UE (e.g., UE A and UE B in FIG. 2) has a Layer-2 ID for unicast communication that is included in the Source Layer-2 ID field of every frame that it sends on the layer-2 link and in the Destination Layer-2 ID of every frame that it receives on the layer-2 link. Conflicts between Destination Layer-2 ID for unicast and one-to-many communication will be resolved by RAN WG2. The UE needs to ensure that the Layer-2 ID for unicast communication is at least locally unique.

The layer-2 link for one-to-one ProSe Direct Communication is identified by the combination of the Layer-2 IDs of the two UEs. This means that the UE can engage in multiple layer-2 links for one-to-one ProSe Direct Communication using the same Layer-2 ID.

Figure 3:
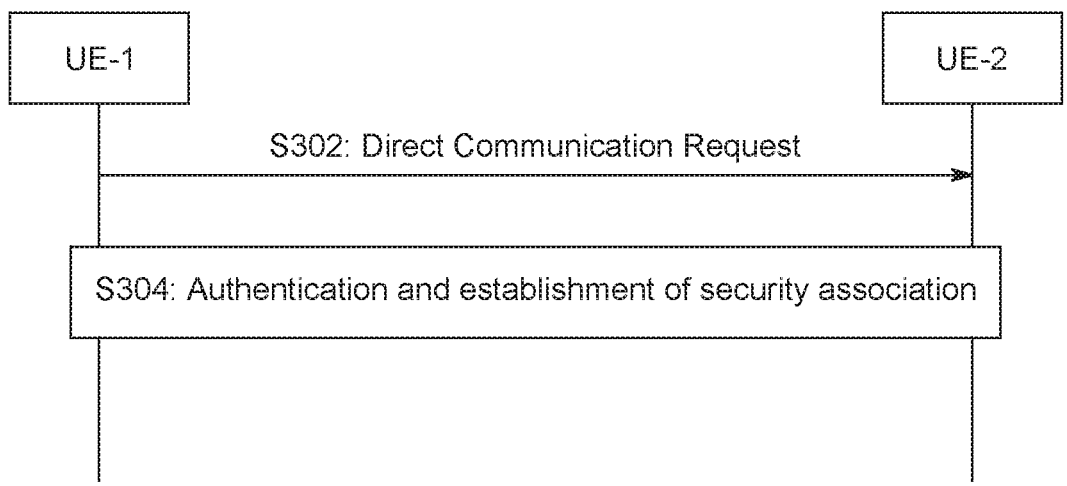
FIG. 3. shows establishment of a secure layer-2 link over PC5 in accordance with an exemplary embodiment.

In ProSe, the PC5-S signaling is designed for connection management and security management as illustrated in FIG. 3. In FIG. 3, in step S302, UE-1 sends a direct communication request to UE-2. In step S304, authentication and establishment of security association is performed.

The connection management procedures include PC5 link setup, link maintenance through keep-alive functionality and link release procedures. The security management includes PC5 security mode control procedures and (re)keying procedures.

PC5-S is not capable of AS layer parameter configuration, except for security parameters. It is worth noting that RRC is not currently used for PC5 AS configuration in support of sidelink communication. RRC is only used for broadcasting sidelink generic configuration parameters over sidelink broadcast control channel (SBCCH).

Support for QoS in ProSe

QoS Control is per packet based QoS. When the ProSe upper layer (i.e. above PC5 access stratum) passes a protocol data unit for transmission to the PC5 access stratum, the ProSe upper layer provides a ProSe Per-Packet Priority (PPPP) from a range of 8 possible values, and a ProSe Per-Packet Reliability (PPPR) from a range of 8 possible values. The PPPP and PPPR are independent of the Destination Layer-2 ID and apply to both one-to-one and one-to-many ProSe Direct Communication. The PPPP and PPPR are selected by the application layer. A ProSe Per-Packet Priority value shall be assigned to PC5-S messages. The UE is configured with one ProSe Per-Packet Priority value that is used for transmitting any of the PC5-S messages.

The PPPP and PPPR are neutral to the mode in which the UE accesses the medium i.e. whether scheduled or autonomous transmission modes are used.

The ProSe access stratum uses the ProSe Per-Packet Priority associated with the protocol data unit, as received from the upper layers to prioritize the transmission with respect to other intra-UE transmissions (i.e. protocol data units associated with different priorities awaiting transmission inside the same UE) and inter-UE transmissions (i.e. protocol data units associated with different priorities awaiting transmission inside different UEs).

The ProSe access stratum uses the PPPR associated with the protocol data unit as received from the upper layers to decide and adjust the transmission behavior, or e.g. packet duplication.

PC5 Access Stratum (Radio) Configuration for ProSe

Figure 4:
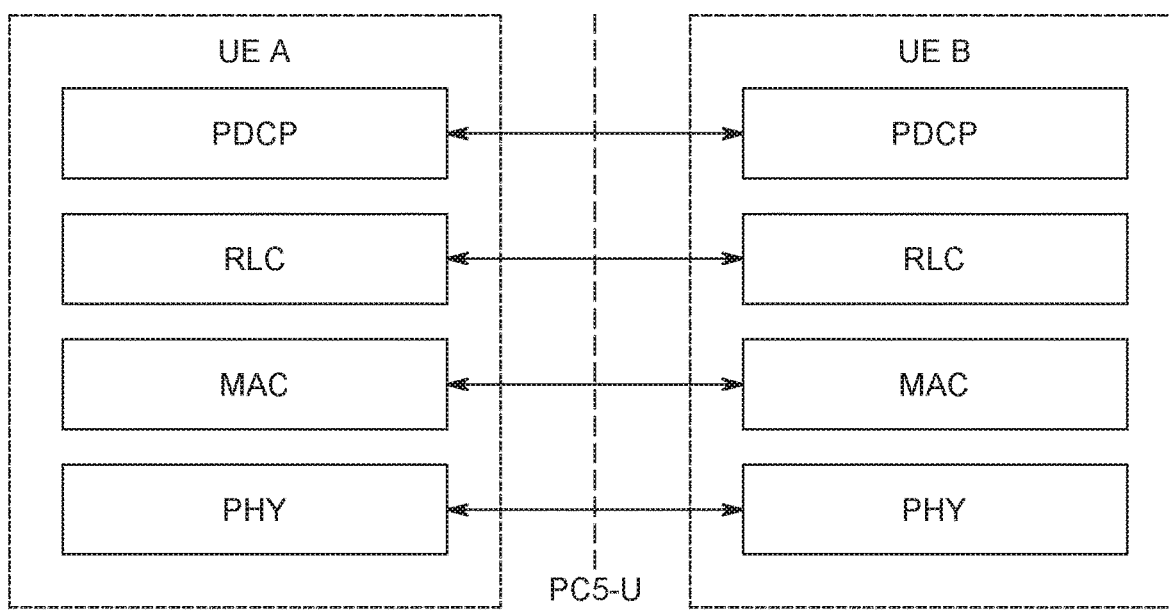
FIG. 4 shows a User-Plane protocol stack for sidelink communication in accordance with an exemplary embodiment.

The user plane Access Protocol Stack (AS) in the PC5 interface consists of PDCP, RLC, MAC and PHY as shown in the FIG. 4.

As indicated above, the one-to-many ProSe communication over PC5 interface is connectionless and has no intended specific receiver. Consequently, there is no need for receiver side control or capability dependent configuration of the radio protocol stack or the radio resources. One-to-one ProSe communication over PC5 interface is connection oriented however as indicated above, the PC5-S signaling protocol used for the connection establishment is not designed and not capable of AS layer parameters configuration. As a result, for both one-to-many ProSe communication and one-to-one ProSe communication, the RX UE protocol stack configuration is predefined in the specification with all features mandatory for the RX UE. For example, no HARQ feedback for sidelink communication, RLC UM is used for sidelink communication, ROHC Unidirectional Mode is used for header compression in PDCP for sidelink communication, Uplink Data Compression (UDC) is not used for sidelink communication. A receiving UE needs to maintain at least one RLC UM entity per transmitting peer UE. A receiving RLC UM entity used for sidelink communication does not need to be configured prior to reception of the first RLC UMD PDU. For the TX UE, AS parameters are configured or derived from QoS input provided by the upper layer. For example, a UE can establish multiple logical channels based on QoS input from upper layer. LCID included within the MAC subheader uniquely identifies a logical channel within the scope of one Source Layer-2 ID and Destination Layer-2 ID combination. As indicated above, the parameters for logical channel prioritization are not configured. The Access stratum (AS) is provided with the PPPP of a protocol data unit transmitted over PC5 interface by higher layer. There is a PPPP associated with each logical channel. Similarly, the PPPR are not configured. The AS is provided with the PPPR of a protocol data unit transmitted over the PC5 interface by a higher layer. The radio resources used for ProSe direct communication can be autonomously selected by the UE AS when out of coverage, based on the QoS input and radio resource configuration information provided by the upper layer, or can be scheduled by the eNB, e.g., when in coverage or when in out of coverage taking into account QoS input and upper layer resource configuration as reported by the UE to the eNB.

Connection Management in LTE V2X Sidelink

One-to-Many V2X Communication

The V2X communication over PC5 reference point is a type of ProSe Direct Communication where the V2X communication over PC5 reference point is connectionless, and there is no signaling over PC5 control plane for connection establishment. V2X messages are exchanged between UEs over PC5 user plane.

One-to-One V2X Communication

There is no support for connection oriented and no support for one-to-one V2X communication in LTE.

Support for QoS in V2X

QoS Control for V2X sidelink communication is per packet based QoS and follows the same principle as that of ProSe sidelink communication as described in section 2.2.3.

PC5 Access Stratum (Radio) Configuration for V2X

The PC5 Assess Stratum configuration is similar to that of PC5 Access stratum configuration for ProSe direct communication.

The one-to-many V2X communication over PC5 interface is connectionless and has no intended specific receiver. Consequently, there is no need for receiver side control or capability dependent configuration of the radio protocol stack or the radio resources. As a result, the RX UE protocol stack configuration is predefined in the specification with all features mandatory for the RX UE. For e.g. no HARQ feedback for sidelink communication, RLC UM is used for sidelink communication, ROHC Unidirectional Mode is used for header compression in PDCP for sidelink communication, Uplink Data Compression (UDC) is not used for sidelink communication. A receiving UE needs to maintain at least one RLC UM entity per transmitting peer UE. A receiving RLC UM entity used for sidelink communication does not need to be configured prior to reception of the first RLC UMD PDU. For the TX UE, AS parameters are configured or derived from QoS input and other configuration parameters such TX profile provided by the upper layer. For example, a UE can establish multiple logical channels based on QoS input from the upper layer. LCID included within the MAC subheader uniquely identifies a logical channel within the scope of one Source Layer-2 ID and Destination Layer-2 ID combination. As indicated above, the parameters for logical channel prioritization are not configured. The Access stratum (AS) is provided with the PPPP of a protocol data unit transmitted over PC5 interface by a higher layer. There is a PPPP associated with each logical channel. Similarly, the PPPR are not configured. The AS is provided with the PPPR of a protocol data unit transmitted over PC5 interface by higher layer. The radio resources used for ProSe direct communication can be autonomously selected by the UE AS when out of coverage, based on the QoS input and radio resource configuration information provided by the upper layer, or can be scheduled by the eNB, e.g., when in coverage or when in out of coverage taking into account QoS input and upper layer resource configuration as reported by the UE to the eNB. The TX profile is used to decide on whether to use Release 14 PHY format or Release 15 PHY format (e.g. 64QAM) for V2X sidelink transmission.

NR V2X Use Cases

SA1 has identified four major advanced V2X use case groups [1][2]: vehicles platooning, extended sensors, advanced driving and remote driving as follows:

Vehicles Platooning enables the vehicles to dynamically form a group travelling together. All the vehicles in the platoon receive periodic data from the leading vehicle, in order to carry on platoon operations. This information allows the distance between vehicles to become extremely small, i.e., the gap distance translated to time can be very low (sub second). Platooning applications can allow the vehicles following to be autonomously driven.

Extended Sensors enables the exchange of raw or processed data gathered through local sensors or live video data among vehicles, RSUs, devices of pedestrians and V2X application servers. The vehicles can enhance the perception of their environment beyond what their own sensors can detect and have a more holistic view of the local situation. High data rate is one of the key characteristics.

Advanced Driving enables semi-automated or fully-automated driving. Longer inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and improved traffic efficiency.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 5:
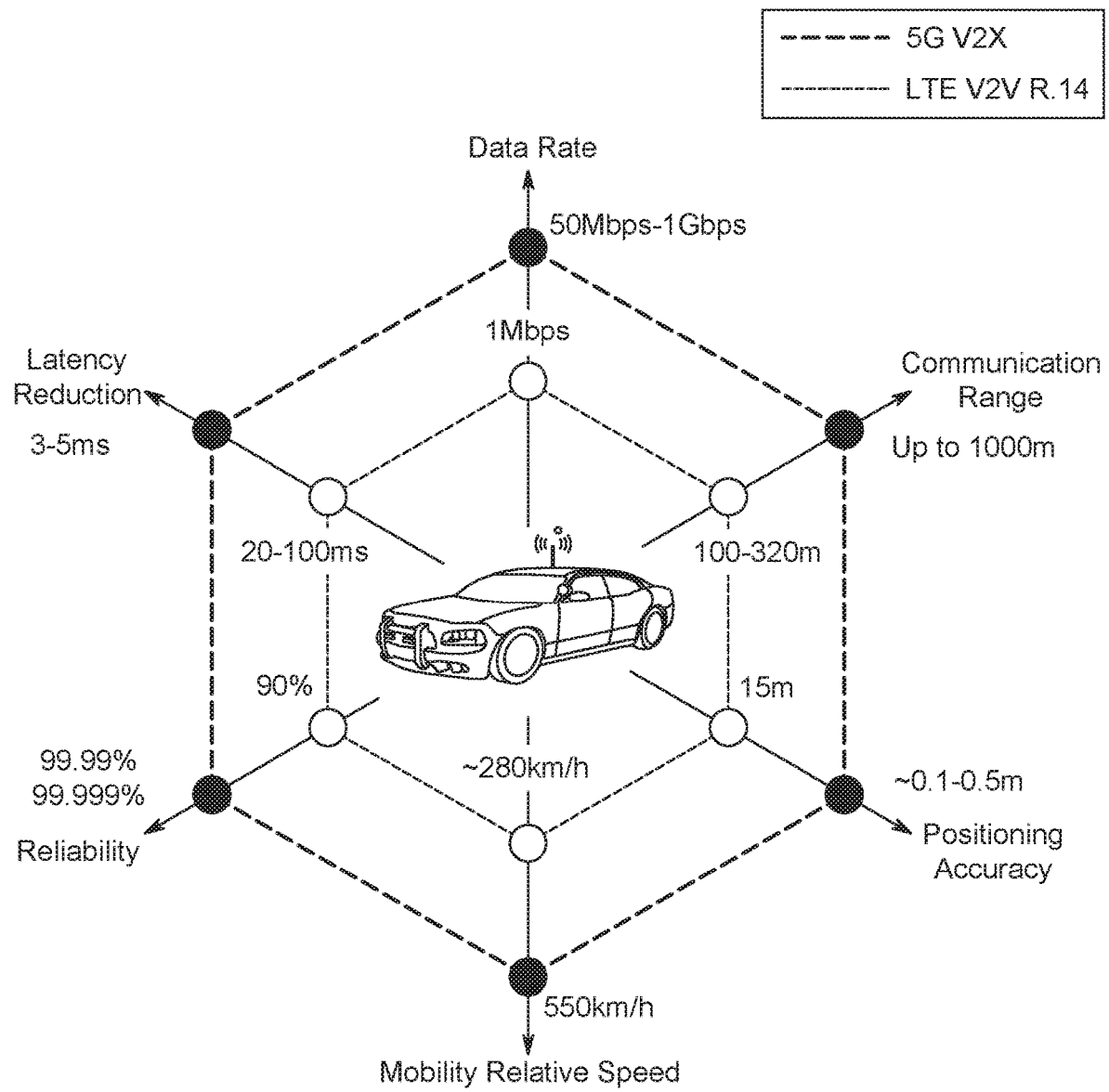
FIG. 5 shows a summary of 5G V2X requirements versus LTE V2V R14 requirements in accordance with an exemplary embodiment.

The NR V2X requirements are much more diverse and stringent than that of LTE V2X as illustrated in the FIG. 5.

As discussed earlier, from the AS perspective, ProSe sidelink unicast and groupcast transmission are connectionless. Furthermore, LTE V2X only supports groupcast transmission which is also connectionless. Considering that NR V2X requirements are much more diverse and stringent than that of LTE V2X, the AS connectionless transmission presents a number of challenges and might not be adequate in the context of NR V2X diverse and stringent requirements, for example, in terms of supporting a higher data rate, higher reliability and lower latency requirements. The following are some examples of challenges to meeting NR V2X requirements using AS connectionless transmission for unicast and groupcast. Note that throughout this disclosure, groupcast and multicast are used interchangeably.

1. Higher Protocol Overhead: with AS connectionless transmission, in order to allow delivery of the received V2X packets to the correct upper layer service access point (SAP) in the RX UE as well as allowing the SL RX UE to distinguish the different SL TX UEs, each V2X packet must carry the destination ID and the source ID. Furthermore, AS connectionless transmission with multiplexing of traffic in the MAC layer required each transmitted MAC PDU to carry an L2 destination ID and a source L2 ID so as to uniquely identify a logical channel within the context of a source and destination pair. For ProSe sidelink and V2X sidelink, each MAC PDU carry an L2 source ID and an L2 destination ID which are mapped to upper layer source ID and destination ID respectively to limit the overhead, however despite this mapping, each V2X packet transmission still incur an overhead of an L2 source ID and an L2 destination ID. While such protocol overhead was acceptable in the context of LTE V2X transmission with relatively low data rate transmission, such overhead might be excessive in the context of NR V2X.

2. Higher Processing overhead: the fact that each sidelink packet carries an L2 source ID and an L2 destination ID also means more packet filtering processing overhead in L2. For example, in LTE V2X, the RX PHY layer passes on to the RX L2 all successfully decoded V2X packets received on the configured RX resource pools, which are then filtered in L2 using the 24 bits long L2 destination ID and the 24 bits long L2 source ID, so only the V2X packet for this RX UE are passed on to the V2X upper layer. Similarly, for ProSe sidelink, the PHY layer must decode all the packets received on the configured RX resources, performs partial filtering based on the 8 LSB bits of the L2 destination ID in the SCI, and then passed on to the L2 the partially filtered packet, which are then further filtered in L2 based on the 16 MSB bits of the L2 destination ID and the 24 bits longs source L2 ID. While such processing overhead was acceptable in the context of LTE V2X transmission with relatively low data rate transmission, such processing overhead might be excessive in the context of NR V2X.

3. Hard to enable physical layer feedback: with AS connectionless transmission, there is no support for L2 feedback i.e. there is no support for RLC feedback and there is no support for HARQ feedback in legacy LTE ProSe or legacy V2X sidelink communication. There is no PHY layer UE specific identity (source or destination) such as C-RNTI or communication context dedicated to a specific UE in support of transmission of individualized feedback from RX UEs to TX UEs, which is significantly complicated to implement without connection-oriented transmission.

4. Hard to enable Link management to help meet QoS requirement: with AS connectionless transmission, it is impractical or impossible to enable UE specific radio link management functions such as radio link monitoring and radio link recovery, beam management, link adaptation (power control and rate control) and channel dependent scheduling. While the lack of these functions was acceptable for ProSe sidelink or V2X sidelink, NR V2X diverse and stringent requirements such as higher data rate coupled with higher reliability and lower latency require a more efficient radio resource management. In addition, the connection-based SL makes it easier to enable SL QoS control on per-QoS flow basis, and therefore provides the basis for a unified QoS handling over SL and Uu.

5. Inability to support differentiated configuration of RX UE: with AS connectionless transmission, it is not possible to configure RX UE with AS configuration that is specific to the RX UE for example, based on the RX UE capability. As a consequence, all ProSe sidelink features or LTE V2X sidelink features for a given release are mandatory for all the RX UE for that release. NR V2X requirements are diverse and it is not practical to impose that all NR V2 feature of any given release be mandatory for all NR V2X UEs of that release. AS layer connection-based SL transmission can enable more flexible SL radio protocol configuration.

In light of the above shortcomings of AS connectionless transmission in the context of NR V2X communication, support for AS connection-oriented transmission is desired for NR V2X unicast and for NR V2X groupcast as well.

Issues Related to Connection Oriented Unicast Transmission

In support of AS Connection oriented unicast transmission, the following issues need to be addressed.
1. Overall procedure for unicast connection establishment, connection modification/reconfiguration and connection release
2. Authorization and Provisioning of UE in support of connection oriented unicast transmission (in-coverage and out-of-coverage)
3. V2X provisioned information shared with gNB by the UE (UE assistance information) in support of unicast connection establishment, modification or release.
4. Triggers for unicast connection reconfiguration, connection release & connection relocation
5. SL AS protocol configuration including:
    a. Configuration of MAC, RLC (e.g., UM versus AM decision), PDCP, SDAP, radio resources/radio bearer, PHY configuration (e.g., HARQ including HARQ TX with feedback versus HARQ Tx without feedback, CSI, etc.) assuming one or more of the following: Flow based QoS versus per-packet based QoS, Mode 1 versus Mode 2 resource allocation
    b. AS-level information required to exchange among UEs via sidelink for SL unicast for e.g. UE ID, UE capability, Radio/Bearer configuration, PHY information/configuration (e.g. HARQ, CSI), Resource information/configuration and QoS info.
    c. Enhancement to Uu in support of SL connection management and QoS and what AS-level information required to exchange between UEs and gNB for SL unicast communication
    d. How is AS-level information exchanged between UEs via sidelink in support of unicast, RRC versus PC5 signaling details to be specified.
6. Admission control, how this is done, and which entity perform the admission control
7. UE Identifications configuration and coordination between TX UE and RX UE in support of unicast transmission. For example, in LTE ProSe sidelink unicast design, the UE needs to ensure that the Layer-2 ID for unicast communication is at least locally unique. To that effect the UE should be prepared to handle Layer-2 ID conflicts with adjacent UEs using unspecified mechanisms (e.g., self-assign a new Layer-2 ID for unicast communication when a conflict is detected). How to ensure the uniqueness for L2 IDs for unicast connection-oriented communication is an issue that needs to be addressed.
8. It is expected that a discovery procedure is used to identify a specific UE in order to initiate one-to-one communication. While the upper layer above the access stratum can indicate to the access stratum QoS related information and whether a communication should be unicasted, group casted or broadcasted, access stratum specific rules and criteria can need to be designed in deciding whether a unicast communication should be carried out connectionlessly or in a connection oriented manner. Furthermore, the issue of interactions between discovery and unicast connection management and how the output for discovery is used in support of unicast connection establishment, connection release or connection relocation decision needs to be addressed.

Issues Related to Connection Oriented Groupcast Transmission

Similarly, the issues described in the section entitled "Issues Related to Connection Oriented Unicast Transmission" above need to be addressed in relation with connection oriented groupcast transmission. Specifically, in support of AS Connection oriented groupcast transmission, the following issues need to be addressed.
1. Overall procedure for groupcast connection establishment, connection modification/reconfiguration and connection release
2. Authorization and Provisioning of UE in support of connection oriented groupcast transmission (in-coverage and out-of-coverage)
3. V2X provisioned information shared with gNB by the UE (e.g., UE assistance information) in support of groupcast connection establishment, modification or release.
4. Triggers for groupcast connection establishment for example between a group member and group lead, triggers for groupcast connection reconfiguration, connection release and connection relocation by a group member toward another group lead.
5. SL AS protocol configuration including:
    a. Configuration of MAC, RLC (e.g., UM versus AM decision), PDCP, SDAP, radio resources/radio bearer, PHY configuration (e.g., HARQ including HARQ TX with feedback versus HARQ Tx without feedback, CSI, etc.) assuming one or more of the following: flow based QoS versus per-packet based QoS, Mode 1 versus Mode 2 resource allocation.
    b. AS-level information required to exchange among UEs via sidelink for SL groupcast for e.g. UE ID, UE capability, radio/bearer configuration, PHY information/configuration (e.g., HARQ, CSI, etc.), resource information/configuration and QoS info.
    c. Enhancement to Uu in support of SL connection management and QoS and what AS-level information required to exchange between UEs and gNB for SL groupcast communication
    d. How is AS-level information exchanged between UEs via sidelink in support of unicast, RRC versus PC5 signaling details to be specified.
6. Admission control, how this is done, and which entity perform the admission control.
7. UE Identifications configuration and coordination between TX UE and RX UE in support of groupcast transmission. An RX UE can be involved in the reception of more than one groupcast communications. Similarly, a TX UE can be involved in the transmission of more than one groupcast communication. There is a need to ensure that the Layer-2 ID for groupcast communication is at least locally unique. How to ensure the uniqueness for L2 IDs for connection oriented groupcast communication is an issue that needs to be addressed.
8. It is expected discovery procedure is used to identify specific UE or group of UEs in order to initiate one-to-many communication. While the upper layer above the access stratum can indicate to the access stratum QoS related information and whether a communication should be unicasted, groupcasted or broadcasted, access stratum specific rules and criteria can need to be designed in deciding whether a groupcast communication should be carried out in connectionless manner or in a connection-oriented manner. Furthermore, the issue of interactions between discovery and groupcast connection management and how the output for discovery is used in support of groupcast connection establishment, connection release or connection relocation decision needs to be addressed. One question in connection to this is whether V2X group management is performed in the V2X upper layer only, or AS layer only or in both layers and if so, what is the relationship between AS group and V2X upper layer group? For example, if the UE members in upper layer group spread in a large geography, perhaps one single AS layer group cannot cover all the UE members and multiple AS layer groups are needed to enable successful communications among all the UEs in the upper layer UE group. For each AS group, member UE(s) could perform AS layer group connection establishment and maintenance with the AS group leader. When member UE(s) move around, release from original AS layer group and re-connection to another AS group is performed. Procedures, configurations and interaction between upper layer and AS layer for establishment and maintenance of AS groupcast connections and mapping to upper layer session/connection need to be designed and specified.

Summary of Proposed Solutions

In this disclosure, the following solutions in support of Unicast connection management are proposed:
1. Layer 2 protocol structure including the following:
   a new proposal to have one SDAP entity per V2X destination, and only QOS flow ID in the SDAP protocol header as no support for reflective QoS feature on the sidelink is required;
   MAC SDUs subject to connection-oriented transmission are separately multiplexed from MAC SDU subject to connectionless transmission;
   A MAC PDU subject to connection-oriented transmission doesn't carry source ID or destination ID;
   Support for sidelink multicast control channel and sidelink multicast transport channel;
2. Provisioning of V2X transmitter and Receiver;
3. Triggers for V2X Transmission or V2X reception;
4. Transmitter side and Receiver Side RAT and Interface selection, which entity performs the selection and based on what criteria;
5. Transmitter side and Receiver side Transmission mode selection and criteria for the selection
6. Unicast Connection Management detail procedures including description of assistance parameters from the UE (e.g., receiver capability), and unicast configuration parameters configured into the UE by the scheduling entity or an assisting UE in coordination with the scheduling entity.
7. Different alternatives of connection management procedure are described including the following options:
   Use PC5 RRC signaling to jointly carry V2X upper layer connection configuration and AS layer connection configuration, T-UE is configured by a scheduling entity or the I-UE in coordination with the I-UE; see FIG. 16;
   Use PC5-S signaling to jointly carry V2X upper layer connection configuration and AS layer connection configuration, T-UE is configured by a scheduling entity or the I-UE in coordination with the I-UE; see FIG. 17;
   Use PC5 RRC signaling to jointly carry V2X upper layer configuration information in support of AS layer connection, and AS layer connection configuration; T-UE is configured by the scheduling entity or the I-UE in coordination with the I-UE; Additionally, the V2X upper layer connection configuration is carried out independently from the AS connection configuration using PC5-S signaling; see FIG. 18;
   Use PC5-S Signaling to jointly carry V2X upper layer configuration information in support of AS layer connection, and AS layer connection configuration; I-UE is configured by the scheduling entity or the T-UE in coordination with the I-UE; Additionally, the V2X upper layer connection configuration is carried out independently from the AS connection configuration using PC5-S signaling; see FIG. 19;
   Use PC5-S signaling to jointly carry V2X upper layer connection configuration and AS layer connection configuration, I-UE is configured by a scheduling entity or the T-UE in coordination with the scheduling entity; see FIG. 20;
   Use PC5 RRC signaling to jointly carry V2X upper layer connection configuration and AS layer connection configuration, I-UE is configured by a scheduling entity or the T-UE in coordination with the scheduling entity; see FIG. 21;
8. Group Connection Configuration and idea of V2X upper layer group mapping to AS layer subgroups, maintenance in AS of mapping table and indication by AS to PHY of one or more of the following:
   The group layer-2 destination ID;
   List of V2X UE ID (e.g., ProSe UE ID, UE ID or any other identifier that can be used by the UE as a source ID for the member UE) of the group members;
   The subgroup layer-2 destination ID;
   List of V2X UE ID (e.g., ProSe UE ID, U ID or any other identifier that can be used by the UE as a source ID for the member UE) of the subgroup members;
   For each subgroup, an indication requesting that data received for the subgroup is relayed or not relayed.
9. Broadcast configuration and various options for broadcast configuration signaling.
10. Methods for UE handling of multiple simultaneous sidelink RRC connections.
11. Modeling of PC5 Unicast Link granularity, Unicast Link Update and Unicast Link Addition Procedures UE Operation Before V2X Communication Layer 2 Protocol Structure The NR V2X Layer-2 sidelink structure is depicted in FIGS. 6, 7, 8, and 9.

Figure 6:
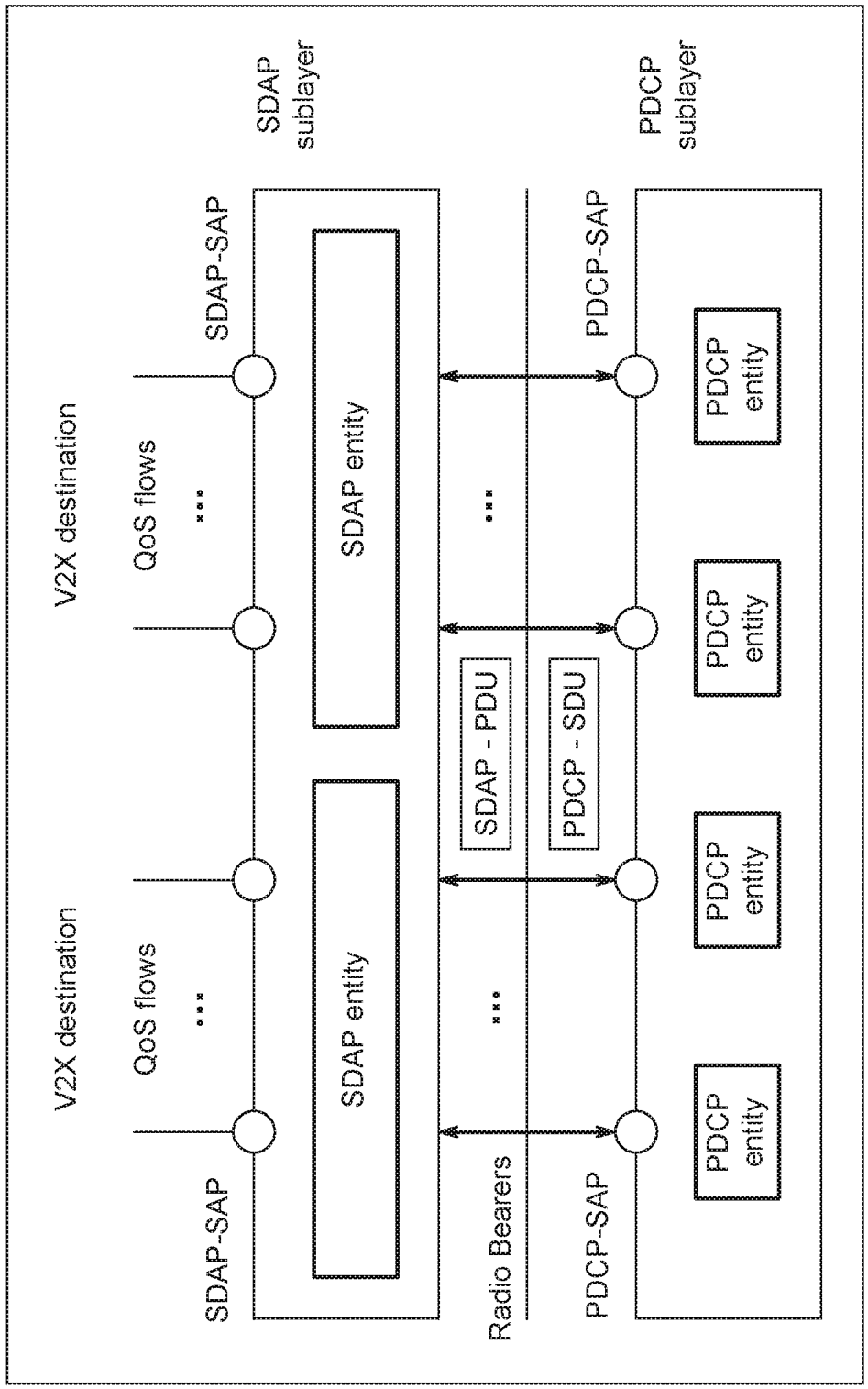
FIG. 6 shows a SDAP sublayer structure for V2X sidelink communications in accordance with an exemplary embodiment.

FIG. 6 provides an illustration of the Service Data Adaptation Protocol (SDAP) sublayer. It is proposed that there is one SDAP entity per V2X destination. In one embodiment, V2X the destination can be a peer V2X UE Destination. In such embodiment, if a UE has concurrent V2X communication with n peer V2X UEs, the UE then maintains n SDAP entities, one per peer V2X destination UE. Each SDAP entity maintains a set of bearers specific to a peer V2X destination UE. As there might be multiple concurrent V2X services between a UE (in this case the source UE) and a peer V2X destination UE, the L2 destination IDs to which those services mapped to and the radio bearers associated with those services are mapped to the same SDAP entity associated with this specific peer V2X destination UE. A V2X packet associated with a given peer V2X destination UE, regardless of the transmission cast type (i.e. unicast, groupcast or broadcast), is mapped to the SDAP entity to which the corresponding bearer or destination Layer-2 ID is mapped to. In the case of broadcast or groupcast, even if the peer V2X destination UE is not explicitly known to the AS, the corresponding bearer and the associated layer-2 destination ID can be mapped to any SDAP entity; or alternatively, there can be one or more SDAP entities dedicated to support broadcast communication, or one or more SDAP entities to support groupcast communication, or one or more to support both groupcast and broadcast communication.

In another embodiment, the services can be arranged in groups which are (pre)configured or provisioned into the UE. In this embodiment, V2X destination in FIG. 6 refers to one group of V2X services.

In an alternative embodiment, there can be one SDAP entity per UE for V2X sidelink communication. In such a case, V2X communication bearer identity can need to be unique within the UE.

Figure 7:
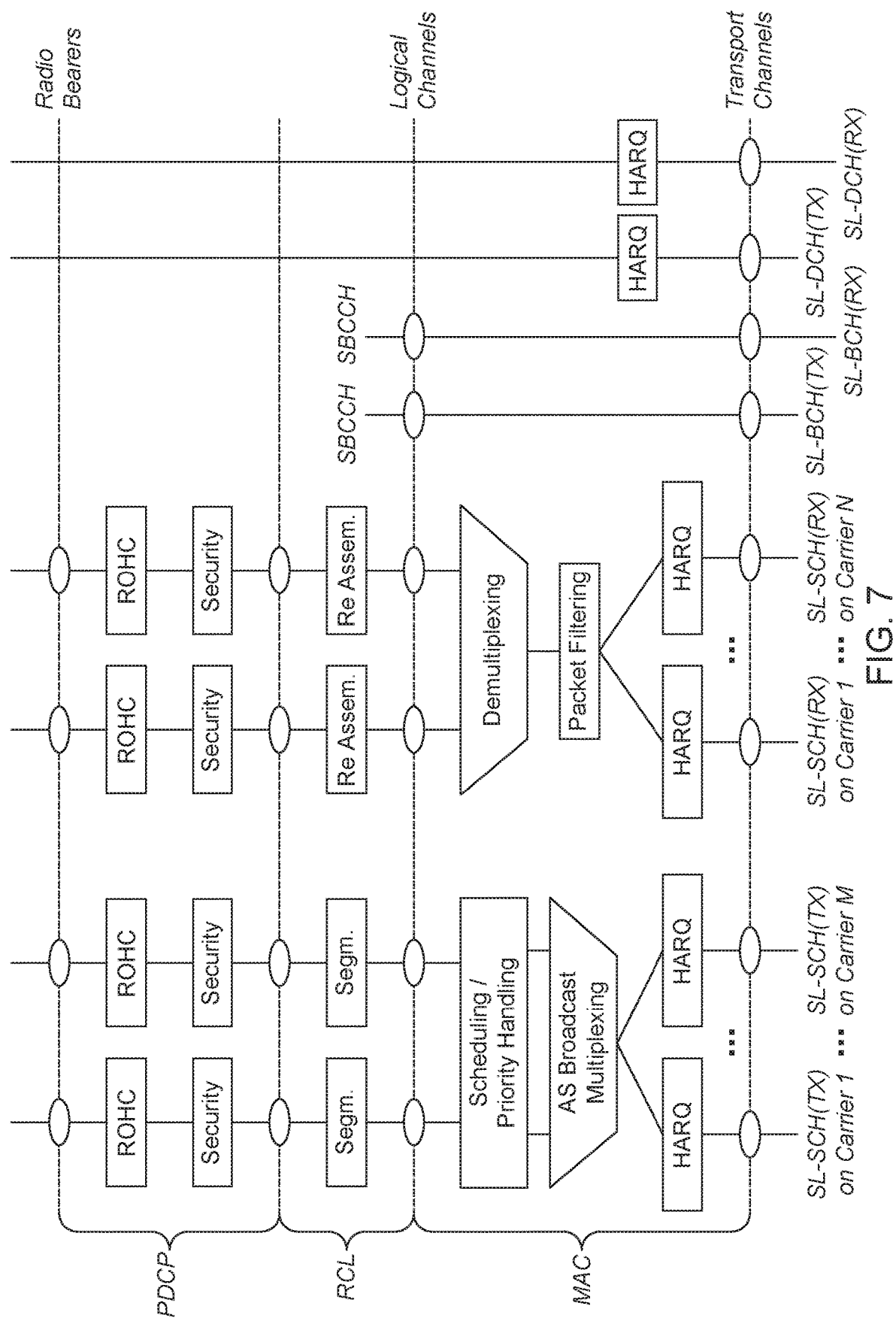
FIG. 7 shows an L2 structure for V2X sidelink communications in accordance with an exemplary embodiment.

FIG. 7 depicts the layer-2 structure in support of V2X communication in AS broadcasting configuration as well as mapping of sidelink broadcast control channel (SBCCH) to the transport sidelink broadcast channel (SL-BCH). The multiplexing of sidelink traffic logical channel (STCH) on the transport sidelink shared channel (SL-SCH) assumes each MAC PDU include a source ID and a destination ID, with respect to which a logical channel identification is unique in support of MAC multiplexing. It is also proposed to introduce a sidelink control channel (SCCH) which can be multiplexed with logical STCH on to the SL-SCH. It is also proposed to introduce a sidelink signaling radio bearer (SL-SRB) to which logical channel such as SCCH can be mapped to. The SL-SRB can be used for the signaling of connection management (e.g., connection establishment, connection reconfiguration or connection release) or for configuration and reporting of sidelink measurements.

Figure 8:
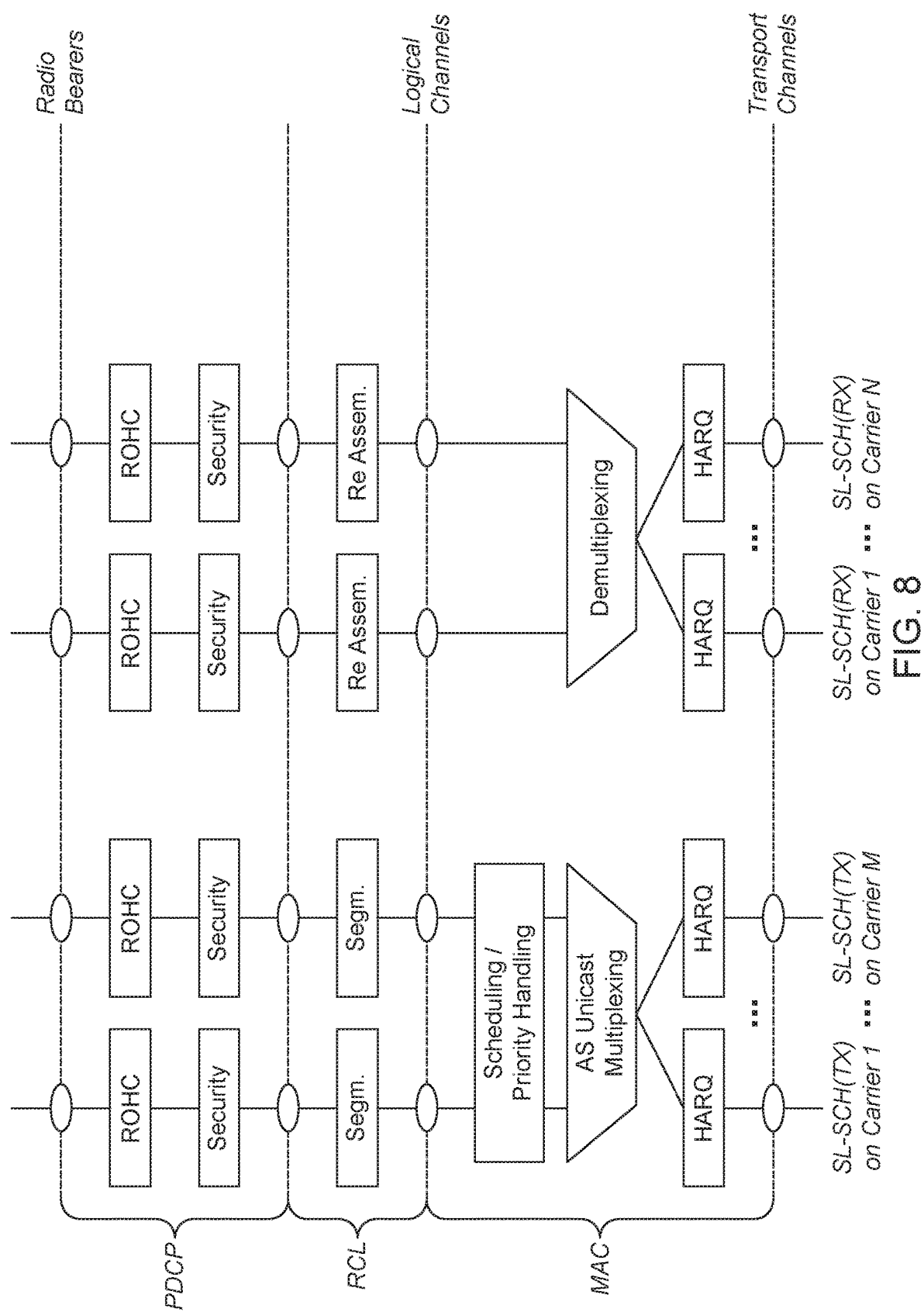
FIG. 8 shows an L2 structure for V2X sidelink communications in accordance with an exemplary embodiment in accordance with an exemplary embodiment.

FIG. 8 depicts the layer-2 structure in support of V2X communication in AS unicast connection-oriented configuration, with peer V2X receiver configured with dedicated unicast V2X configuration that takes into account, e.g., the peer V2X UE capability. In this case, the multiplexing of sidelink traffic logical channel (STCH) onto the transport sidelink shared channel (SL-SCH) doesn't assume that each MAC PDU includes a source ID and a destination ID, with respect to which a logical channel identification is unique in support of MAC multiplexing. Instead, multiplexing on STCH assumes a separate instance of SL-SCH is configured at the connection establishment and binded to a HARQ entity dedicated to transmitting V2X unicast traffic or SL-RRC signaling in AS connection-oriented manner. At the connection establishment, a MAC service access point (SAP) for each instance of SL-SCH is created and communicated to the PHY, which then creates and maintains the corresponding instance of the PHY channel (e.g., physical sidelink shared channel, PSSCH) associated with the instance of the SL-SCH indicated by MAC. As part of the connection context, for each V2X service or data radio bearer included into the context of the connection, a Layer-2 destination ID mapped to the V2X service is maintained with association to the logical channel and the corresponding radio bearer. In this scheme and in support of PHY layer multiplexing of traffic into shared channel, for each of the two V2X UEs involved in the connection, a physical layer (PHY) unique identifier, e.g., a PC5 sidelink RNTI that identifies both V2X UEs for the purpose of connection-oriented reception can be assigned to each of the peer UEs and configured into both peer UEs. Alternatively, each of the peer UEs can autonomously derive their own PHY identifier and exchange with each other as part of the connection configuration. The TX UE uses the peer RX V2X UE PHY identifier to identify the peer V2X UE the data is destined to. For example, the TX UE can scramble or mask the transmitted data with the peer RX V2X UE PHY identifier. The RX UE uses its PHY identifier that has been used by the transmitter to identify the RX UE of the data. Once decoded, the RX UE is in position to correctly route the received data to the correct MAC SAP based on the association created at the connection establishment between PHY and the MAC SAP. In an alternative option where there is no PHY layer multiplexing, e.g., traffic from a peer V2X UE is carried on dedicated PHY resources (pre)configured or provisioned into the UE, a PHY identifier that uniquely identifies peers UE involved in the connection might not be required. In this case, the RX UE identifies the peer V2X transmitting UE and the correct routing SAP in MAC based on the PHY resources on which the V2X packet is received. The AS can provide to the PHY the peer V2X UE source ID (e.g., in the case of unicast) or the peer V2X UE destination layer-2 ID (e.g., ProSe Layer-2 Group ID like or ProSe Application Layer Group ID) in the case of groupcast. The PHY can use such ID to derive the RNTI used to identify the peer V2X UE the transmission is destined to. Furthermore, as part of the connection configuration, logical channels carrying control information (e.g., SCCH) mapped to sidelink signaling radio bearers (SL-SRB) can be multiplexed with logical channel carrying sidelink traffic (STCH) mapped to sidelink data radio bearer (SL-DRB), onto the SL-SCH transport channel configured for connection-oriented reception. For unicast, it is proposed that a logical SL control channel denoted sidelink control channel (SCCH) be introduced for the configuration and control of unicast traffic. SCCH can be associated with an SL-SRB. The SL-SRB that SBCCH is mapped to can be denoted SL-SRB0. The SL-SRB that SCCH is mapped to and transmitted in broadcasted manner (AS connectionless), can be denoted SL-SRB1. The SL-SRB that SCCH is mapped to, and transmitted in connection-oriented manner can be denoted SL-SRB2.

Figure 9:
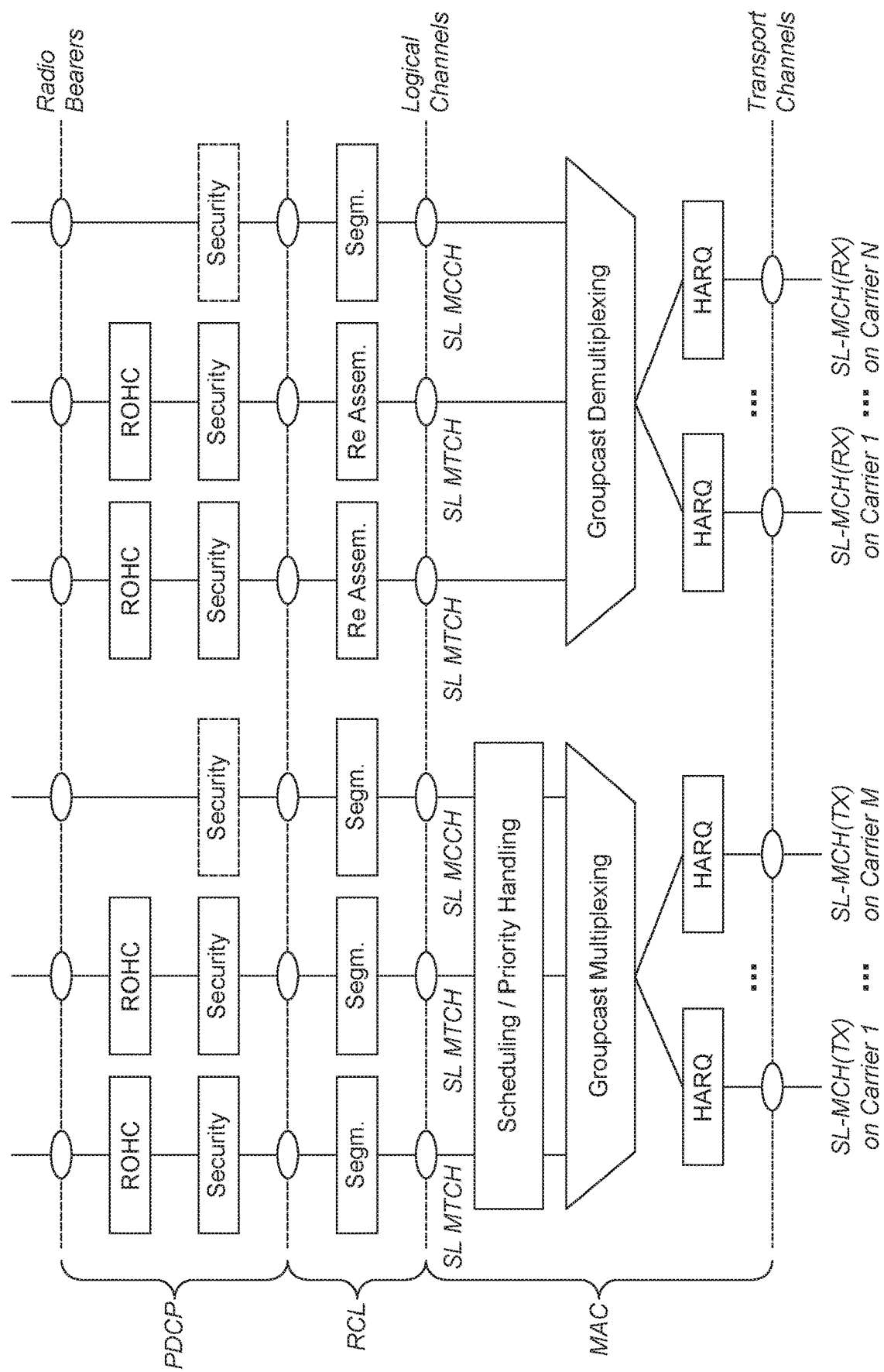
FIG. 9 shows an L2 structure for V2X sidelink communications in accordance with an exemplary embodiment.

FIG. 9 depicts the layer-2 structure in support of V2X communication in AS groupcast connection-oriented configuration, with peer V2X receiver configured with dedicated groupcast V2X configuration that takes into account, e.g., the peer V2X UE capability. In this case, the multiplexing of sidelink traffic logical channel (e.g., SL-MTCH) onto the transport sidelink shared channel (SL-MCH) doesn't assume that each MAC PDU includes a source ID and a destination ID, with respect to which a logical channel identification is unique in support of MAC multiplexing. Instead, multiplexing on SL-MCH assumes a separate instance of SL-MCH configured at the connection establishment and binded to a HARQ entity dedicated to transmitting V2X groupcast traffic or SL-RRC signaling in AS connection-oriented manner. At the connection establishment, a MAC service access point (SAP) for each instance of SL-MCH is created and communicated to the PHY, which then creates and maintains the corresponding instance of the PHY channel (e.g., physical sidelink shared channel, PSMCH) associated with the instance of the SL-MCH indicated by MAC. As part of the connection context, for each V2X service or data radio bearer included into the context of the connection, a Layer-2 destination ID mapped to the V2X service is maintained with association to the logical channel and the corresponding radio bearer. In this scheme and in support of PHY layer multiplexing of traffic into multicast channel, for each of the TX V2X UE and the RX group member UEs involved in the connection, a physical layer (PHY) unique identifier, e.g., a PC5 sidelink RNTI that identifies the TX V2X UE and a physical layer unique identifier that identifies the RX group member UEs for the purpose of connection-oriented reception can be assigned to each of the UEs part of the group and configured into the UEs. Alternatively, each of the peer UEs can autonomously derive their own PHY identifier and exchange with each other as part of the connection configuration. The TX UE uses the peer RX V2X UE PHY group identifier to identify the peer V2X group member-UEs the data is destined to. For example, the TX UE can scramble or mask the transmitted data with the peer RX V2X group member-UEs PHY identifier. The RX UE uses its PHY group identifier that has been used by the transmitter to identify the RX UE of the data. Once decoded, the RX UE is in position to correctly route the received data to the correct MAC SAP based on the association created at the connection establishment between PHY and the MAC SAP. In an alternative option where there is no PHY layer multiplexing for groupcast traffic, e.g., groupcast traffic is transmitted on dedicated PHY resources (pre)configured or provisioned into the UE, a PHY group identifier that uniquely identifies peers UE involved in the connection might not be required. In this case, the RX member-UEs identifies the groupcast traffic the correct routing SAP in MAC based on the PHY resources on which the groupcast traffic is received. The AS can provide to the PHY, the UE own source ID, as well as the peer V2X UE source ID (e.g., in support of unicast) or the peer V2X UE destination layer-2 ID (e.g., ProSe Layer-2 Group ID like or ProSe Application Layer Group ID), for example, in the case of groupcast communication. The PHY can use such an ID to derive the RNTI used to identify the peer V2X UE the transmission is destined to. Furthermore, as part of the connection configuration, logical channels carrying sidelink multicast control information (e.g., SL-MCCH) mapped to sidelink signaling radio bearers (SL-SRB) can be multiplexed with logical channel carrying sidelink multicast traffic (SL-MTCH) mapped to sidelink data radio bearer (SL-DRB), onto the SL-MCH transport channel configured for connection-oriented reception. For groupcast, a logical sidelink control channel denoted sidelink multicast control channel (SL-MCCH) can be introduced for the configuration and control of groupcast traffic. MCCH cancan be associated with a SL-SRB. The SL-SRB that SBCCH is mapped to cancan be denoted SL-SRB0. The SL-SRB that MCCH is mapped to and transmitted in broadcasted manner (AS connectionless), cancan be denoted SL-SRB1. The SL-SRB that MCCH is mapped to and transmitted in connection-oriented manner cancan be denoted SL-SRB2.

Figure 10:
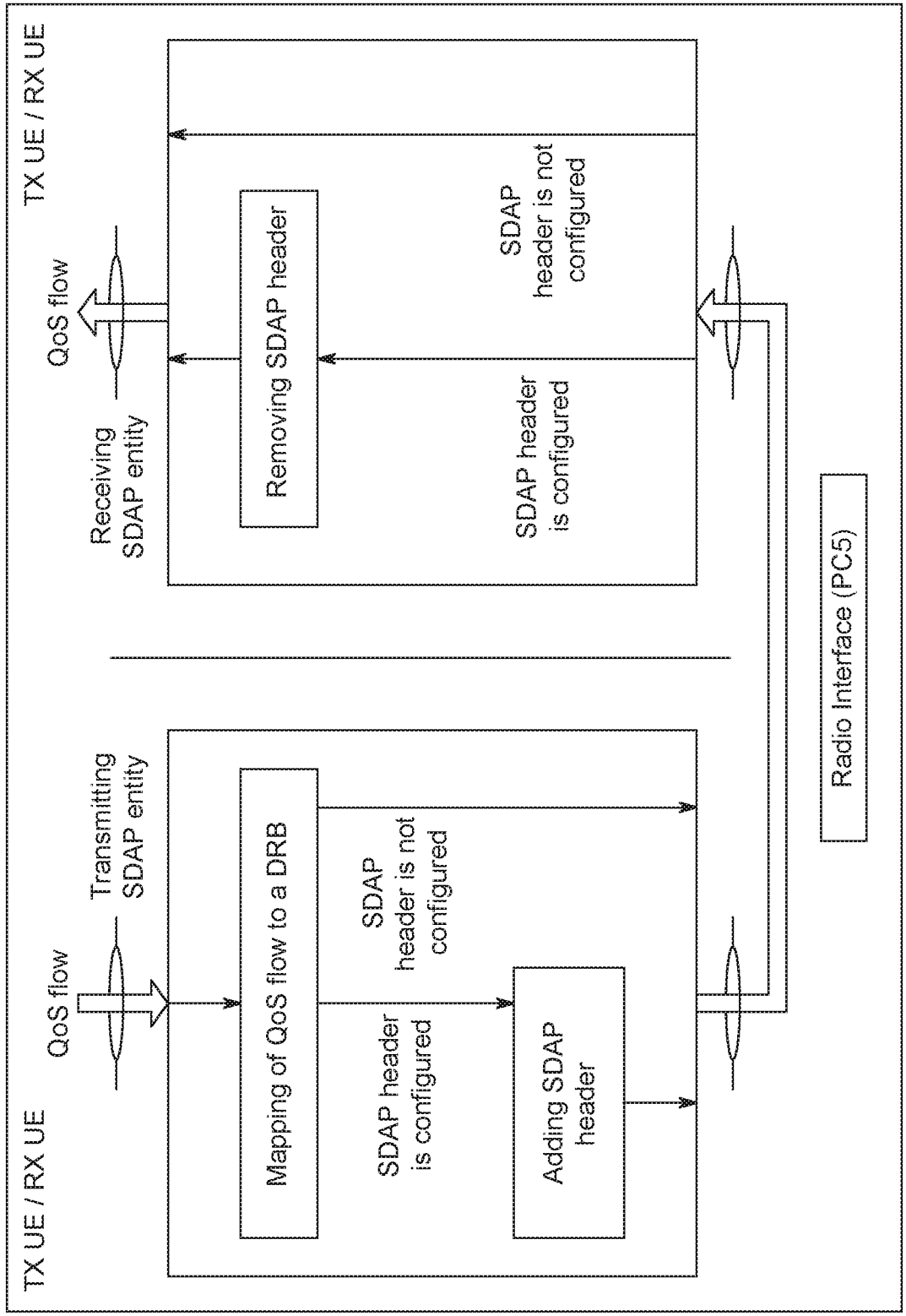
FIG. 10 shows an SDAP layer functional view for V2X sidelink communications in accordance with an exemplary embodiment.
Figure 11:
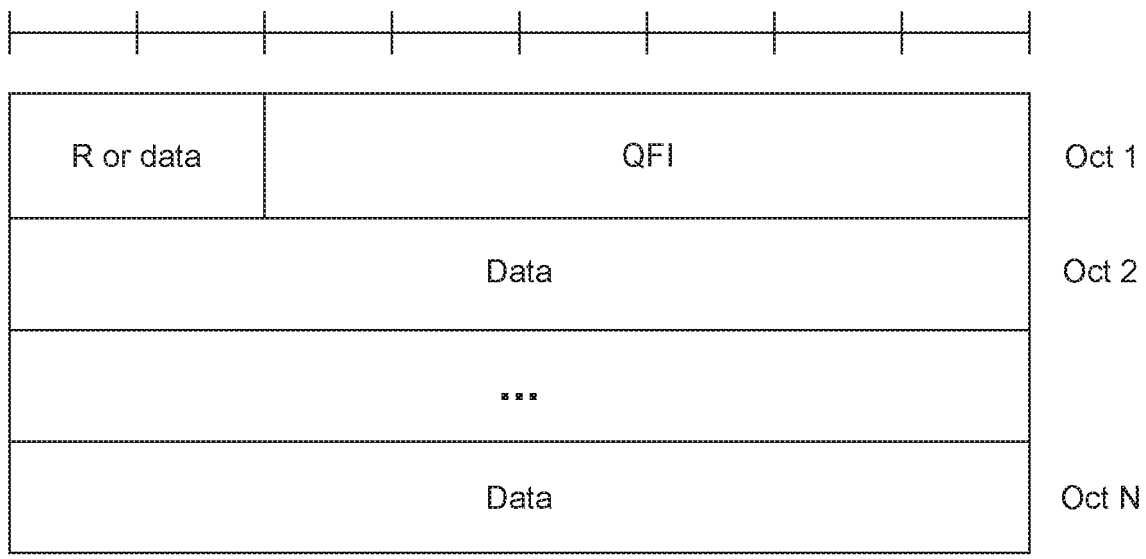
FIG. 11 shows a UL or DL sidelink SDAP data PDU format with an SDAP header in accordance with an exemplary embodiment.

FIG. 10 provides a functional view of SDAP sublayer. It is proposed that reflective QoS is not supported in V2X sidelink. As illustrated in FIG. 11, it is therefore proposed to simplify the SDAP header and made the header identical between downlink and uplink. The QoS Flow Identifier (QFI) can be 6 bits or less, while the remaining bit of the header can be reserved bits or can be used to carry data thereby minimizing overhead of support for QoS Flow over V2X sidelink.

Transmitter Operation

Figure 12:
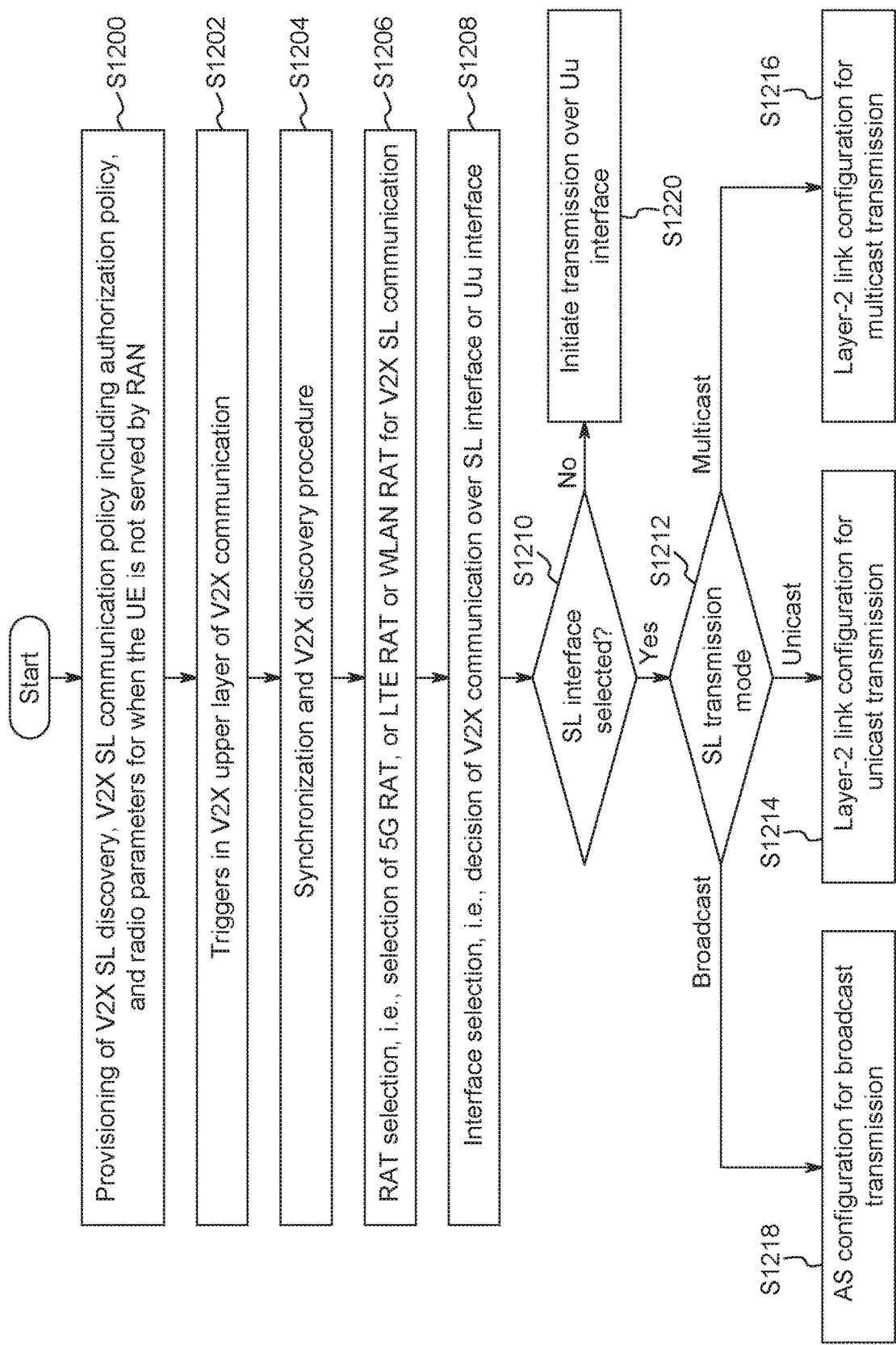
FIG. 12 shows a method for transmission side V2X communications in accordance with an exemplary embodiment.

An exemplary Transmitter side high level illustration of UE operation, including intermediate procedures in the UE leading to the decision for V2X communication either by AS broadcast, AS unicast or AS groupcast is provided in FIG. 12.

In step S1200, the UE is either pre-configured (in SIM or ME), or provisioned by the V2X control function located in the core network with information in support of V2X operation, i.e., discovery procedure whereby the UE discovers other devices for V2X communication, and for V2X communication whereby the UE engages in communication with other V2X devices as required by V2X applications running on the V2X devices. Communication between the UE and the V2X Control function for provisioning of V2X operation parameters can be through user plane or through control plane. Provisioning parameters for NR V2X operation and particularly in support of unicast communication or groupcast communication are described in the section below entitled "Provisioning for Transmitter Side V2X Communication." With V2X communication triggered in step S1202, the UE can perform synchronization if not already synchronized in step S1204. The UE furthermore can perform discovery in order to identify a peer UE or group of UEs it can communicate with as dictated by the triggering condition of the communication for e.g., an application in the application layer can trigger the V2X upper layer to discover a peer UE or group of UEs if not discovered yet and initiate V2X communication toward such UE or group of UEs. The output from the discovery procedures, e.g., the Layer-2 link ID(s) of the discovered UE or group of UEs can be used by the UE in subsequent procedure(s) of the V2X operation, such as connection establishment toward specific UE or group of UEs or configuration of broadcast resource for V2X transmission. In steps S1206 and S1208, the UE performs RAT selection and interface (e.g., sidelink versus Uu interface) selection. While step S1206 and step S1208 are listed as separate steps, the two steps can be performed concurrently, as described below in the section entitled "Transmitter Side RAT Selection and Interface Selection." In step S1210, it is determined whether the SL interface is selected. If yes, it is determined what the SL transmission mode is (step S1212). If the SL transmission mode is a broadcast mode, AS configuration for broadcast transmission is performed in step S1218. If the SL transmission mode is a unicast mode, Layer-2 link configuration for unicast transmission is performed in step S1214. If the SL transmission mode is a multicast mode, Layer-2 link configuration for multicast reception is performed in step S1216. In step S1210, if the SL interface is not selected, transmission over Uu interface is initiated (step S1220).

Provisioning for Transmitter Side V2X Communication

In support of unicast transmission, groupcast transmission, broadcast transmission, or flow based QoS, the NR V2X UE can be pre-configured or provisioned with the following system parameters; the configuration can be on per-interface basis, e.g., NR sidelink interface, NR Uu interface, LTE sidelink interface, LTE Uu interface, WLAN sidelink interface or WLAN to network interface:

List of authorized V2X Services and for each service, the transmission mode (transmission cast type), i.e., whether the service is broadcast based transmission, groupcast based transmission or unicast based transmission; the transmission mode of a service can be defined on PLMN or group of PLMNs basis, or on cell or group of cells basis or on geographical area or group of geographical areas basis.

List of authorized V2X Services and for each service, whether the transmission is V2X upper layer connectionless or V2X upper layer connection oriented. For example, a broadcast transmission can be a connectionless transmission while a unicast transmission or groupcast transmission can be connection-oriented transmission, or connectionless transmission at the V2X upper layer.

List of authorized V2X Services and for each service, whether the transmission is AS layer connectionless or V2X AS layer connection oriented. For example, a broadcast transmission can be a connectionless transmission while a unicast transmission or groupcast transmission can be connection-oriented transmission, or connectionless transmission at the AS layer.

Authorization to act as a scheduler or scheduling entity for other UEs, or local controller or a scheduler node. Such authorization can be defined on PLMN basis or group of PLMNs basis, on a cell basis, on a group of cells basis or on a geographical area basis or a group of geographical area basis. In this disclosure, the terms local controller, scheduling entity or scheduler entity will be used interchangeably. For example, a platoon lead can be provisioned with the authorization to act as a scheduling entity. Such authorization can also be defined on a service basis or group of services basis.

Authorization to act as assisting UE to a scheduling entity. Such authorization can be defined on PLMN basis or group of PLMNs basis, on a cell basis, or on a group of cells basis, on a geographical area basis or group of geographical area basis.

Authorization for duplication across radio interface, i.e., transmission of the same data across two or more radio interfaces, e.g., across two or more of the following radio interfaces: NR sidelink interface, NR Uu interface, LTE sidelink interface, LTE Uu interface, WLAN sidelink interface or WLAN to network interface. Such duplication can be defined based on a reliability requirement, e.g., ProSe Per-Packet Reliability value in the case of per-packet based QoS model or Packet Error Rate or QoS Identifier value in the case of QoS Flow or bearer based QoS model. Such authorization can be defined on per service basis. Furthermore, such authorization can be defined on cell or group of cells basis, or per geographical area or group of geographical areas basis, or on per PLMN or group of PLMNs basis. In the context of V2X we will denote QoS Identifier V2X QoS Identifier (VQI).

List of V2X QoS Identifiers. For each VQI, the corresponding QoS profile parameters can be configured. The QoS profile can include one or more of the following: priority level (i.e., scheduling priority level), payload, transmission rate, maximum end-to-end latency, reliability, data rates, minimum required communication range, pre-emption priority level (i.e., admission pre-emption priority level). In another alternative, the QoS profile can include one or more of the following: priority level (i.e., scheduling priority level), resource type (e.g., GBR, Delay critical GBR or Non-GBR), packet delay budget, packet error rate, averaging window, maximum data burst volume. This configuration can be defined on per PLMN or group of PLMNs basis, on a cell or group of cells basis, on per geographical area or group of geographical areas basis.

List of QoS Flow Identifiers (QFI). For each QFI, the mapping between QFI and VQI. A QoS Flow is the finest granularity of QoS differentiation. This configuration can be defined on per PLMN or group of PLMNs basis, on a cell or group of cells basis, on per geographical area or group of geographical areas basis.

Resource pool configuration for connection-oriented transmission and signaling in support of those connections.

Resource pool configuration for PC5 signaling or SL RRC signaling in support of connection establishment and maintenance of that connection. Such a resource pool can be a shared resource pool that is also used for connectionless PC5 data transmission.

Each of the provisioning parameters defined above can be defined on the basis of whether or not the UE is served by a radio access network or not served by a radio access network. Furthermore, when not served by a radio access network, the provisioning parameters can be configured on the basis of whether the carrier frequency for V2X communication is operator managed, or non-operator managed.

The UE can also be preconfigured (e.g., on the SIM or Mobile Equipment (ME)) with the following capability parameters:

Support of AS based unicast transmission

Support of AS based groupcast transmission

Support for V2X UpL based unicast transmission

Support for V2X UpL based groupcast transmission

Support for AS connectionless transmission

Support for AS connection-oriented transmission

Support of cross radio interface packet duplication

Support of capability to act as a scheduling entity.

Support of capability to act as an assisting UE to a scheduler entity

Support for QoS flow based QoS Model, e.g., the capability to support a QoS model where QoS requirement for packets transferred from V2X upper layer to V2X AS is indicated using QoS Flow.

Support for Per-Packet QoS mode, e.g., the capability to support a QoS model where each packet transferred from V2X upper layer to V2X AS carried its QoS requirement, e.g. PPPP or PPPR.

Transmitter Side Triggers for V2X Communication

In the context of the high-level illustration of V2X operation described in FIG. 12, one or more of the following events can trigger V2X communication procedure including connection establishment procedure in the UE:

Submission of V2X packet by a V2X application for transmission. In this case, the procedure is triggered as the result of an event originating from the application layer;

Trigger of discovery by the application layer;

Communication quality of current/existing V2X communication no longer meets quality threshold. The quality threshold can be related to one or more QoS profile metrics (e.g., packet error rate, latency, reliability, communication range, etc.). In this case, the V2X upper layer of V2X UE can initiate communication toward another UE or group of UEs in order to continue the V2X communication initiated by the application layer;

Radio link Failure or beam failure or failure of beam failure recovery. In this case, the V2X upper layer of V2X AS can initiate communication toward another UE or group of UEs in order to continue the V2X communication initiated by the application layer;

Radio Link quality no longer meets quality threshold;
Congestion is above threshold;
Transmit Power is above threshold or pathloss is above threshold;
Mobility events in which case the V2X upper layer of V2X AS can initiate communication toward another UE or group of UEs in order to continue the V2X communication initiated by the application layer. The mobility events can be related to the UE own mobility or can be related to peer UE mobility;
Reception of connection release for example from a peer UE or from a scheduling entity controlling resource allocation to the UE;
Reception of connection establishment request from a peer UE or from a scheduling entity controlling resource allocation to the UE;
Reception of handover request from a peer UE or from a scheduling entity controlling resource allocation to the UE;
Failure of connection reconfiguration.

The V2X upper layer can trigger the V2X Communication operation described in FIG. 12. Similarly, the V2X AS layer can trigger the V2X Communication operation described in FIG. 12.

Transmitter Side RAT Selection and Interface Selection

The V2X upper layer can perform RAT selection or interface selection. The V2X upper layer can perform sequentially or concurrently, RAT selection and interface selection. The V2X AS can provide assistance information such as availability information to the V2X upper layer for the selection of the RAT or the interface. For example, the AS of a RAT can determine the availability of that RAT. Furthermore, the AS can determine the availability of the interface in connection with a particular RAT. In an exemplary embodiment, the RAT can be one or more of the following: NR RAT, LTE RAT, Wi-Fi or WLAN RAT. Similarly, the interface can be one or more of the following: sidelink NR RAT, Uu RAT, sidelink LTE RAT, Uu LTE RAT, sidelink Wi-Fi or WLAN RAT, and the radio interface between WLAN and the network. The AS can determine the availability of a RAT or of an interface associated with a particular RAT, based on one or more of the following:

Communication quality threshold. The quality threshold can be related to one or more QoS profile metrics (e.g., packet error rate, latency, reliability, communication range, etc.);
Radio link quality threshold;
Congestion threshold. The congestion threshold can be related, for example, to channel busy ratio (CBR) and/or channel occupancy ratio (CR);
Radio link Failure or beam failure or failure of beam failure recovery.
Out-of-coverage or partially out of coverage detection;
Anticipated transmit power threshold or pathloss threshold;
UE capability.

The availability information can include one or more of the following information:
Available or not available;
Communication quality threshold
Radio link quality threshold
Congestion threshold
Out-of-coverage or partially out of coverage detection
UE Capability Transmitter Side Communication Mode Selection The V2X upper layer can perform transmission cast type selection, i.e., broadcast versus groupcast versus unicast and indicate the selected transmission cast type to the V2X AS layer. The V2X upper layer can indicate to the V2X AS layer, the transmission cast type of each packet submitted to the AS layer. Such approach can be considered per-packet transmission cast type indication to the V2X AS layer by the V2X upper layer. The V2X upper layer can use the per-packet transmission cast type indication, e.g., in association with the per-Packet QoS specification. In an alternative embodiment, the V2X upper layer and the AS layer can specify service access point (SAPs) for each transmission cast type. For each example, for each transmission cast type (i.e., unicast, groupcast or broadcast), the AS layer exposes to the V2X upper layer, one or more transmission cast type specific SAP. The V2X upper layer, submit to the AS layer SAPs, packets according to the transmission cast type. The AS derives the transmission cast type of a packet from the SAP through which the packet is submitted to the AS. The V2X AS layer transmits packets received through a specific V2X upper layer SAP according to the transmission cast type associated with that SAP through which the packet is received from the upper layer.

The V2X upper layer can establish connection in support of a secure Layer-2 link and create a V2X upper layer context for such a connection with an association (including security association) between a source ID and destination ID. From the V2X upper layer perspective, transmission can therefore be connection oriented in which case a Layer-2 link connection context is maintained by the V2X upper layer, or the transmission can be connectionless with no context created and associated between the source and the destination before transmission begins. The V2X upper layer can indicate to the V2X AS, when a Layer-2 link connection exists. The AS layer can decide to create an AS level connection and associate the context of such connection with an upper layer connection context in the UE. The AS context of AS connection can include connection-oriented AS protocol stack configuration, and security association between the source and the destination. Alternatively, the AS may not create an AS level connection for a specific V2X upper layer connection. In such a case, the upper layer packets submitted to the AS from upper layer connection-oriented SAP for transmission, can be transmitted in a connectionless manner at the AS level for example through broadcast transmission at the AS layer level.

Mechanism that the V2X Upper Layer Decides to Use Unicast Versus Groupcast Versus Broadcast Transmission The V2X upper layer can decide to use a transmission cast type based on one or more of the following:
Indication from Application layer;
Communication quality threshold. The quality threshold can be related to one or more QoS profile metrics (e.g., packet error rate, latency, reliability, communication range, scheduling priority, pre-emption priority, etc.);
Service type or Traffic Type for e.g. signaling versus application data;
Service Authorization configuration;
Capability;
Destination ID, or number of destination UEs;
Configuration into the UE, including pre-configuration (e.g., ME, SIM), provisioning into the UE by the network, e.g., V2X control function or configuration into the UE by the scheduling entity. The configuration can include mapping of service to transmission cast type.

Link Quality

Mechanism that the AS Layer Decides to Use Unicast Versus Groupcast Versus Broadcast Transmission The V2X AS layer can decide to use a transmission cast type based on one or more of the following:

Indication from V2X Upper layer;
Communication quality threshold. The quality threshold can be related to one or more QoS profile metrics (e.g., packet error rate, latency, reliability, communication range, etc.);
Service type or Traffic Type (e.g., signaling versus application data);
Service Authorization configuration;
Capability, (e.g., capability of the UE, capability of peer V2X UE, capability of scheduling entity, capability of gNB or the network, etc.);
Destination ID or number of destination UEs;
Configuration into the UE, including pre-configuration (e.g., ME, SIM), provisioning into the UE by the network, e.g., V2X control function or configuration into the UE by the scheduling entity. The configuration can include mapping of service to transmission cast type;
Radio Link quality.

Mechanism that V2X Upper Layer Decides to Use Connection Oriented Versus Connectionless The V2X upper layer can decide to use connection-oriented transmission or connectionless transmission based on one or more of the following:

Indication from Application layer;
Communication quality threshold. The quality threshold can be related to one or more QoS profile metrics (e.g., packet error rate, latency, reliability, communication range, etc.);
Service type or Traffic Type (e.g., signaling versus application data);
Service Authorization configuration;
Capability, e.g., capability of the UE, capability of peer V2X UE, capability of scheduling entity, capability of gNB or the network;
Destination ID, or number of destination UEs;
Configuration into the UE, including pre-configuration (e.g., ME, SIM, etc.), provisioning into the UE by the network, e.g., V2X control function or configuration into the UE by the scheduling entity. The configuration can include mapping of service to transmission cast type.
Link Quality
Security requirement (e.g., security thresholds). The security requirement can be authentication, integrity or ciphering related requirement.

Next, it will be described how the AS layer decides to use connection oriented versus connectionless. The V2X AS layer can decide to use a transmission cast type based on one or more of the following:

Indication from V2X Upper layer;
Communication quality threshold. The quality threshold can be related to one or more QoS profile metrics (e.g., packet error rate, latency, reliability, communication range, etc.);
Service type or Traffic Type (e.g., signaling versus application data);
Service Authorization configuration;
Capability (e.g., capability of the UE, capability of peer V2X UE, capability of scheduling entity, capability of gNB or the network, etc.);
Destination ID or number of destination UE;
Configuration into the UE, including pre-configuration (e.g., ME, SIM, etc.), provisioning into the UE by the network (e.g., V2X control function or configuration into the UE by the scheduling entity). The configuration can include a mapping of a service to a transmission cast type;
Radio Link quality;
Security requirement (e.g., security thresholds). The security requirement can be integrity or a ciphering related requirement.

Receiver Operation

Figure 13:
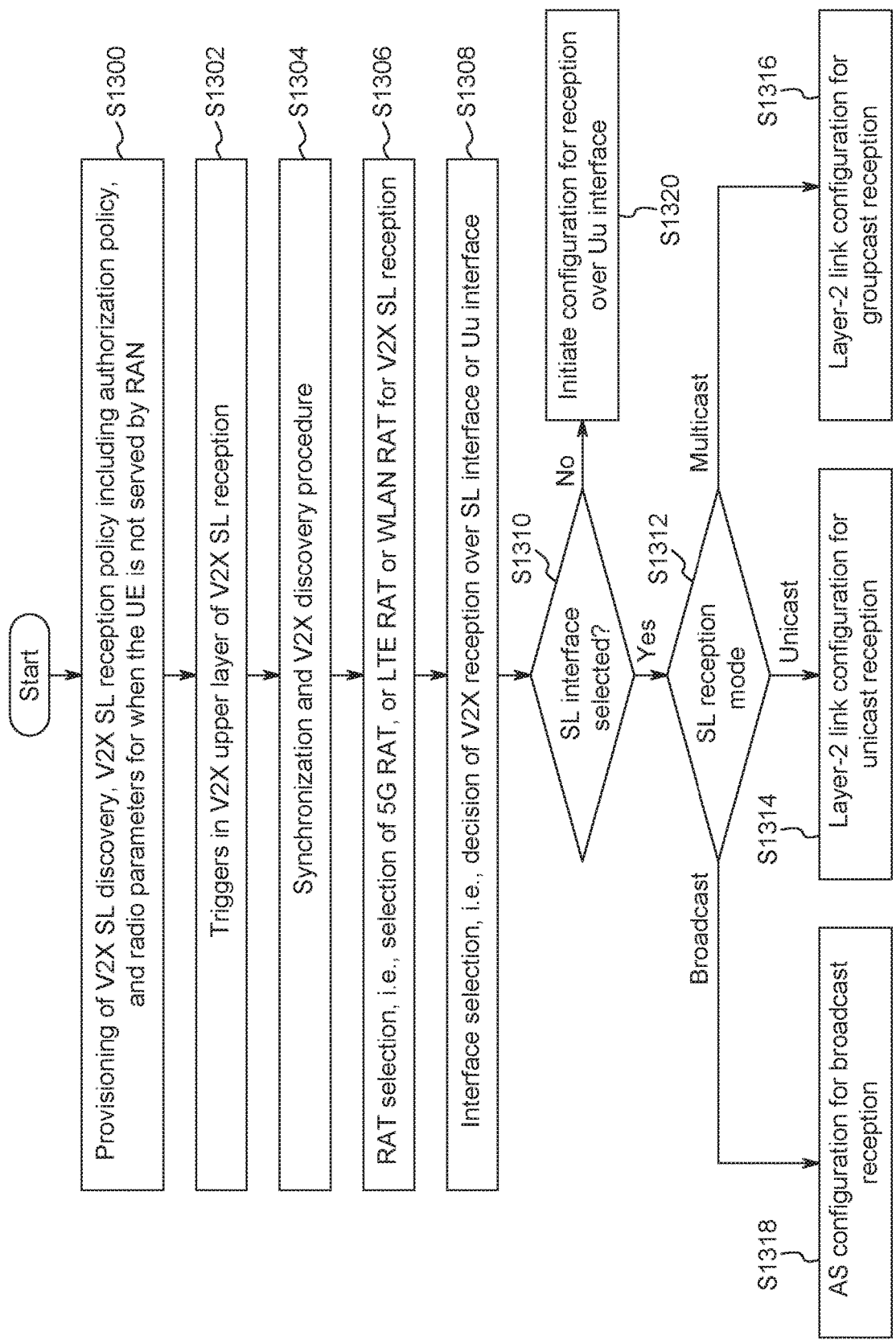
FIG. 13 shows a method for reception side V2X communications in accordance with an exemplary embodiment.

An exemplary receiver side high level illustration of UE operation, including intermediate procedures in the UE leading to the decision for V2X communication either by AS broadcast, AS unicast or AS groupcast is provided in FIG. 13.

In step S1300, the UE is either pre-configured (in SIM or ME) or provisioned by the V2X control function located in the core network with information in support of V2X operation i.e. discovery procedure whereby the UE discover other devices for V2X communication, and for V2X communication whereby the UE engages in communication with other V2X devices. Communication between the UE and the V2X Control function for provisioning of V2X operation parameters can be through user plane or through control plane. Provisioning parameters for NR V2X operation and particularly in support of reception of unicast communication or groupcast communication are described below in the section entitled "Provisioning for Receiver side V2X Communication." With V2X communication triggered in step S1302, the UE can perform synchronization if not already synchronized in step S1304. The UE furthermore can perform discovery in order to identify peer UE or group of UEs from which it can receive V2X communication. The output from the discovery procedures, e.g., the Layer-2 link ID(s) of the discovered UE or group of UEs can be used by the UE in subsequent procedure(s) of the V2X operation such as monitoring for reception of V2X communications, or connection establishment toward specific UE or group of UEs, or configuration of broadcast resources for reception of V2X communications. In steps S1306 and S1308, the UE performs RAT selection and interface (e.g., sidelink versus Uu interface) selection. While step S1306 and step S1308 are listed as separate steps, the two steps can be performed concurrently, as described in the section below entitled "Receiver Side RAT Selection and Interface Selection." In step S1310, it is determined whether the SL interface is selected. If yes, it is determined what the SL reception mode is (step S1312). If the SL reception mode is a broadcast mode, AS configuration for broadcast reception is performed in step S1318. If the SL reception mode is a unicast mode, Layer-2 link configuration for unicast reception is performed in step S1314. If the SL reception mode is a multicast mode, Layer-2 link configuration for groupcast reception is performed in step S1316. In step S1310, if the SL interface is not selected, configuration for reception over Uu interface is initiated (step S1320).

Provisioning for Receiver Side V2X Communication

In support of unicast reception, groupcast reception, broadcast reception, connection-oriented reception or flow based QoS, the NR V2X UE can be pre-configured or provisioned with the following system parameters; the configuration can be on per-interface basis, e.g., NR sidelink interface, NR Uu interface, LTE sidelink interface, LTE Uu interface, WLAN sidelink interface or WLAN to network interface:

- List of authorized V2X Services and for each service, the reception mode (reception cast type), i.e., whether the service is broadcast based reception, groupcast based reception or unicast based reception; The reception mode of a service can be defined on PLMN or group of PLMNs basis, or on cell or group of cells basis or on geographical area or group of geographical areas basis.
- List of authorized V2X Services and for each service, whether the reception is V2X upper layer connectionless or V2X upper layer connection oriented. For example, a broadcast reception can be a connectionless reception while a unicast reception or groupcast reception can be connection-oriented reception, or connectionless reception at the V2X upper layer.
- List of authorized V2X Services and for each service, whether the reception is AS layer connectionless or V2X AS layer connection oriented. For example, a broadcast reception can be a connectionless reception while a unicast reception or groupcast reception can be connection-oriented reception, or connectionless reception at the V2X AS layer.
- Authorization to act as a scheduler or scheduling entity for other UEs, or local controller or a scheduler node. Such authorization can be defined on PLMN basis or group of PLMNs basis, on a cell basis, on a group of cells basis or on a geographical area basis or a group of geographical area basis. In this disclosure, the terms local controller, scheduling entity or scheduler entity will be used interchangeably. For example, a platoon lead can be provisioned with the authorization to act as a scheduling entity. Such authorization can also be defined on service basis or group of services basis.
- Authorization to act as assisting UE to a scheduling entity. Such authorization can be defined on PLMN basis or group of PLMNs basis, on a cell basis, or on a group of cells basis, on a geographical area basis or group of geographical area basis.
- Authorization for duplicated reception across radio interface, i.e., reception of the same data across two or more radio interfaces, e.g., across two or more of the following radio interfaces: NR sidelink interface, NR Uu interface, LTE sidelink interface, LTE Uu interface, WLAN sidelink interface or WLAN to network interface. Such duplication can be defined based on a reliability requirement, e.g., ProSe Per-Packet Reliability value in the case of per-packet based QoS model or Packet Error Rate or QoS Identifier value in the case of QoS Flow or bearer based QoS model. Such authorization can be defined on per service basis. Furthermore, such authorization can be defined on cell or group of cells basis, or per geographical area or group of geographical areas basis, or on per PLMN or group of PLMNs basis. In the context of V2X, we will denote QoS Identifier as V2X QoS Identifier (VQI).
- List of V2X QoS Identifiers. For each VQI, the corresponding QoS profile parameters can be configured. The QoS profile can include one or more of the following: priority level, i.e., scheduling priority level, payload, transmission rate, maximum end-to-end latency, reliability, data rates, minimum required communication range, pre-emption priority level (i.e., admission pre-emption priority level). In another alternative, the QoS profile can include one or more of the following: priority level (i.e., scheduling priority level), resource type (e.g. GBR, Delay critical GBR or Non-GBR, etc.), packet delay budget, packet error rate, averaging window, maximum data burst volume. This configuration can be defined on per PLMN or group of PLMNs basis, on a cell or group of cells basis, on per geographical area or group of geographical areas basis.
- List of QoS Flow Identifiers (QFI). For each QFI, there is a mapping between QFI and VQI. A QoS Flow is the finest granularity of QoS differentiation. This configuration can be defined on per PLMN or group of PLMNs basis, on a cell or group of cells basis, on per geographical area or group of geographical areas basis.
- Resource pool configuration for connection-oriented reception and signaling in support of the maintenance of those connections.
- Resource pool configuration for PC5 signaling or SL RRC signaling in support of reception of signaling for connection establishment and maintenance of that connection. Such a resource pool can be a shared resource pool that is also used for connectionless PC5 data transmission.

Each of the provisioning parameters defined above can be defined on the basis of whether or not the UE is served by a radio access network or not served by a radio access network. Furthermore, when not served by a radio access network, the provisioning parameters can be configured on the basis of whether the carrier frequency for V2X communication is operator managed or non-operator managed.

The UE can also be preconfigured (e.g., on the SIM or Mobile Equipment (ME)) with the following capability parameters:

- Support of AS based unicast reception;
- Support of AS based groupcast reception;
- Support for V2X UpL based unicast reception;
- Support for V2X UpL based groupcast reception;
- Support for AS connectionless reception;
- Support for AS connection-oriented reception;
- Support of cross radio interface packet duplication reception
- Support of capability to act as a scheduling entity.
- Support of capability to act as an assisting UE to a scheduler entity
- Support for QoS flow based QoS specification, e.g. the capability to support a QoS model where V2X AS layer supports mappings of packets from radio bearers to QoS flows SAPs as it delivers the received packets to V2X upper layer.
- Support for Per-Packet QoS mode, e.g., the capability to support a QoS model where each packet delivered to V2X upper layer from V2X AS carried its QoS requirement (e.g., PPPP or PPPR).

Receiver Side Triggers for V2X Reception

In the context of the high-level illustration of V2X reception operation described in FIG. 13, one or more of the following events can trigger V2X reception procedure including monitoring for connection management related messages including, e.g., reception of connection establishment messages:

- Trigger from V2X application for transmission. In this case, the procedure is triggered as the result of an event originating from the application layer;
- Trigger of discovery by the application layer;
- Periodic monitoring of reception on V2X reception resource pools Communication quality of current/existing V2X communication no longer meets quality threshold. The quality threshold can be related to one or more QoS profile metrics (e.g., packet error rate, latency, reliability, communication range, etc.). In this case, the V2X upper layer of V2X AS can initiate communication toward another UE or group of UEs in order to continue reception of the V2X communication initiated by the application layer. For example, if a UE is a platoon group, upon detecting V2X reception quality no longer meeting quality threshold, the UE can initiate communication toward another platoon lead UE.

Radio link Failure or beam failure or failure of beam failure recovery. In this case, the V2X upper layer of V2X AS can initiate reception of communication toward another UE or group of UEs in order to continue the V2X communication initiated by the application layer;

Radio Link quality of current/existing V2X communication no longer meets quality threshold;

Congestion of current/existing V2X communication is above threshold;

Transmit Power of current/existing V2X communication is above threshold or pathloss is above threshold.

Mobility events in which case the V2X upper layer of V2X AS can initiate reception of V2X communication toward another UE or group of UEs in order to continue the V2X communication initiated by the application layer. The mobility events can be related to the UE own mobility or can be related to peer UE mobility;

Reception of connection release, for example, from a peer UE or from a scheduling entity controlling resource allocation to the UE;

Reception of connection establishment request from a peer UE or from a scheduling entity controlling resource allocation to the UE;

Reception of handover request from a peer UE or from a scheduling entity controlling resource allocation to the UE;

Failure of connection reconfiguration of current/existing V2X communication.

The V2X upper layer can trigger reception of V2X Communication operation described in FIG. 13. Similarly, the V2X AS layer can trigger reception of V2X Communication operation illustrated in FIG. 13.

Receiver Side RAT Selection and Interface Selection

Similar to the transmitter side operation described above, the V2X upper layer can perform RAT selection or interface selection. In one embodiment, the receiver side RAT of a given UE can be same as the transmitter side RAT, i.e., is set to be the same as the transmitter side RAT. Similarly, the receiver side interface can be the same as the transmitter side interface, i.e., is set to be the same as the transmitter interface. In another embodiment, the receiver side RAT can be different from the transmitter side RAT. Similarly, the receiver side interface can be different from the transmitter side interface. The V2X upper layer can perform sequentially or concurrently, RAT selection and interface selection. The V2X AS can provide assistance information such as availability information to the V2X upper layer for the selection of the RAT or the interface. For example, the AS of a RAT can determine the availability of that RAT. Furthermore, the AS can determine the availability of the interface in connection with a particular RAT. In an exemplary embodiment, the RAT can be one or more of the following: NR RAT, LTE RAT, Wi-Fi RAT, etc. Similarly, the interface can be one or more of the following: sidelink NR RAT, Uu RAT, sidelink LTE RAT, Uu LTE RAT, sidelink Wi-Fi RAT, and the radio interface between Wi-Fi and the network. The AS can determine the availability of a RAT or of an interface associated with a particular RAT for V2X reception, based on one or more of the following:

Communication quality threshold. The quality threshold can be related to one or more QoS profile metrics (e.g., packet error rate, latency, reliability, communication range, etc.);

Radio link quality threshold;

Congestion threshold. The congestion threshold can be related, for example, to channel busy ratio (CBR), channel occupancy ratio (CR), etc.;

Radio link Failure or beam failure or failure of beam failure recovery.

Out-of-coverage or partially out of coverage detection;

Anticipated received power threshold or pathloss threshold;

Capability (e.g., capability of the UE, capability of peer V2X UE, capability of scheduling entity, capability of gNB or the network, etc.).

The availability information can include one or more of the following information:

Available or not available;

Communication quality threshold

Radio link quality threshold

Congestion threshold

Out-of-coverage or partially out of coverage detection

Capability (e.g., capability of the UE, capability of peer V2X UE, capability of scheduling entity, capability of gNB or the network, etc.)

Receiver Side Sidelink Communication Mode Selection

This section describes how the V2X upper layer decides to use unicast versus groupcast versus broadcast for V2X reception. The V2X upper layer can decide to use a reception cast type based on one or more of the following:

Indication from Application layer;

Indication from the peer V2X UE transmitter, e.g., as part of connection establishment procedures or other connection management procedures such as connection reconfiguration procedure;

Communication quality threshold. The quality threshold can be related to one or more QoS profile metrics (e.g., packet error rate, latency, reliability, communication range, etc.). For example, a platoon group member UE can, for example, decide to request a switch from groupcast communication to unicast communication based on communication reception quality threshold or can decide to switch to receiving the communication from another member UE acting as a relay UE, on a unicast basis.

Service type or Traffic Type, e.g., signaling versus application data;

Service Authorization configuration;

Capability, e.g., capability of the UE, capability of peer V2X UE, capability of scheduling entity, capability of gNB or the network, etc.;

Configuration into the UE, including preconfiguration (e.g., ME, SIM, etc.), provisioning into the UE by the network, e.g., V2X control function or configuration into the UE by the scheduling entity. The configuration can include mapping of service to transmission cast type.

Link Quality

Mechanism that the AS Layer Decides to Use Unicast Versus Groupcast Versus Broadcast Transmission The V2X AS layer can decide to use a reception cast type based on one or more of the following:

Indication from V2X Upper layer;

Indication from the peer V2X UE transmitter, e.g., as part of connection establishment procedures or other connection management procedures such as connection reconfiguration procedure;

Communication quality threshold. The quality threshold can be related to one or more QoS profile metrics (e.g., packet error rate, latency, reliability, communication range, etc.). For example, a platoon group member UE can, for example, decide to request a switch from groupcast communication to unicast communication based on communication reception quality threshold or can decide to switch to receiving the communication from another member UE acting as a relay UE, on a unicast basis.

Service type or Traffic Type, e.g., signaling versus application data;

Service Authorization configuration;

Capability (e.g., capability of the UE, capability of peer V2X UE, capability of scheduling entity, capability of gNB or the network, etc.);

Configuration into the UE, including pre-configuration (e.g. ME, SIM, etc.), provisioning into the UE by the network, e.g., V2X control function or configuration into the UE by the scheduling entity. The configuration can include mapping of service to transmission cast type;

Radio Link quality;

Mechanism that V2X Upper Layer Decides to Use Connection Oriented Versus Connectionless Reception The V2X upper layer can decide to use connection-oriented reception or connectionless reception based on one or more of the following:

Indication from Application layer;

Indication from the peer V2X UE transmitter, e.g., as part of connection establishment procedures or other connection management procedures such as connection reconfiguration procedure;

Communication quality threshold. The quality threshold can be related to one or more QoS profile metrics (e.g. packet error rate, latency, reliability, communication range, etc.); For example, a platoon group member UE can, e.g., decide to request a switch from connectionless reception to a connection oriented reception quality threshold, or can decide to switch to receiving the communication from another member UE acting as a relay UE, on a connection oriented basis.

Service type or Traffic Type, e.g., signaling versus application data;

Service Authorization configuration;

Capability (e.g., capability of the UE, capability of peer V2X UE, capability of scheduling entity, capability of gNB or the network, etc.);

Configuration into the UE, including pre-configuration (e.g. ME, SIM, etc.), provisioning into the UE by the network, e.g., V2X control function or configuration into the UE by the scheduling entity. The configuration can include mapping of service to transmission cast type.

Link Quality

Security requirement, e.g., security thresholds. The security requirement can be authentication, integrity or ciphering related requirement.

Mechanism that AS Layer Decides to Use Connection Oriented Versus Connectionless The V2X AS layer can decide to use a transmission cast type based on one or more of the following:

Indication from V2X Upper layer;

Indication from the peer V2X UE transmitter, e.g., as part of connection establishment procedures or other connection management procedures such as a connection reconfiguration procedure;

Communication quality threshold. The quality threshold can be related to one or more QoS profile metrics (e.g., packet error rate, latency, reliability, communication range, etc.). For example, a platoon group member UE can, e.g., decide to request a switch from connectionless reception to a connection oriented reception quality threshold, or can decide to switch to receiving the communication from another member UE acting as a relay UE, on a connection oriented basis.

Service type or Traffic Type, e.g., signaling versus application data;

Service Authorization configuration;

Capability, (e.g., capability of the UE, capability of peer V2X UE, capability of scheduling entity, capability of gNB or the network, etc.);

Configuration into the UE, including pre-configuration (e.g., ME, SIM, etc.), provisioning into the UE by the network, e.g., V2X control function or configuration into the UE by the scheduling entity. The configuration can include mapping of service to transmission cast type;

Radio Link quality;

Security requirement, e.g., security thresholds. The security requirement can be integrity or ciphering related requirement.

Unicast Connection Management

High Level Unicast Connection Management Procedure

Figure 14:
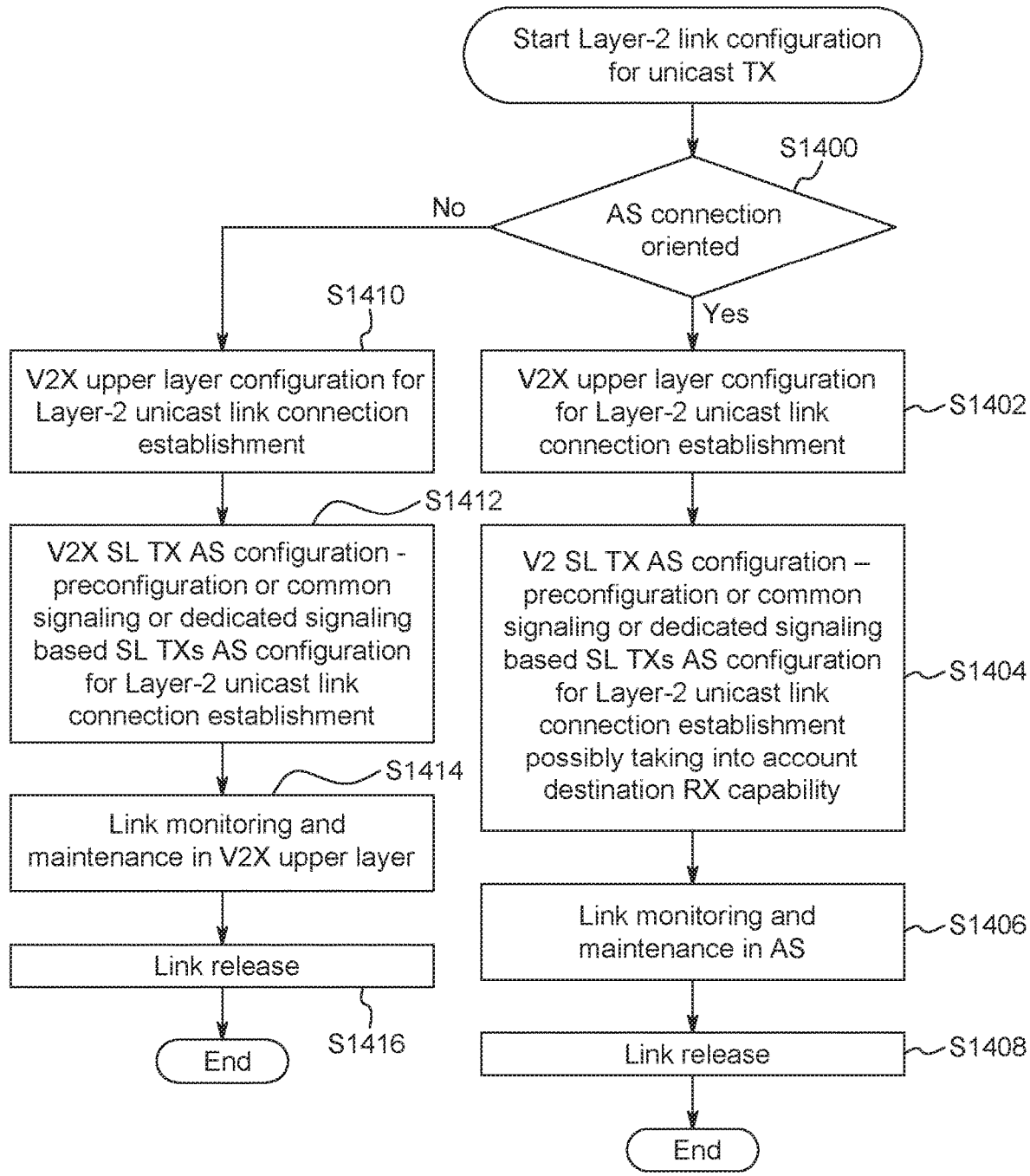
FIG. 14 shows a transmission side unicast method for Layer-2 link management in accordance with an exemplary embodiment.

FIG. 14 is a high-level illustration of transmitter side operation for unicast layer-2 link management including connection establishment. In step S1400, it is determined whether AS is connection oriented. Step S1402 and Step S1410 refer to unicast connection establishment and connection context associations in V2X upper layer (V2X UpL) between peer V2X UEs. A unicast connection can also be established in the AS layer, with connection establishment signaling between peer V2X UEs for configuration and associations of AS contexts between peer V2X UEs, before transfer of unicast packets as depicted in step S1404. In this case, the receiver of peer V2X UE is configured with a dedicated configuration possibly including a dedicated radio resource configuration for unicast reception taking into account the UE capability of the receiver UE. As part of the unicast connection establishment procedure, the UE can associate the unicast AS context with the corresponding V2X upper layer unicast context. In an alternative embodiment illustrated in step S1410, the AS can support the V2X upper layer unicast connection with an AS connectionless configuration. In this case, the AS is configured in AS connectionless manner where AS resources are configured in connectionless manner without taking into account for example the UE capability of the receiver UE for the receiver UE AS configuration. In this case, there is no signaling for the receiver UE configuration required before reception of V2X packet. The receiver AS is configured to common default parameters for V2X packet receptions, and the transmitter transmit packet in broadcast manner from AS MAC perspective, where filtering of received packet is performed based on source ID and destination ID encapsulated in the received MAC PDU. For connection-oriented AS resource configuration depicted in step S1404, PHY, MAC, RLC, PDCP and SDAP (when applicable) are configured for this specific connection in the receiver UE and transmitter UE before transfer of data packets takes place. An AS context consisting of configuration such as PHY channel configuration possibly including radio resource configuration, transport channel configuration, HARQ entity configuration, logical channel configuration, bearer configuration possibly including security configuration, QoS flow configuration and association of these configurations across the AS protocol sublayers are created in both the transmitter UE and the receiver UE before transfer of data packet. Once step S1402 and step S1404 or step S1410 and step S1412 are completed, the transmitter UE and the receiver UE can exchange packet (data or signaling) in a connection-oriented communication manner.

Step S1406 refers to link monitoring in the case of AS connection oriented. The link monitoring can be realized in the AS, for example, based on radio link monitoring and beam management procedures. The link monitoring can trigger the execution of connection maintenance procedures such as connection reconfiguration, beam recovery, connection relocation or connection release. Link maintenance procedure can be triggered by the transmitter UE, the receiver UE or a third entity such as the scheduling entity. In the case of AS connectionless communication, the link monitoring referred to in step S1414 can be realized in the V2X upper layer, for example based on link keep-alive procedure carried out by V2X upper layer. In this case, the link monitoring can trigger the execution of the transmitter side reconfiguration, connection relocation, or connection release. Also, in this case, link maintenance procedure can be triggered by the transmitter UE, the receiver UE or a third entity such as the scheduling entity. In step S1408, the link is released. Also, in step S1416, the link is released.

Figure 15:
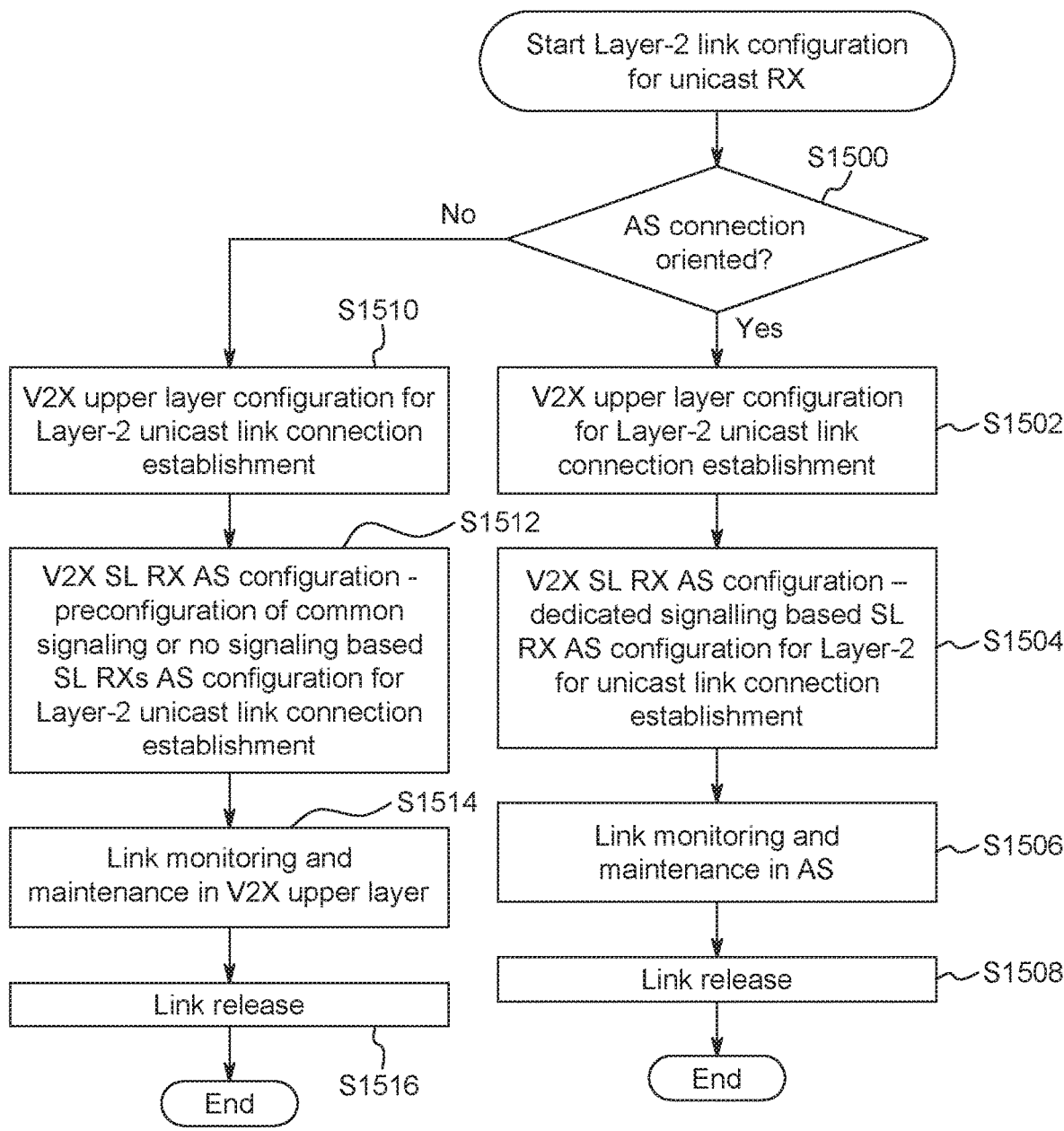
FIG. 15 shows a reception side unicast method for Layer-2 link management in accordance with an exemplary embodiment.

FIG. 15 provides a high-level illustration of the receiver side operation for layer-2 link management including connection establishment. In step S1500, it is determined whether AS connection is oriented. If yes, in step S1502, V2X upper layer configuration for Layer-2 unicast link connection establishment is performed. If no, in step S1510, V2X upper layer configuration for Layer-2 unicast link connection establishment is performed. In step S1512, V2X SL RX AS configuration-preconfiguration of common signaling or no signaling based SL RXs AS configuration for Layer-2 unicast link connection establishment is performed. In step S1514, link monitoring and maintenance in V2X upper layer is performed. In step S1516, link release is performed. In step S1504, V2X SL RX AS configuration-dedicated signaling based SL RX AS configuration for Layer-2 for unicast link connection establishment is performed. In step S1506, link monitoring and maintenance in AS is performed. In step S1508, link release is performed.

Unicast Connection Establishment Detail Procedure

FIG. 16, FIG. 17, FIG. 18, FIG. 19, FIG. 20 and FIG. 21 provide different alternative embodiments for detailed procedural steps in support of unicast connection establishment and follow-up data transfer. They provide further detailed embodiments of the high-level procedures illustrated in FIG. 14 and FIG. 15. The procedures are structured around three entities. The initiating UE (I-UE) which is the UE initiating the connection establishment procedure, the target UE (T-UE) which is the end receiver UE of the connection establishment request, and the scheduling entity, which is the entity that provides resource configuration or resource scheduling function. The scheduling entity can be a gNB, a UE that controls resource configuration for other UEs or assists resource configuration for other UEs, an RSU-UE (i.e. a road side unit (RSU) acting as a UE), an RSU-gNB (i.e., an RSU acting as a gNB), a UE-to-network relay (i.e., an entity acting as a relay node toward other UEs (e.g., an IAB node)) or any other local controller that provides resource configuration to UEs under its control. In the remainder of this disclosure, we will further extend the I-UE and T-UE definition as follows: the T-UE with respect to a configuration procedure over an interface (e.g., PC5 interface or Uu interface) is the UE that is the receiving UE of the configuration request. The I-UE with respect to a configuration procedure over an interface (e.g., PC5 interface or Uu interface) is the UE that transmits the configuration request. A configuration request can be one or more of the following: a connection establishment request, a connection reconfiguration or modification, a connection relocation, or a connection release.

These figures also assume one or more of the steps described in FIG. 12 and FIG. 13 are already performed. With respect to resource allocation, each of the figures also proposes that after both the T-UE and I-UE are configured with radio resource configuration through RRC signaling or PC5-S signaling, the T-UE can use autonomous resource selection for transmission, or can be dynamically scheduled by the scheduling entity or the I-UE. Similarly, the I-UE can use autonomous resource selection for transmission or can be dynamically scheduled by the scheduling entity or the T-UE.

Figure 16A:
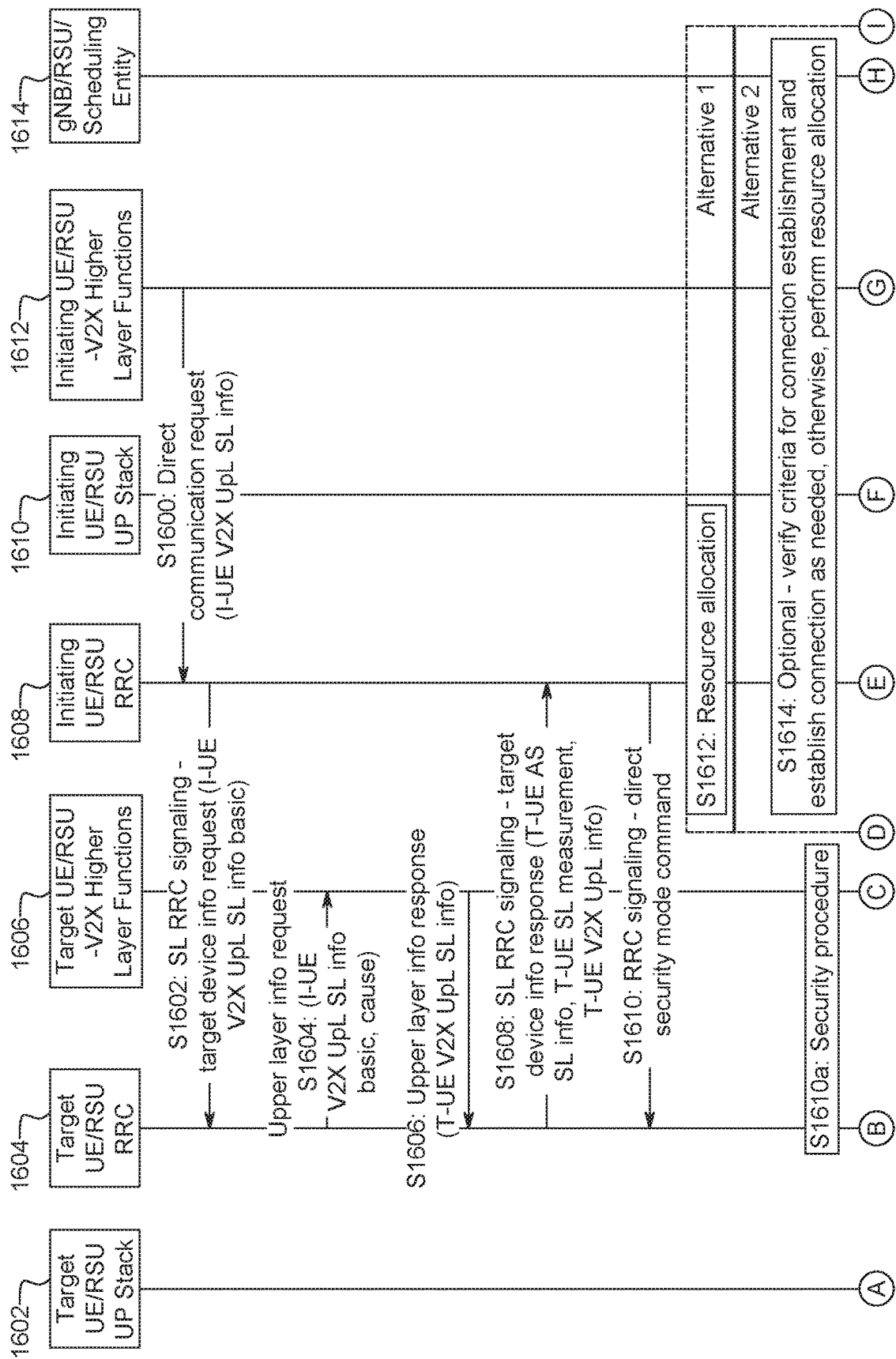
FIGS. 16A-16C show a unicast connection establishment method in which initiating UE RRC configures a target UE, or assists the configuration of a target UE in accordance with an exemplary embodiment.
Figure 16B:
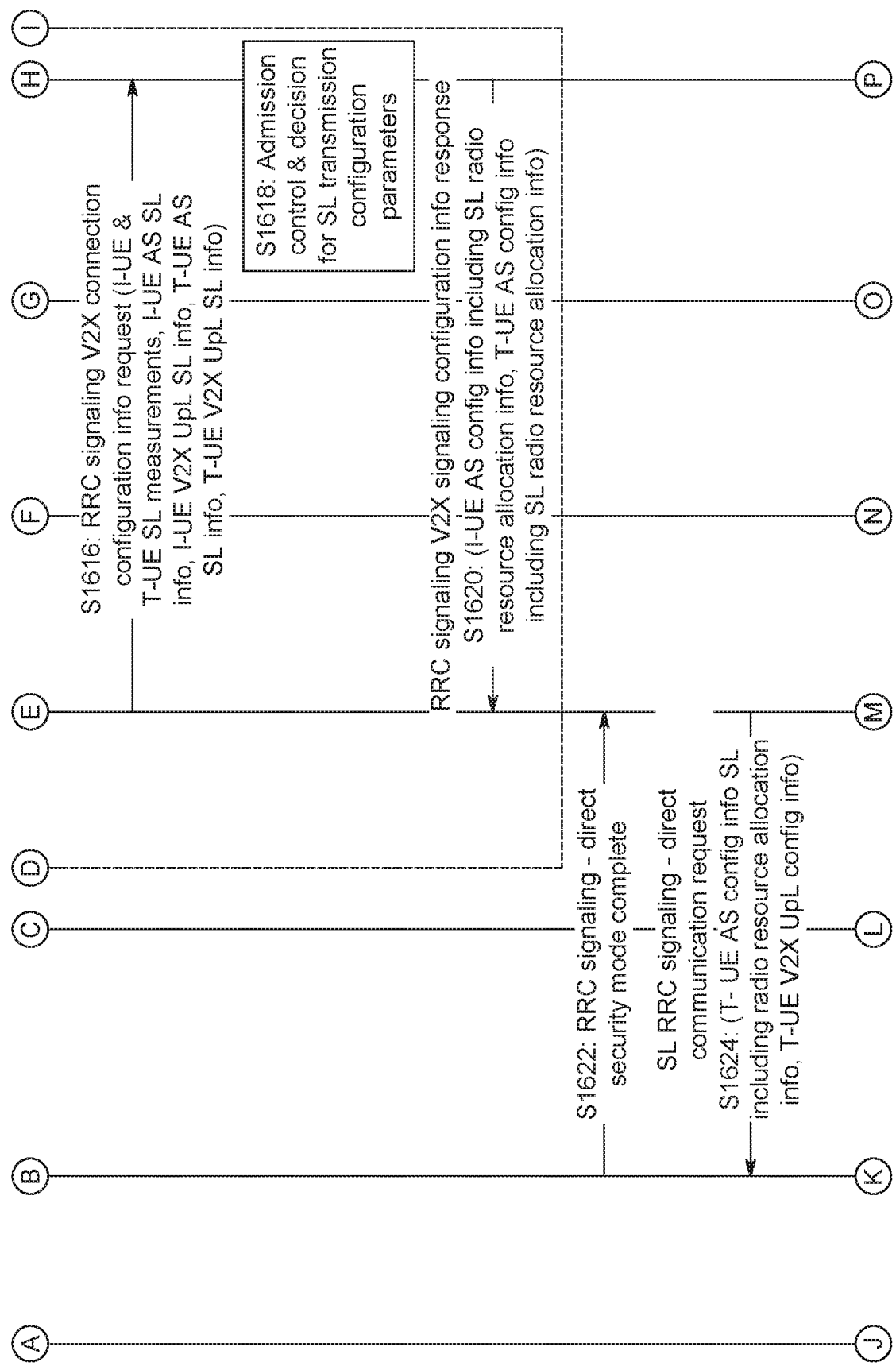
Figure 16C:
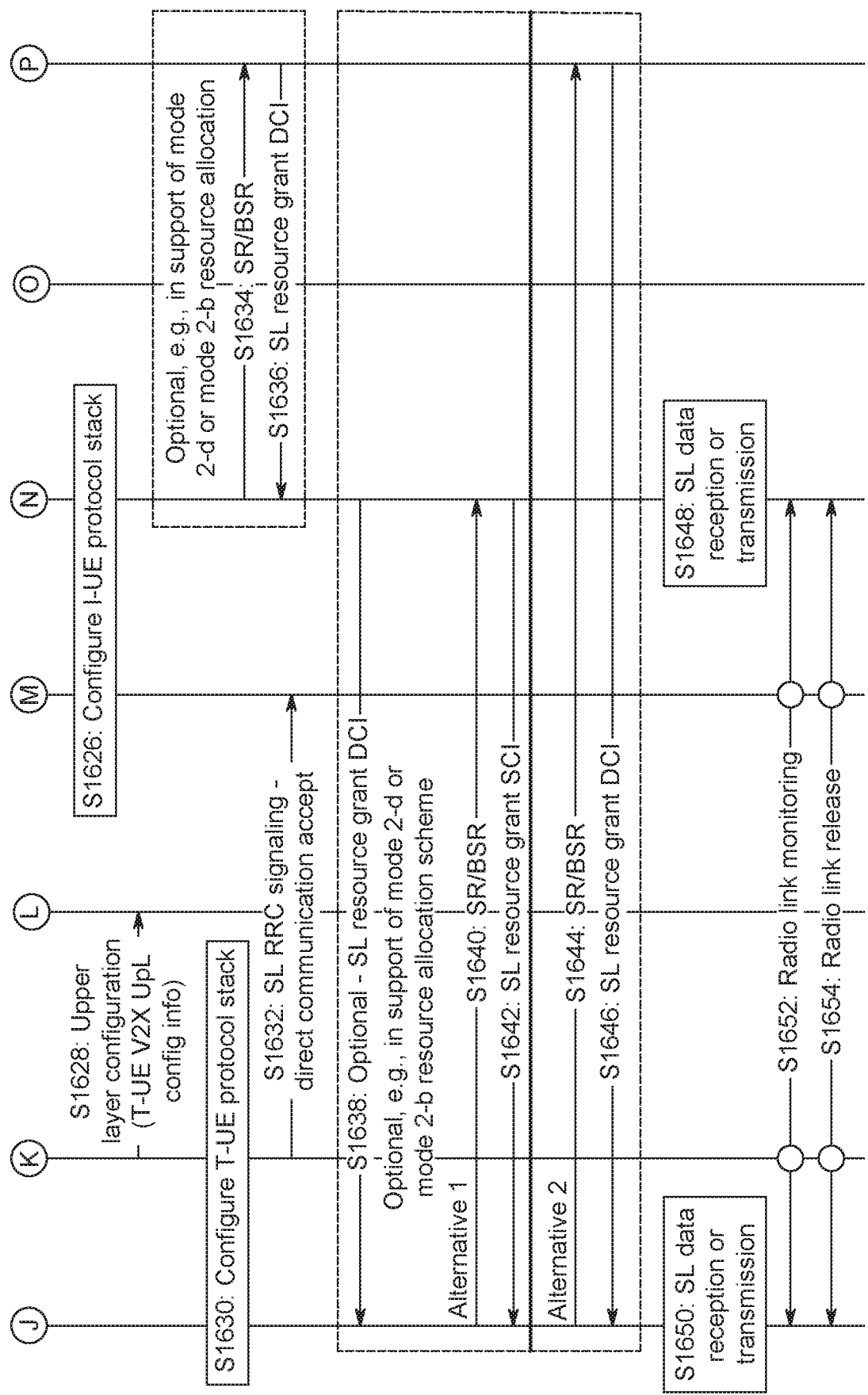

FIGS. 16A-C illustrate the steps for connection establishment where the T-UE is configured by the I-UE or by the I-UE in coordination with the scheduling entity. Furthermore, in this embodiment of a connection establishment procedure, the V2X upper layer configuration of the T-UE is carried jointly with the AS layer configuration of the T-UE using SL RRC signaling from the I-UE to the T-UE.

FIGS. 16A-C include a Target UE/RSU UP Stack 1602, Target UE/RSU RRC 1604, Target UE/RSU-V2X Higher Layer Functions 1606, Initiating UE/RSU RRC 1608, Initiating UE/RSU UP Stack 1610, Initiating UE/RSU-V2X Higher Layer Functions 1612, and gNB/RSU/Scheduling Entity 1614. In step S1600, a direct communication is sent from the UE/RSU-V2X Higher Layer Functions 1612. In step S1602, a SL RRC signaling-target device info request is sent from the Initiating UE/RSU RRC 1608. In step S1604, an upper layer info request is sent from the Target UE/RSU RRC 1604. In step S1606, an upper layer info response is sent from the Target UE/RSU-V2X Higher Layer Functions 1606. In step S1608, an SL RRC signaling-target device info response is sent from the Target UE/RSU RRC 1604. In step S1610, a RRC signaling—direct security mode command is sent from the Initiating UE/RSU RRC 1608. In step S1612, resource allocation can be performed. In an optional step, S1614, criteria for connection establishment can be verified and a connection can be established as needed, otherwise resource allocation is performed. In step S1610a, a security procedure is performed.

In step S1616, a RRC signaling V2X connection configuration info request is sent from the Initiating UE/RSU RRC 1608. In step S1618, admission control and decision for SL transmission configuration parameters is performed. In step S1620, a RRC signaling V2X signaling info response is sent from the gNB/RSU/Scheduling Entity 1614. In step S1622, a RRC signaling—direct security mode completion message is sent from the Target UE/RSU RRC 1604. In step S1624, a SL RRC signaling—direct communication request is sent from the Initiating UE/RSU RRC 1608.

In step S1628, upper layer configuration information is sent. In step S1630, the T-UE protocol stack is configured. In step S1632, a SL RRC signaling-direct communication accept message is sent. In step S1634, a SR/BSR message is sent. In step S1636, SL resource grant DCI information is sent from the gNB/RSU/Scheduling Entity 1614. In optional step S1638, the Initiating UE/RSU UP Stack 1610 can send the SL resource grant DCI information to the Target UE/RSU UP Stack 1602. In an alternative embodiment, steps S1640 and S1642 are performed.

In step S1640, SR/BSR is sent from the Target UE/RSU UP Stack 1602 to the Initiating UE/RSU UP Stack 1610, and in step S1642, the Initiating UE/RSU UP Stack 1610 sends the SL resource grant DCI information to the Target UE/RSU UP Stack 1602. In another alternative embodiment, steps S1644 and S1646 are performed. In step S1644, SR/BSR is sent from the Target UE/RSU UP Stack 1602 to the gNB/RSU/Scheduling Entity 1614, and in step S1646, the gNB/RSU/Scheduling Entity 1614 sends the SL resource grant DCI information to the Target UE/RSU UP Stack 1602. In step S1648, SL data reception or transmission can be performed. In step S1650, reception or transmission can be performed. In step S1652, radio link monitoring can be performed. In step S1654, release of the radio link can be performed.

Figure 17A:
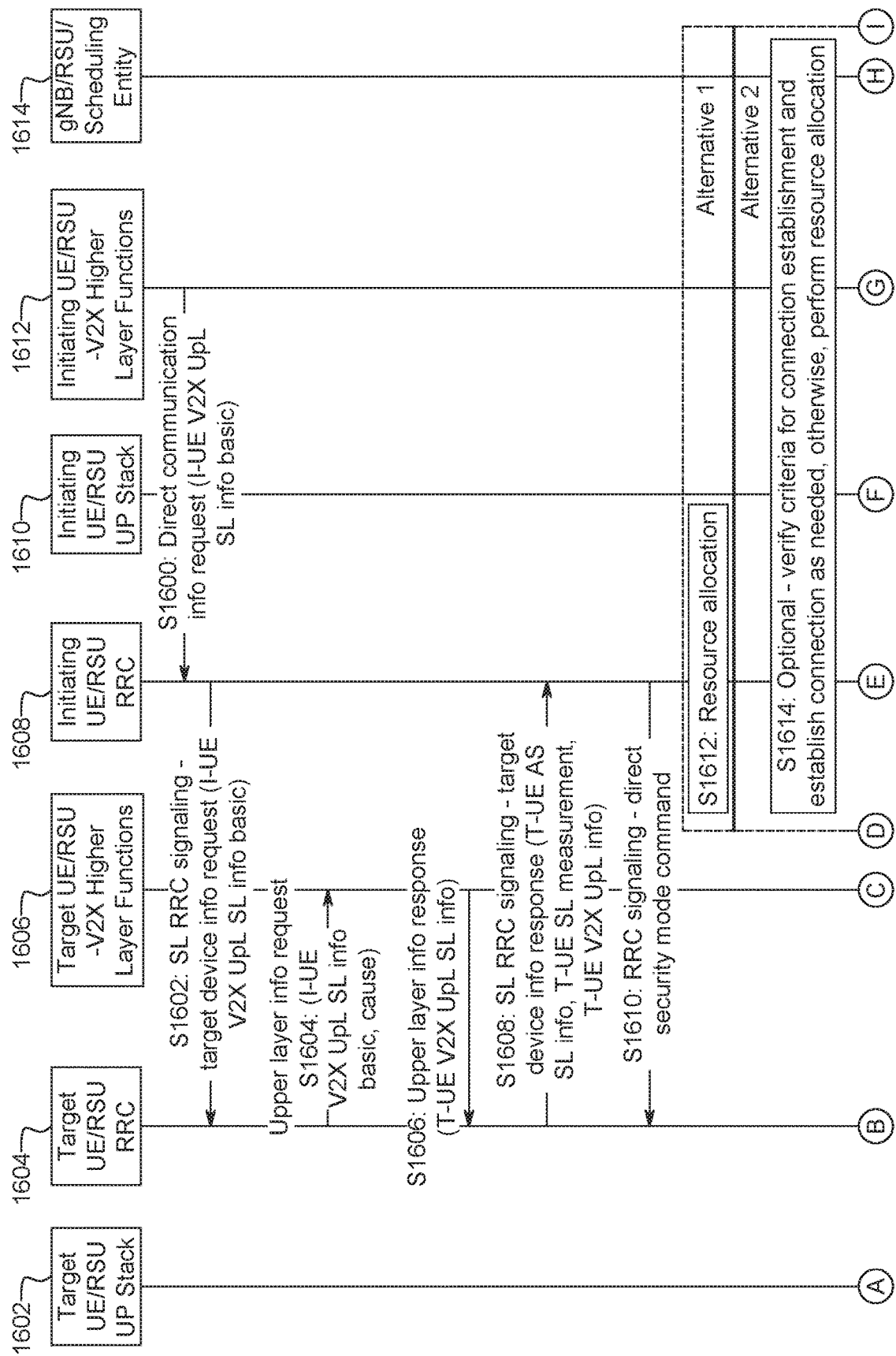
FIGS. 17A-17C show a unicast connection establishment method in which initiating UE PC5 configures a target UE, or assists the configuration of a target UE in accordance with an exemplary embodiment.
Figure 17B:
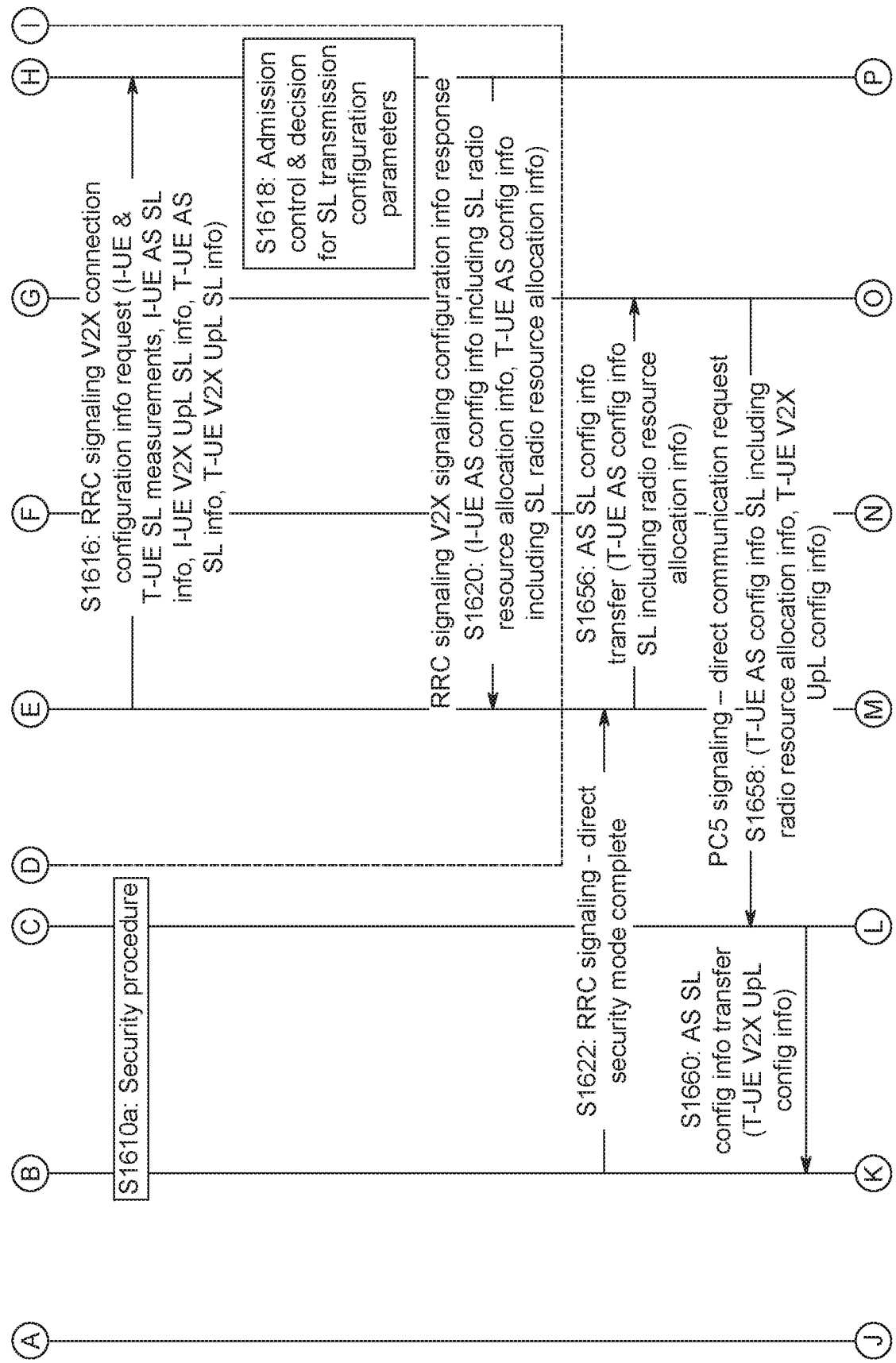
Figure 17C:
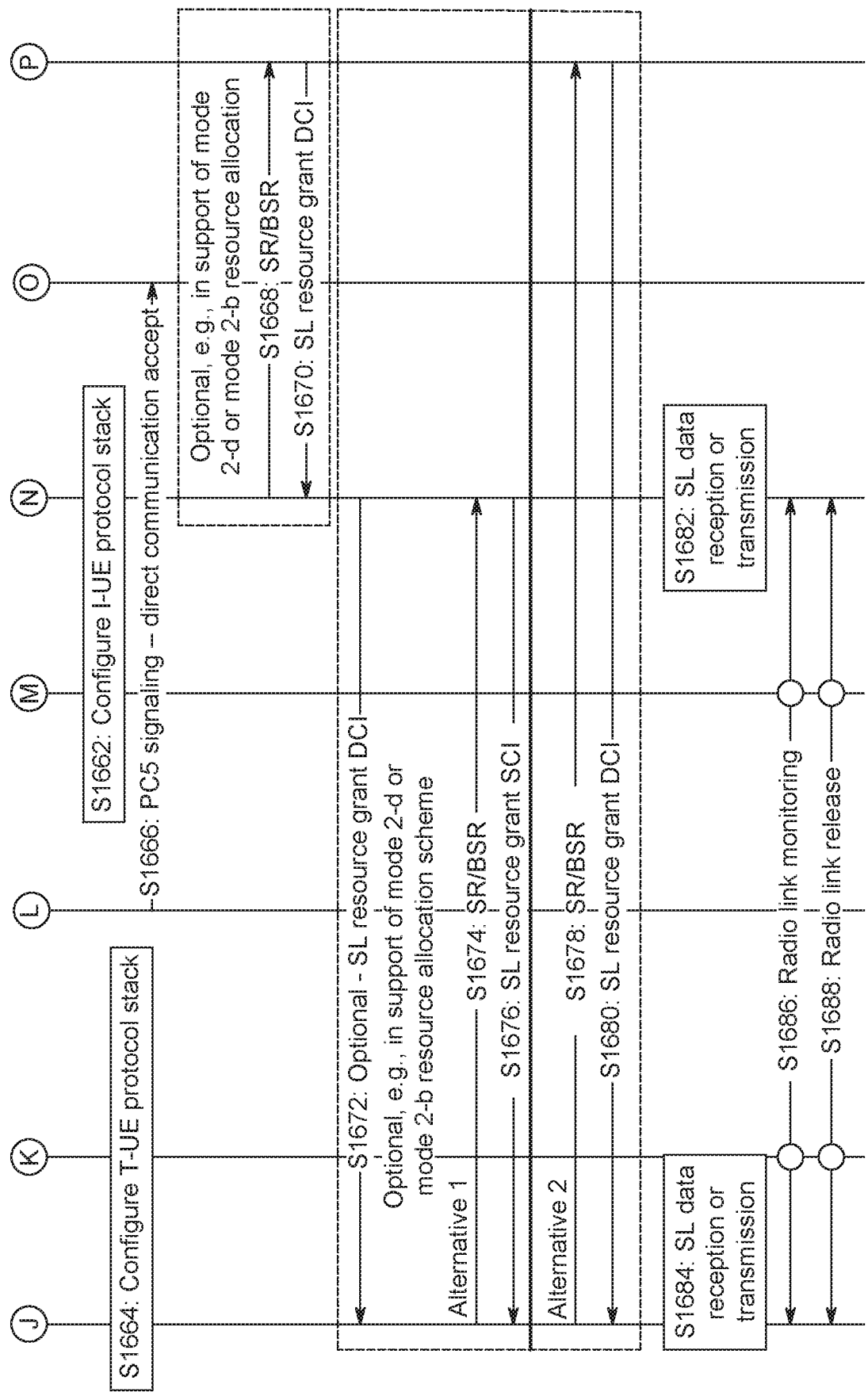

FIGS. 17A-C illustrate the steps for connection establishment where the T-UE is configured by the I-UE or by the I-UE in coordination with the scheduling entity. Furthermore, in this embodiment of connection establishment procedure, the V2X upper layer configuration of the T-UE is carried jointly with the AS layer configuration of the T-UE using PC5-signaling from the I-UE to the T-UE. In FIGS. 17A-C, steps S1600, S1602, S1604, S1606, S1608, S1610, S1610a, S1612, S1614, S1616, S1618, S1620, and S1622 are the same as in FIGS. 16A-C. In step S1656, AS SL configuration information is transferred. In step S1658, a PC5 signaling-direct communication request is performed. In step S1660, an AS SL configuration information transfer is performed. In step S1662, the I-UE protocol stack is configured. In step S1664, the T-UE protocol stack is configured. In step S1666, PC5 signaling—direct communication acceptance is performed. In step S1668, which can be optional, e.g., in support of mode 2-d or mode 2-b resource allocation, SR/BSR can be sent to the gNB/RSU/Scheduling Entity 1614. In step S1670, which can also be optional, a SL resource grant DCI can be sent from the gNB/RSU/Scheduling Entity 1614. In step S1672, which can be optional, a SL resource grant DCI is sent from the Initiating UE/RSU UP Stack 1610. Steps S1674 and S1676 are Alternative 1, and Steps S1678 and S1680 are Alternative 2. In step S1674, SR/BSR is sent from the Target UE/RSU UP Stack 1602. In step S1676, SL resource grant SCI is sent from the Initiating UE/RSU UP Stack 1610. In step S1678, SR/BSR is sent from the Target UE/RSU UP Stack 1602 to the gNB/RSU/Scheduling Entity 1614. In step S1680, SL resource grant SCI is sent from the gNB/RSU/Scheduling Entity 1614 to the Target UE/RSU UP Stack 1602. In step S1682, SL data reception or transmission is performed. In step S1684, SL data reception or transmission is performed. In step S1686, radio link monitoring is performed. In step S1688, radio link release is performed.

Figure 18A:
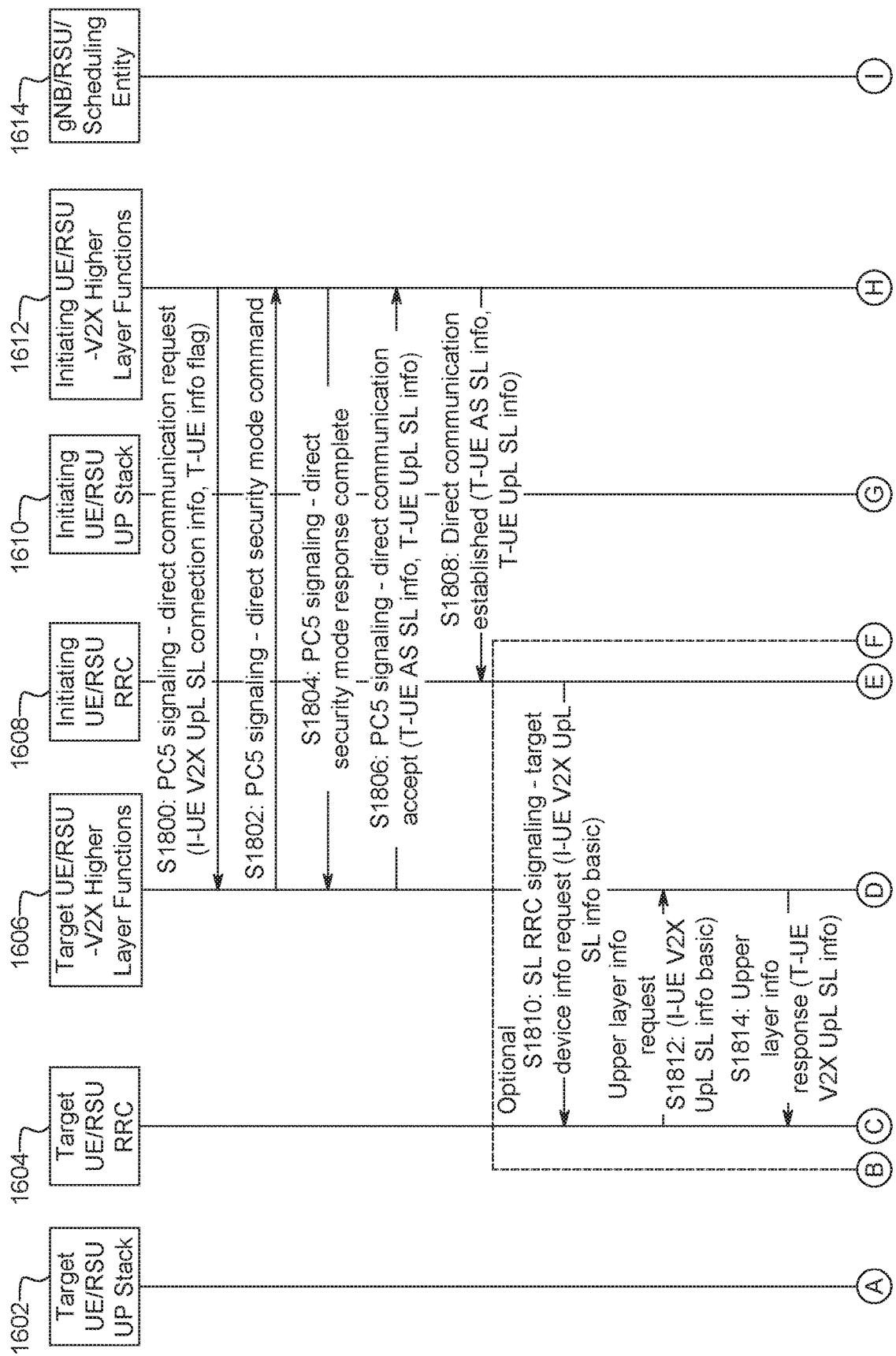
FIGS. 18A-18C show a unicast connection establishment method in which initiating UE RRC configures a target UE, or assists the configuration of a target UE in accordance with an exemplary embodiment.
Figure 18B:
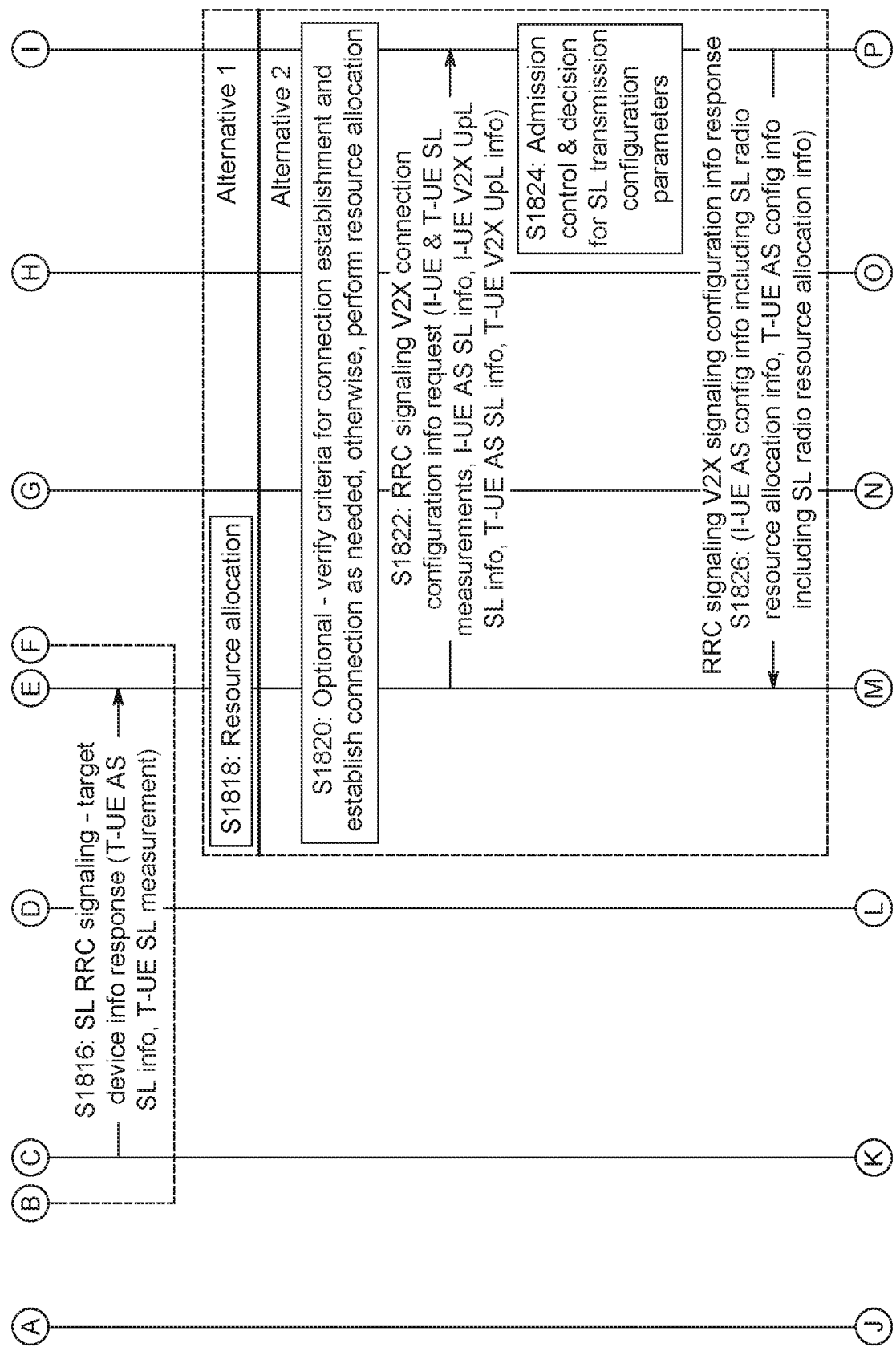
Figure 18C:
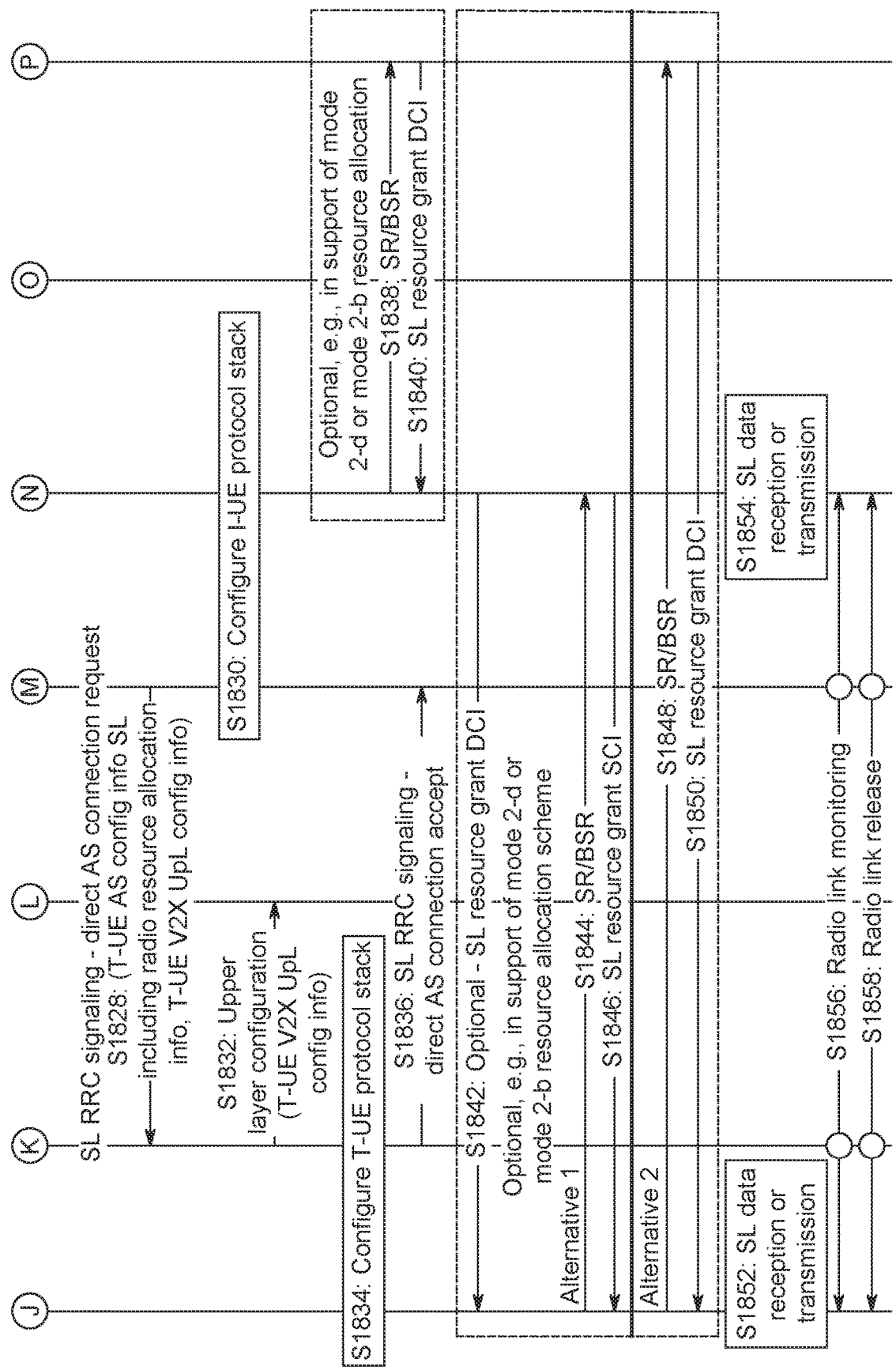

FIGS. 18A-C illustrate the steps for connection establishment where the T-UE is configured by the I-UE or by the I-UE in coordination with the scheduling entity. Furthermore, in this embodiment of connection establishment procedure, the V2X upper layer configuration of the T-UE is carried jointly with the AS layer configuration of the T-UE using RRC signaling from the I-UE to the T-UE. Additionally, the V2X upper layer connection establishment procedure is carried out independently from V2X AS layer connection establishment procedure. In step S1800, a PC5 signaling-direct communication request is sent from the Initiating UE/RSU-V2X Higher Layer Functions 1612. In step S1802, a PC5 signaling-direct security mode command is sent from the Target UE/RSU-V2X Higher Layer Functions 1606. In step S1806, PC5 signaling-direct communication acceptance information is sent from the Target UE/RSU-V2X Higher Layer Functions 1606. In step S1808, direct communication is established. Steps S1810, S1812, S1814, and S1816 can be optional steps. In step S1810, a SL RRC signaling-target device information request is sent from the Initiating UE/RSU RRC 1608. In step S1812, an upper layer information request is sent from the Target UE/RSU RRC 1604. In step S1814, an upper layer information response is sent from the Target UE/RSU-V2X Higher Layer Functions 1606. In step S1816, a SL RRC signaling—target device information response is sent from the Target UE/RSU RRC 1604. In step S1818, resource allocation can be performed (Alternative 1). Steps S1820, S1822, S1824, and S1826 are Alternative 2. In step S1820, which can be optional, criteria for connection establishment is verified and a connection is established as needed, otherwise, resource allocation is performed. In step S1822, a RRC signaling V2X connection configuration information request is sent from the Initiating UE/RSU RRC 1608. In step S1824, admission control and a decision for SL transmission configuration parameters is performed. In step S1826, RRC signaling V2X signaling configuration information response is sent from the gNB/RSU/Scheduling Entity 1614.

In step S1828, a SL RRC signaling—direct AS connection request is sent from the Initiating UE/RSU RRC 1608. In step S1830, the I-UE protocol stack is configured. In step S1832, upper layer configuration is performed. In step S1834, the T-UE protocol stack is configured. In step S1836, an SL RRC signaling-direct AS connection accept signal is sent. Steps S1838 and S1840 are optional. In step S1838, SR/BSR is sent from the Initiating UE/RSU UP Stack 1610. In step S1840, the Initiating UE/RSU UP Stack 1610 receives a SL resource grant DCI. Alternative 1 includes optional steps S1842, S1844, and S1846. In step S1842, the Target UE/RSU UP Stack 1602 receives a SL resource grant DCI. In step S1844, the Target UE/RSU UP Stack 1602 sends an SR/BSR. In step S1846, the Target UE/RSU UP Stack 1602 receives a SL resource grant SCI. Alternative 2 includes optional steps S1848 and S1850. In step S1848, the Target UE/RSU UP Stack 1602 sends an SR/BSR to gNB/RSU/Scheduling Entity 1614. In step S1850, the Target UE/RSU UP Stack 1602 receives an SL resource grant DCI. In step S1852, SL data reception or transmission is performed by the Target UE/RSU UP Stack 1602. In step S1854, SL data reception or transmission is performed by the Initiating UE/RSU UP Stack 1610. In step S1856, radio link monitoring is performed. In step S1858, radio link release is performed.

Figure 19A:
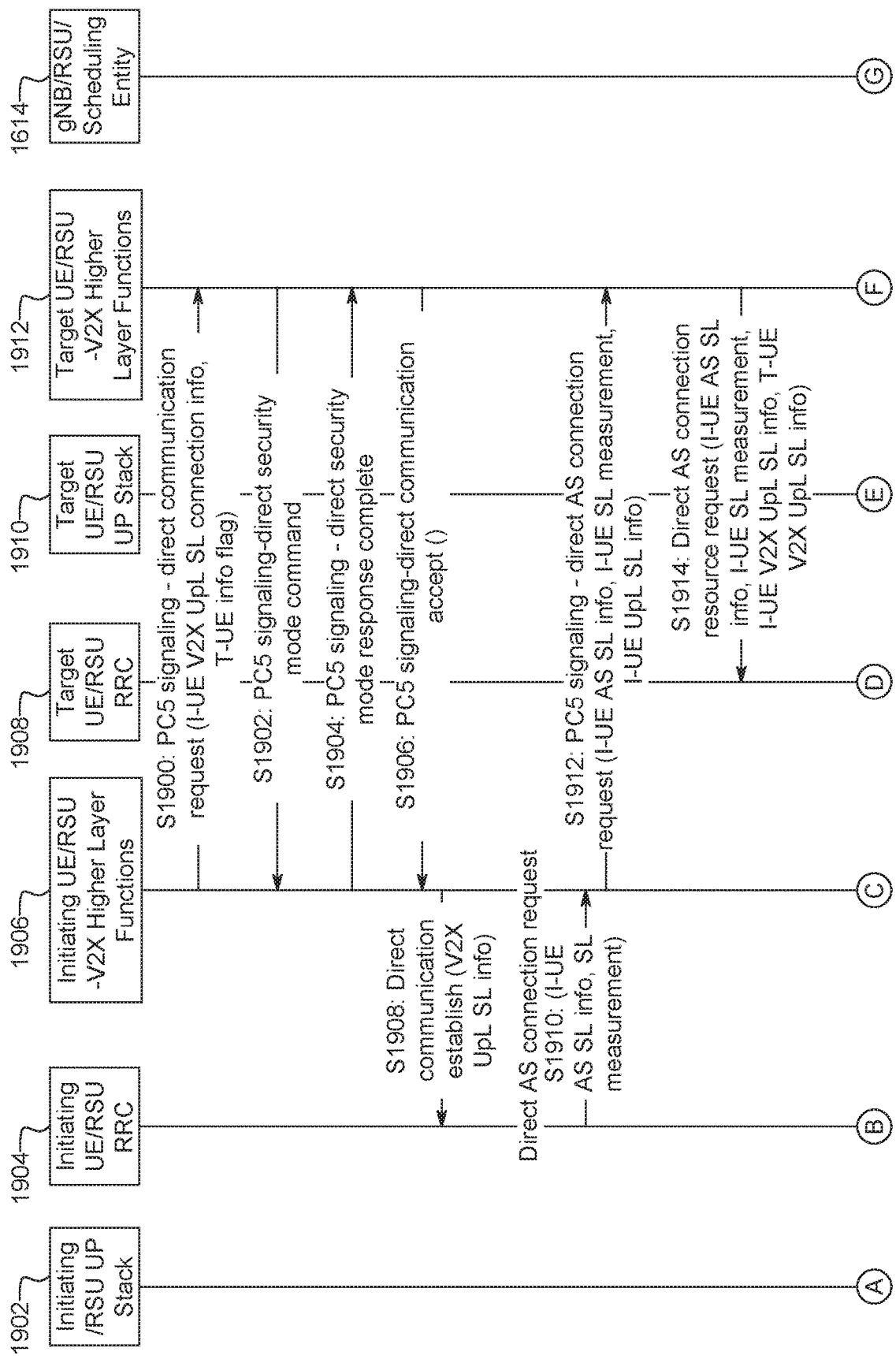
FIGS. 19A-19C show a unicast connection establishment method in which a target UE PC5 configures an initiating UE, or assists the configuration of a target UE in accordance with an exemplary embodiment.
Figure 19B:
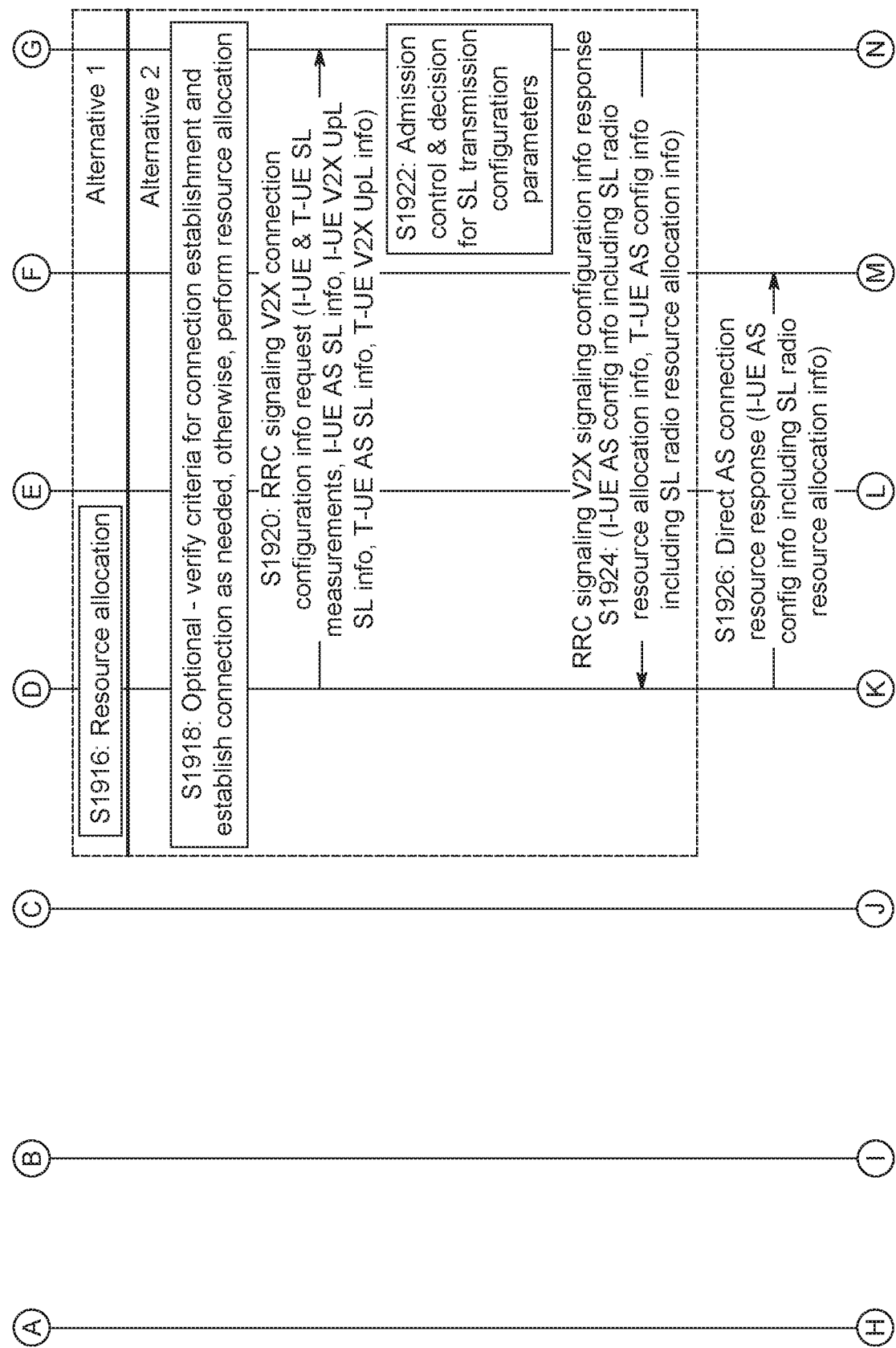
Figure 19C:
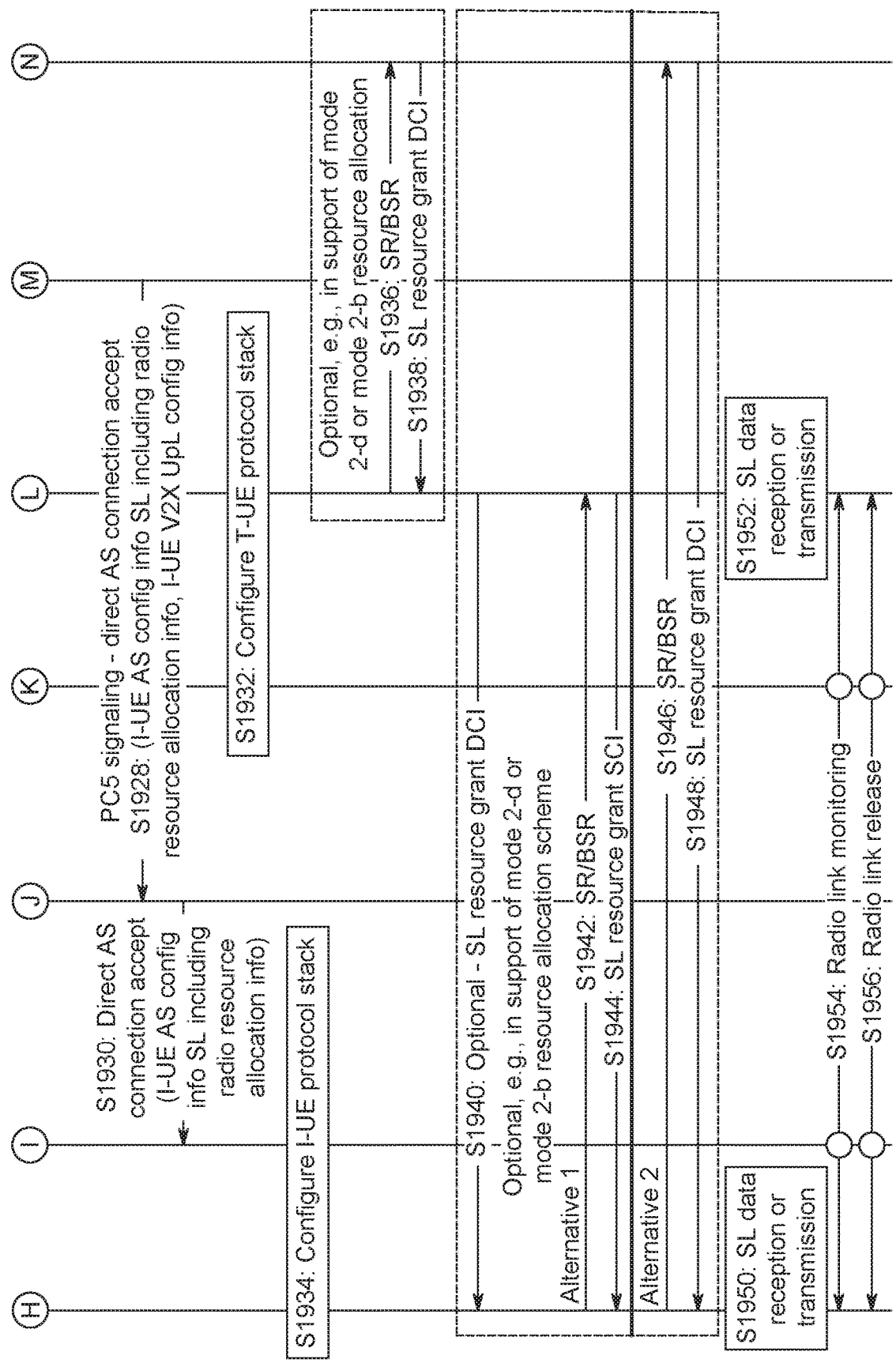

FIGS. 19A-C illustrate the steps for connection establishment where the I-UE is configured by the T-UE or by the T-UE in coordination with the scheduling entity. Furthermore, in this embodiment of connection establishment procedure, the V2X upper layer configuration of the I-UE is carried jointly with the AS layer configuration of the I-UE using PC5-S signaling from the T-UE to the I-UE. Additionally, the V2X upper layer connection establishment procedure is carried out independently from the V2X AS layer connection establishment procedure.

FIGS. 19A-C show Initiating/RSU UP Stack 1902, Initiating UE/RSU RRC 1904, Initiating UE/RSU-V2X Higher Layer Functions 1906, Target UE/RSU RRC 1908, Target UE/RSU UP Stack 1910, Target UE/RSU-V2X Higher Layer Functions 1912, and gNB/RSU/Scheduling Entity 1614. In step S1900, a PC5 signaling—direct communication request is sent. In step S1902, PC5 signaling—direct security mode command is sent. In step S1904, a PC5 signaling—direct mode response complete message is sent. In step S1906, a PC5 signaling—direct communication accept message is sent. In step S1908, direct communication is established. In step S1910, a direct AS connection request is sent. In step S1912, a PC5 signaling—direct AS connection request is sent from the Initiating UE/RSU-V2X Higher Layer Functions 1906 to the Target UE/RSU-V2X Higher Layer Functions 1912. In step S1914, a Direct AS connection resource request is sent. In step S1916 (Alternative 1), resource allocation is performed. Alternative 2 can include steps S1918, S1920, S1922, and S1924. In step S1918 (optional), verification of criteria for connection establishment and a connection is established as needed, otherwise, resource allocation is performed. In step S1920, a RRC signaling V2X connection configuration information request is sent. In step S1922, admission control and decision for SL transmission configuration parameters is performed. In step S1924, a RRC signaling V2X signaling configuration information response is sent. In step S1926, a Direct AS connection resource response is sent.

In step S1928, a PC5 signaling—direct AS connection accept message is sent. In step S1930, a Direct AS connection accept message is sent. In step S1932, a T-UE protocol stack is configured. In step S1934, an I-UE protocol stack is configured. Steps S1936 and S1938 are optional. In step S1936, SR/BSR is sent from the Target UE/RSU RRC 1908 to the gNB/RSU/Scheduling Entity 1614. In step S1938, a SL resource grant DCI is sent from the gNB/RSU/Scheduling Entity 1614 to the Target UE/RSU UP Stack 1910. Steps S1940, S1942, and S1944 are also optional steps as Alternative 1, and steps S1946 and S1948 are optional steps as Alternative 2. In step S1940, a SL resource grant DCI message is sent. In step S1942, a SR/BSR is sent. In step S1944, an SL resource grant SCI is sent. In Alternative 2, in step S1946, the SR/BSR is sent from the Initiating/RSU UP Stack 1902 to the gNB/RSU/Scheduling Entity 1614. In step S1948, a SL resource grant DCI is sent from the gNB/RSU/Scheduling Entity 1614 to the Initiating/RSU UP Stack 1902. In step S1950, SL data reception or transmission is performed by the Initiating/RSU UP Stack 1902. In step S1952, SL data reception or transmission is performed by the Target UE/RSU UP Stack 1910. In step S1954, radio link monitoring is performed. In step S1956, radio link release is performed.

Figure 20A:
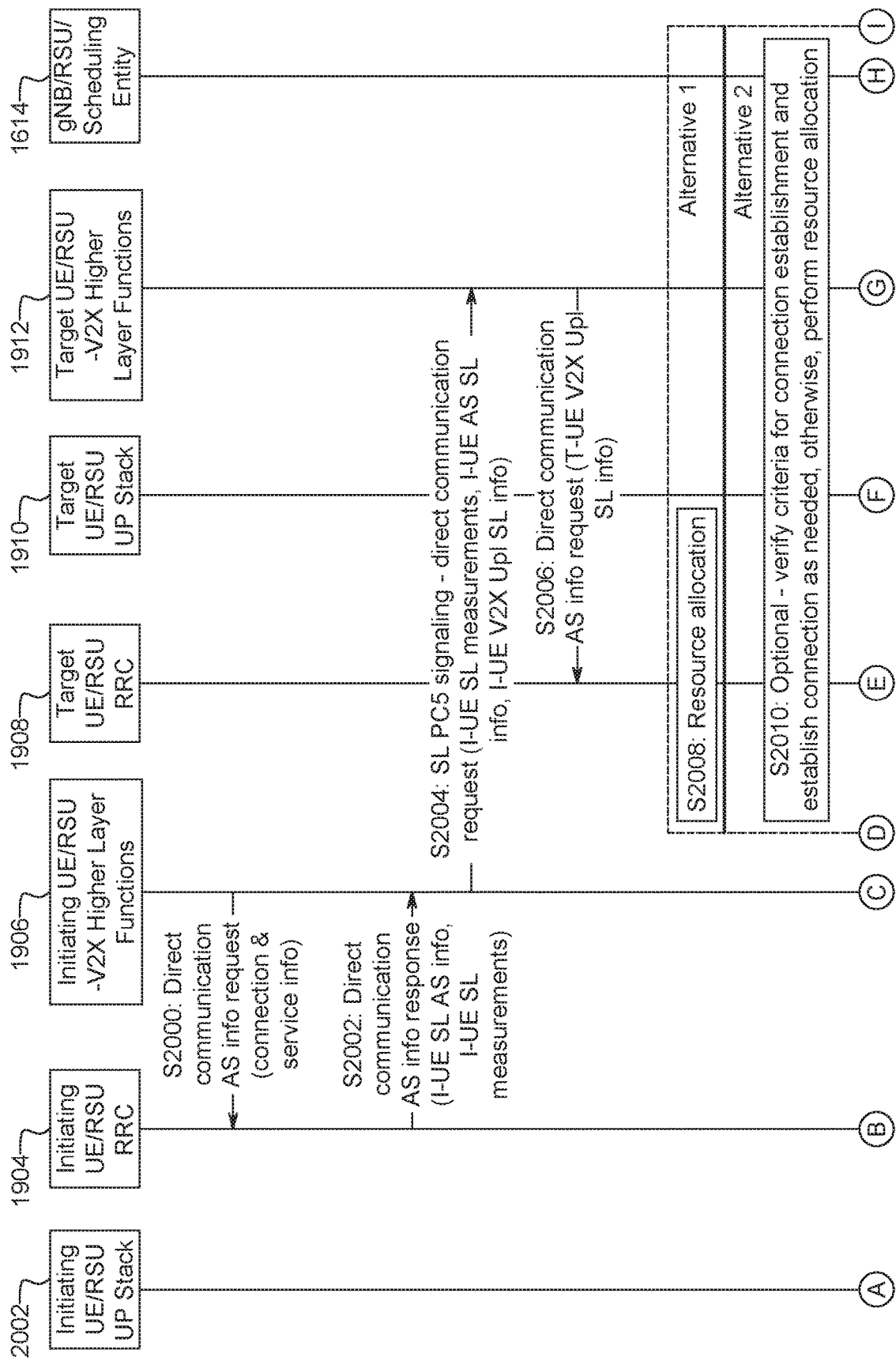
FIGS. 20A-20C show a unicast connection establishment method in which a target UE PC5 configures an initiating UE, or assists the configuration of a target UE in accordance with an exemplary embodiment.
Figure 20B:
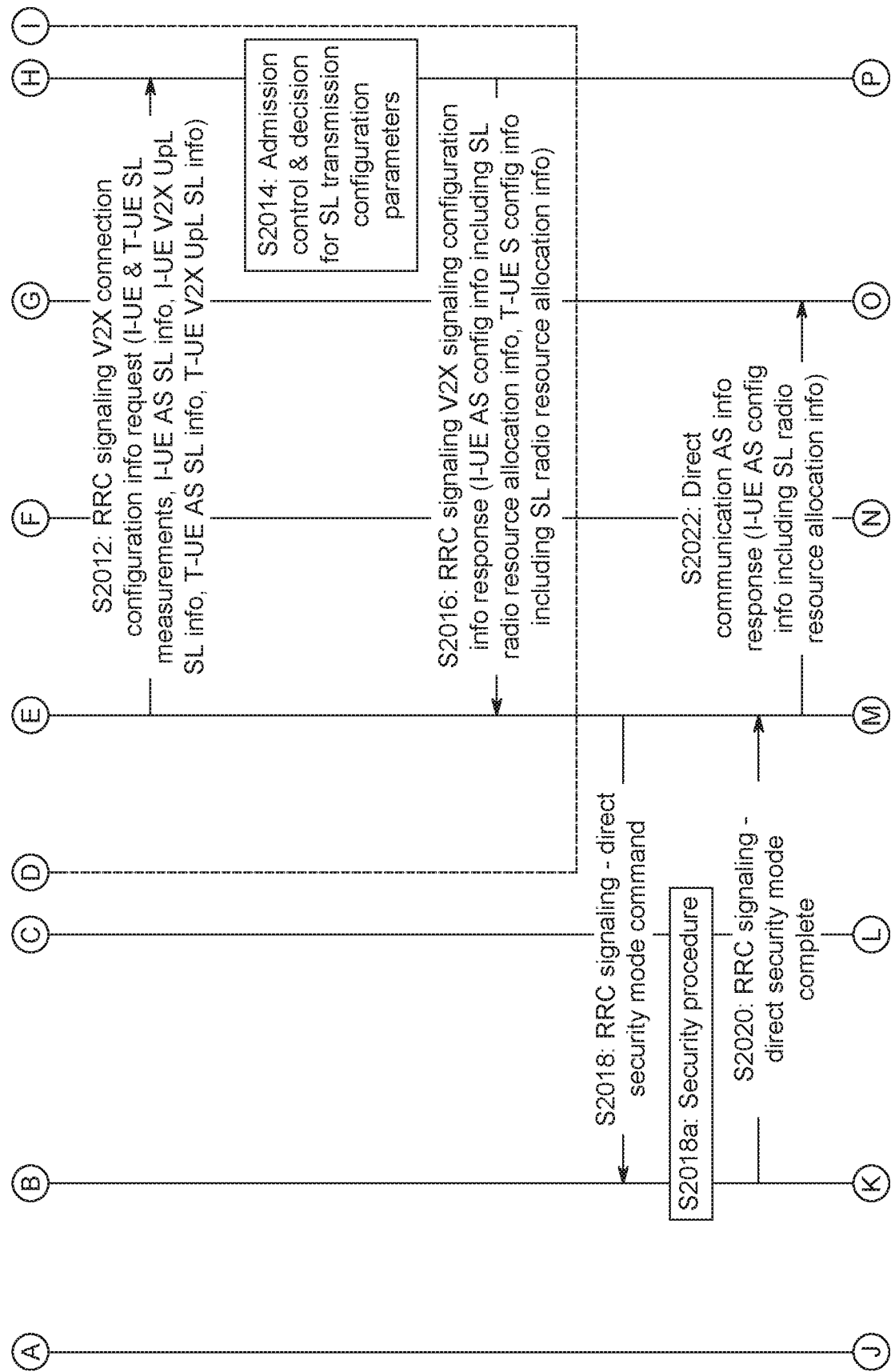
Figure 20C:
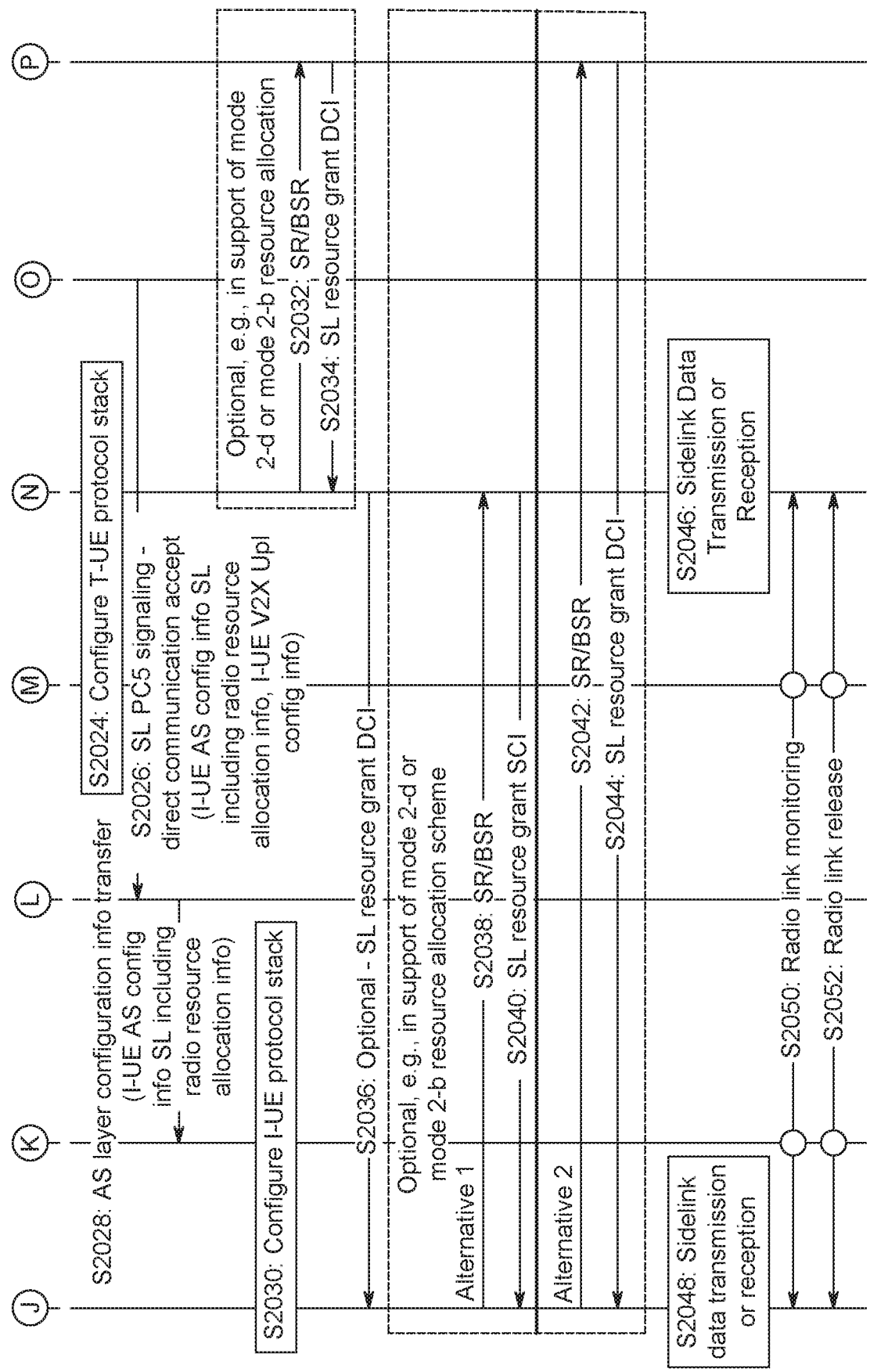

FIGS. 20A-C illustrate the steps for connection establishment where the I-UE is configured by the T-UE or by the T-UE in coordination with the scheduling entity. Furthermore, in this embodiment of a connection establishment procedure, the V2X upper layer configuration of the I-UE is carried jointly with the AS layer configuration of the I-UE using PC5-S signaling from the T-UE to the I-UE.

FIGS. 20A-C show Initiating UE/RSU UP Stack 2002, Initiating UE/RSU RRC 1904, Initiating UE/RSU-V2X Higher Layer Functions 1906, Target UE/RSU RRC 1908, Target UE/RSU UP Stack 1910, Target UE/RSU-V2X Higher Layer Functions 1912, and gNB/RSU/Scheduling Entity 1614. In step S2000, a direct communication AS information request is sent from the Initiating UE/RSU-V2X Higher Layer Functions 1906 to the Initiating UE/RSU RRC 1904. In step S2002, direct communication AS information response is sent from the Initiating UE/RSU RRC 1904 to the Initiating UE/RSU-V2X Higher Layer Functions 1906. In step S2004, an SL PC5 signaling-direct communication request is sent from the Initiating UE/RSU-V2X Higher Layer Functions 1906 to the Target UE/RSU-V2X Higher Layer Functions 1912. In step S2006, a direct communication AS information request is sent from the Target UE/RSU-V2X Higher Layer Functions 1912 to the Target UE/RSU RRC 1908.

Steps S2008, S2010, S2012, S2014, and S2016 can be optional steps. In step S2008 (Alternative 1) resource allocation can be performed. Alternative 2 is steps S2010, S2012, S2014, and S2016. In step S2010, criteria for connection establishment is verified and connection is established as needed, otherwise, resource allocation is performed. In step S2012, a RRC signaling V2X connection configuration information request is sent from the Target UE/RSU RRC 1908. In step S2014, admission control and decision for SL transmission configuration parameters is performed. In step S2016, a RRC signaling V2X signaling configuration information response is sent from the gNB/RSU/Scheduling Entity 1614 to the Target UE/RSU RRC 1908. In step S2018, a RRC signaling—direct security mode command is sent from the Target UE/RSU RRC 1908 to the Initiating UE/RSU RRC 1904. In step S2018a, a security procedure can be performed. In step S2020, a RRC signaling-direct security mode complete message is sent from the Initiating UE/RSU RRC 1904 to the Target UE/RSU RRC 1908. In step S2022, a direct communication AS information response is sent from the Target UE/RSU RRC 1908 to the Target UE/RSU-V2X Higher Layer Functions 1912.

In step S2024, configuring of the T-UE protocol stack is performed. In step S2026, an SL PC5 signaling—direct communication accept message is sent from the Target UE/RSU-V2X Higher Layer Functions 1912 to the Initiating UE/RSU-V2X Higher Layer Functions 1906. In step S2028, an AS layer configuration information transfer message is sent from the Initiating UE/RSU-V2X Higher Layer Functions 1906 to the Initiating UE/RSU RRC 1904. In step S2030, configuration of the I-UE protocol stack is performed. Steps S2032 and S2034 are optional. In step S2032, SR/BSR is sent from the Target UE/RSU UP Stack 1910 to the gNB/RSU/Scheduling Entity 1614. In step S2034, an SL resource grant DCI is sent from the gNB/RSU/Scheduling Entity 1614 to the Target UE/RSU UP Stack 1910.

In step S2036 (an optional step), the SL resource grant DCI can be sent from the Target UE/RSU UP Stack 1910 to the Initiating UE/RSU UP Stack 2002. Steps S2038 and S2040 are optional steps and are Alternative 1. In step S2038, a SR/BSR is sent from the Initiating UE/RSU UP Stack 2002 to the Target UE/RSU UP Stack 1910. In step S2040, a SL resource grant SCI is sent from the Target UE/RSU UP Stack 1910 to the Initiating UE/RSU UP Stack 2002. In Alternative 2, in step S2042, the SR/BSR is sent from the Initiating UE/RSU UP Stack 2002 to the gNB/RSU/Scheduling Entity 1614. In step S2044, the gNB/RSU/Scheduling Entity 1614 sends the SL resource grant DCI to the Initiating UE/RSU UP Stack 2002. In step S2046, sidelink data transmission or reception is performed. In step S2048, sidelink data transmission or reception is performed. In step S2050, radio link monitoring is performed. In step S2052, radio link release is performed.

Figure 21A:
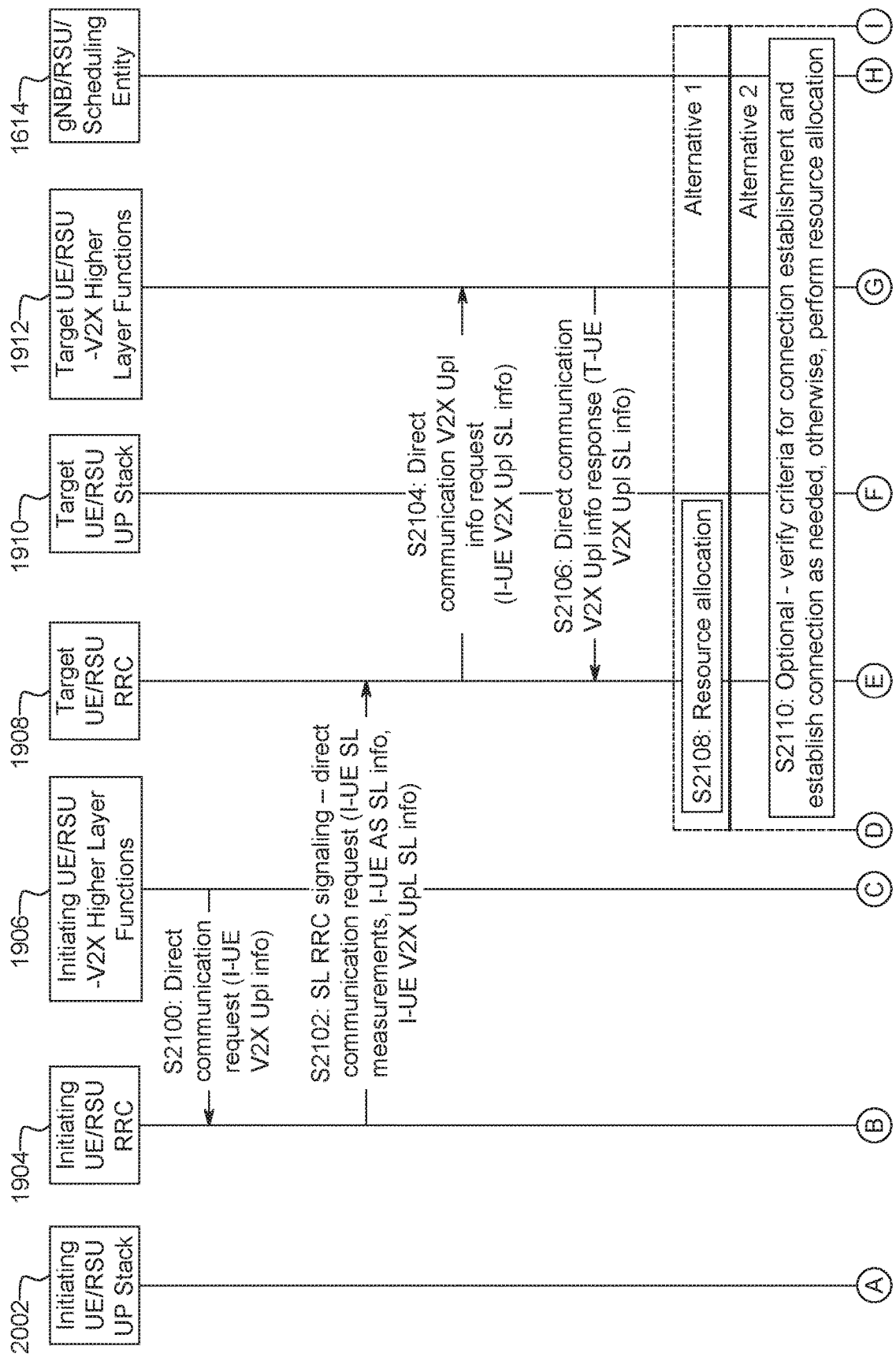
FIGS. 21A-21C show unicast connection establishment method in which a target UE RRC configures an initiating UE in accordance with an exemplary embodiment.
Figure 21B:
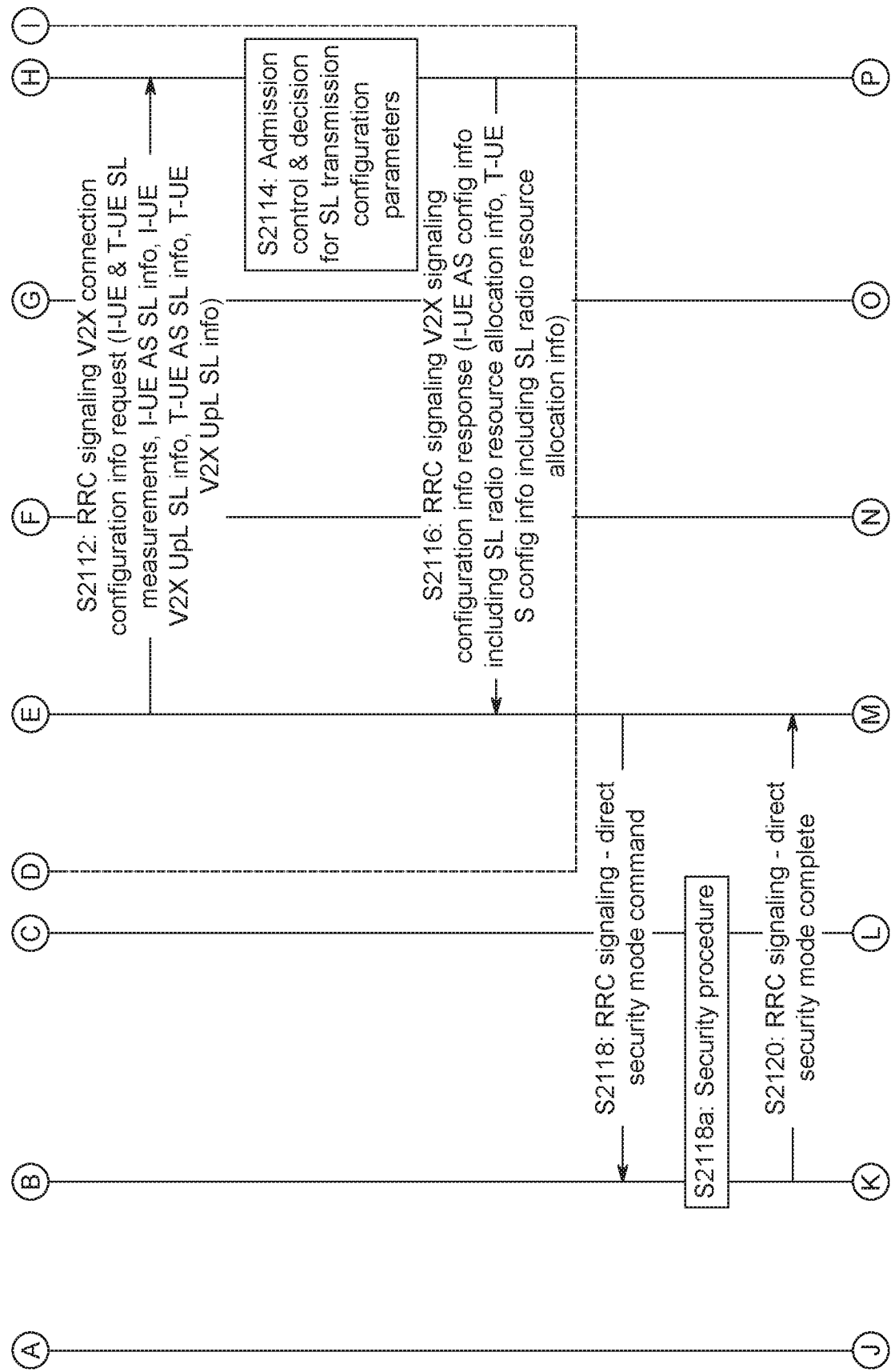
Figure 21C:
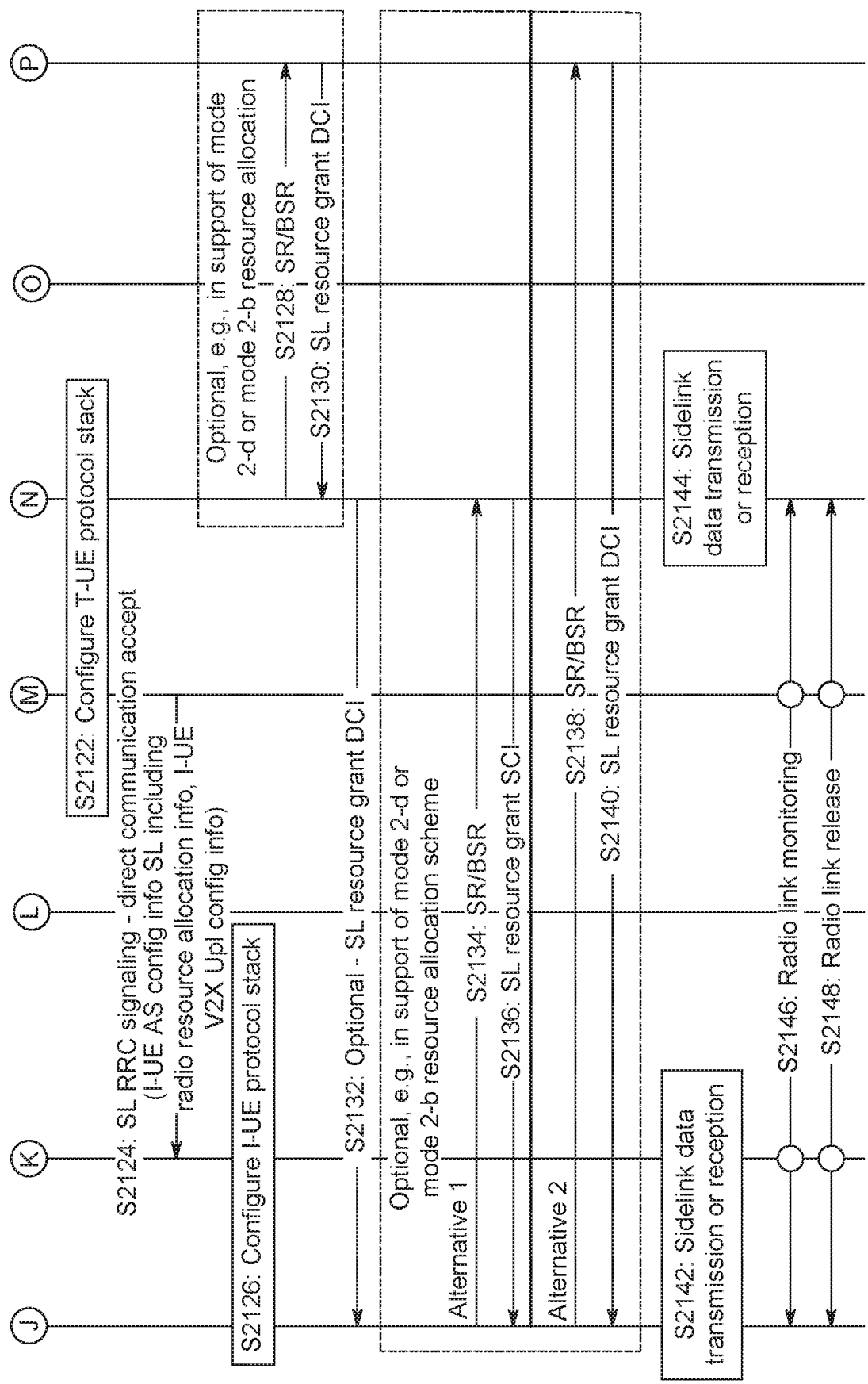

FIGS. 21A-C illustrate the steps for connection establishment where the I-UE is configured by the T-UE or by the T-UE in coordination with the scheduling entity. Furthermore, in this embodiment of a connection establishment procedure, the V2X upper layer configuration of the I-UE is carried jointly with the AS layer configuration of the I-UE using RRC signaling from the T-UE to the I-UE.

In step S2100, a direct communication request is sent from the Initiating UE/RSU-V2X Higher Layer Functions 1906 to the Initiating UE/RSU RRC 1904. In step S2102, a SL RRC signaling-direct communication request is sent from the Initiating UE/RSU RRC 1904 to the Target UE/RSU RRC 1908. In step S2104, a direct communication V2X UPL information request is sent from the Target UE/RSU RRC 1908 to the Target UE/RSU-V2X Higher Layer Functions 1912. In step S2106, a direct communication V2X UPL information response is sent from the Target UE/RSU-V2X Higher Layer Functions 1912 to the Target UE/RSU RRC 1908. In step S2108 (Alternative 1), resource allocation is performed. Alternative 2 includes steps S2110, S2112, S2114, and S2116. In step S2110, an optional step, criteria is verified for connection establishment and connection is established as needed, otherwise, resource allocation is performed. In step S2112, a RRC signaling V2X connection configuration information request is sent from the Target UE/RSU RRC 1908 to the gNB/RSU/Scheduling Entity 1614. In step S2114, admission control and a decision for SL transmission configuration parameters can be performed. In step S2116, the gNB/RSU/Scheduling Entity 1614 sends a RRC signaling V2X signaling configuration information response to the Target UE/RSU RRC 1908. In step S2118, a RRC signaling—direct security mode command is sent from the Target UE/RSU RRC 1908 to the initiating UE/RSU UP Stack 2002. In step S2118a, a security procedure is performed. In step S2120, a RRC signaling—direct security mode complete message is sent from the Initiating UE/RSU RRC 1904 to the Target UE/RSU RRC 1908.

In step S2122, the T-UE protocol stack is configured. In step S2124, a SL RRC signaling—direct communication accept message is sent from the Target UE/RSU RRC 1908 to the Initiating UE/RSU RRC 1904. In step S2126, the I-UE protocol stack is configured. In step S2128, an optional step, a SR/BSR is sent from the Target UE/RSU UP Stack 1910 to the gNB/RSU/Scheduling Entity 1614. In step S2130, the gNB/RSU/Scheduling Entity 1614 sends a SL resource grant DCI message to the Target UE/RSU UP Stack 1910. In step S2132, an optional step, the Target UE/RSU UP Stack 1910 sends an SL resource grant DCI message to the Initiating UE/RSU UP Stack 2002. Steps S2134 and S2136 are Alternative 1. Steps S2138 and S2140 are Alternative 2. In step S2134, an SR/BSR message is sent from the Initiating UE/RSU UP Stack 2002 to the Target UE/RSU UP Stack 1910. In step S2136, an SL resource grant SCI message is sent from the Target UE/RSU UP Stack 1910 to the Initiating UE/RSU UP Stack 2002. In step S2138, the SR/BSR message is sent from the Initiating UE/RSU UP Stack 2002 to the gNB/RSU/Scheduling Entity 1614. In step S2142, sidelink data transmission or reception is performed by the Initiating UE/RSU UP Stack 2002. In step S2144, sidelink data transmission or reception is performed by the Target UE/RSU UP Stack 1910. In step S2146, radio link monitoring is performed. In step S2148, a radio link release is performed.

Unicast Connection Configuration Parameters
UE Assistance Information

In support of a unicast connection configuration or groupcast connection configuration or broadcast connection configuration, a T-UE can provide one or more of the following configuration parameters to the I-UE or to the scheduling entity. Such information can be provided by a T-UE acting as a receiving UE of protocol stack configuration across the PC5 interface, so it can be configured by the scheduling entity, or the J-UE or the J-UE in coordination with the scheduling entity. Examples of related use cases are illustrated in FIG. 16, FIG. 17 or FIG. 18. In an alternative embodiment, a J-UE can provide one or more of the following configuration parameters to the T-UE or to the scheduling entity. Such information can be provided by an I-UE acting as a receiving UE of protocol stack configuration across the PC5 interface, so it can be configured by the scheduling entity, or the T-UE or the T-UE in coordination with the scheduling entity. Examples of related use cases are illustrated in FIG. 18, FIG. 20 or FIG. 21. One or more of the information below can be provided to the scheduling entity for both the J-UE and the T-UE to assist the scheduling entity for the configuration of I-UE or T-UE.

| Information Element | Description |
| --- | --- |
| Capability information | The capability information can include the Receiver capability information or the transmitter capability information. The capability information can be related to one or more of the following: V2X Upper layer capability (e.g., security capability), SDAP capability, PDCP capability, RLC capability, MAC capability, baseband capability, RF including RF band and subband capability or any other specific feature capability to assist the scheduling entity or the I-UE in the configuration of the T-UE. The information can be in reference to capability information, e.g., capability sets provided by the scheduling entity or the I-UE (e.g., FIG. 16, FIG. 17, or FIG. 18), or the T-UE (e.g., FIG. 19, FIG. 20, or FIG. 21), for example, in RRC dedicated signaling over PC5 interface, or in system information broadcast signaling over PC5 interface using PC5-S signaling, or PC5-RRC signaling. |
| V2X Reception Frequency list | The frequency(ies) on which the UE is interested to receive V2X sidelink communication. This information can also include sub-frequencies information, e.g., specific BWP of the carrier frequency. The information can be in reference to V2X reception frequency or sub-frequency list provided by the scheduling entity or the I-UE (e.g., FIG. 16, FIG. 17, or FIG. 18), or the T-UE (e.g., FIG. 19, 20 or FIG. 21), for example, in RRC dedicated signaling over PC5 interface, or in system information broadcast signaling over PC5 interface using PC5-S signaling, or PC5-RRC signaling. |
| V2X Transmission Frequency list | The frequency(ies) on which the UE is interested to Transmit V2X sidelink communication. This information can also include sub-frequencies information, e.g., specific BWP of the carrier frequency. The information can be in reference to transmission frequency or sub-frequency list provided by the scheduling entity or the I-UE (e.g., FIG. 16, FIG. 17, or FIG. 18), or the T-UE (e.g., FIG. 19, FIG. 20, or FIG. 21), for example, in RRC dedicated signaling over PC5 interface, or in system information broadcast signaling over PC5 interface using PC5-S signaling, or PC5-RRC signaling. The V2X sidelink transmission can be non-Uu interface relay V2X sidelink transmission. |
| Destination list | The list of destinations (or destination IDs) for V2X sidelink communication. |
| Source ID | The source ID of the UE providing the assistance information |
| QoS Flow List | List of QoS Flows for the V2X Connection, and the QoS profile for each QoS Flow in the list. |

| Information Element | Description |
| --- | --- |
| V2X Upper layer User Information | Information specific to V2X upper layer or application layer. This information can be transferred transparently by the AS layer. |
| SL measurement | Measurements (e.g., RSRP, RSRQ, RSSI, CBR, CR, etc.) |
| RLC Mode indication | Indicate the mode (RLC UJM, RLC AM or RLC TM) for each sidelink radio bearer associated with each Layer-2 destination listed herein. |
| Cast Type | Indicate the cast type (unicast, groupcast or broadcast) for each Layer-2 destination listed herein. |

Configuration Parameters of T-UE or the I-UE

One or more of the following parameters can be configured into the T-UE in support of connection configuration by the scheduling entity or the I-UE in coordination with the scheduling entity. Examples of such a connection configuration can be the connection establishment procedure depicted in FIG. 16, FIG. 17, and FIG. 18. Similarly, one or more of the following parameters can be configured into the I-UE in support of connection configuration by the scheduling entity or the T-UE in coordination with the scheduling entity. Examples of such a connection configuration can be the connection establishment procedure depicted in FIG. 19, FIG. 20, and FIG. 21.

| Information Element | Description |
| --- | --- |
| SL RNTI PC5 | |
| SL Radio bearer Configuration | List of Radio bearers (data radio bearer or signaling radio bearer) to be added to the UE connection context. For each radio bearer added, the list of QoS flow mapped to the radio bearer. Each QoS Flow is represented by a QFI and radio bearer is represented by a radio bearer identity. For each radio bearer to be added, the corresponding destination ID. List of Radio bearer (data radio bearer or signaling radio bearer) to be released from the connection context. Transmission profile for transmission of data associated with each radio bearer being added. The transmission profile can be represented by a transmission profile identifier. SDAP configuration for the handling of QoS Flow mapping to bearer for each radio bearer being added to the UE context. Each SDAP configuration includes the list of flows (represented by a QFI) mapped to the radio bearer and list of flow to be released from a radio bearer. QFI is an integer from 0 to the maximum number of QFI mapped to the radio bearer. PDCP Configuration for each radio bearer being added: size of PDCP sequence number of PDCP PDUs transmitted from this UE to destination UE; size of PDCP sequence number from peer destination UE to this UE; header compression profile choices; whether ciphering is enabled or disabled; whether integrity protection is enabled or disabled; whether PDCP duplication is supported and number of duplication branches; logical channel identity associated with RLC for each data branch or path associated with the bearer; t-reordering, specify re-ordering timer value; Status report required, for AM DRBs, indicates whether the DRB is configured to send a PDCP status report to the peer transmitter; discard timer. RLC Configuration (for each radio bearer being added) including configuration of the corresponding logical channel in MAC, association with a radio bearer and configuration parameters for RLC protocol operation such as timers, RLC mode (i.e., unacknowledged mode, acknowledge mode, transparent mode, peer RLC polling, sequence number). Specifically, the logical channel configuration can include the following: the sidelink logical channel priority, i.e., the priority associated with the sidelink logical channel, where an increasing priority value indicates a lower priority level; the sidelink prioritized bit rate which sets the Prioritized Bit Rate (PBR), i.e., the data rate that must be served on the sidelink logical channel before a sidelink logical channel of lower priority is served; the sidelink bucket size duration which set the Bucket Size Duration (BSD) for the sidelink, i.e., the duration to fill up the bucket size at the rate of the prioritized bit rate. The PBR together with the BSD defined the size of a prioritized bucket for the sidelink logical channel. As long as there is data in the sidelink prioritized bucket, and there is a sidelink grant that can serve the sidelink logical channel, then the sidelink logical channel is prioritized for sidelink resource grant allocation over sidelink logical channels of lower priority; set of allowed V2X serving cells, which sets the allowed cell(s) for transmission; set of allowed V2X SubCarrier Spacings (SCSs) which sets the allowed Subcarrier Spacing(s) for transmission; set of allowed V2X Band Width Parts (BWPs) which sets the allowed bandwidth parts for transmission; Maximum Allowed SL-SCH duration which sets the maximum SL-SCH duration allowed for transmission; allowed latency which sets the maximum allowed latency from the time the data becomes available for sidelink transmission to the time the data transmission ends; allowed SL-SCH K2 duration which sets the maximum allowed latency from the time the SL-SCH grant becomes available for sidelink transmission to the time the SL-SCH data transmission begins; allowed RATs which sets the allowed RATs for transmission; allowed RAT versions which sets the allowed RAT versions for transmission; allowed transmission profiles which sets the allowed transmission profiles for transmission; configuration parameters for RLC protocol operation: RLC mode operation either AM, UM or TM. For AM: source-AM-RLC to indicate if transmitted RLC PDU is AM. Destination-AM-RLC to indicate if received RLC PDU is AM; For UM: source-UM-RLC to indicate if transmitted RLC PDU is UM. Destination-UM-RLC to indicate if received RLC PDU is UM; size of RLC sequence number; maximum retransmission threshold, pollByte, PollPDU, timer for RLC AM t-Poll retransmit, timer for reassembly t-Reassembly, timer for status reporting t-StatusProhibit MAC Configuration: DRX Configuration, Scheduling Request Configuration including scheduling request between V2X UEs; Buffer Status Reporting Configuration, Power Headroom Reporting Configuration, data inactivity timer which can be sued for releasing the sidelink connection upon data inactivity; csi-Mask; |

-continued

| Information Element | Description |
|---|---|
| | The Source ID of the peer V2X UE with which V2X communication is being established. For example, when T-UE is being configured, the Source ID can be the V2X UE ID (e.g., ProSE UE ID) of the I-UE. Similarly, when I-UE is being configured, the Source ID can be the V2X UE ID (e.g., ProSE UE ID) of the T-UE. |
| Radio Configuration | The radio resource configuration can include one or more of the following:<br>pool of resources when 5 G RAN schedules TX resources for V2X sidelink communications.<br>pool of resources when a scheduling entity, e.g., a UE schedules over PC5 interface, TX resources for V2X sidelink communications.<br>Pool of resources when a UE performs autonomously resource allocation for V2X sidelink communications.<br>Mapping between physical transmission configuration parameters, channel congestion measurements such as CBR or CR range and QoS identifier range. Such mapping can be used, for example, in support of autonomous V2X resource selection or when a scheduling entity, e.g., a UE schedules over PC5 interface, TX resources for V2X sidelink communications. |
| LCG Configuration | Mapping between LCGs and QoS profiles, e.g., in support of configuration to the UE for connectionless transmission. QoS profile can be represented by a QoS profile identifier, e.g., VQI or 5QI. In LTE V2X, the QoS information mapped to LCG is provided in the form of PPPP or PPPR. In support of bearer-based model, and with NR V2X having more diverse QoS requirement, it is proposed to provide QoS mapping to LCG by means of QoS identifiers, where the corresponding QoS profile parameters are preconfigured, provisioned or configured into the UE. Each LCG can be configured with a list of associated QoS identifiers. |
| V2X Upper layer User Information | Information specific to V2X upper layer or application layer of the peer V2X UE with which V2X communication is being established. For example, when T-UE is being configured, this IE can be the V2X Upper layer user information of the I-UE. Similarly, when I-UE is being configured, this IE can be the V2X upper layer user information of the T-UE. This information can be transferred transparently by the AS layer. |
| SL measurement | Measurements (e.g., RSRP, RSRQ, RSSI, CBR, CR, etc.) |
| Preemption Priority | This parameter can be used to perform preemption, e.g., during carrier sensing for autonomous resource allocation or can be used to perform preemption when the UE this information is being configured to, act as a scheduling entity for other UEs. |

Groupcast Connection Management

High Level Groupcast Connection Management Procedure

Figure 22:
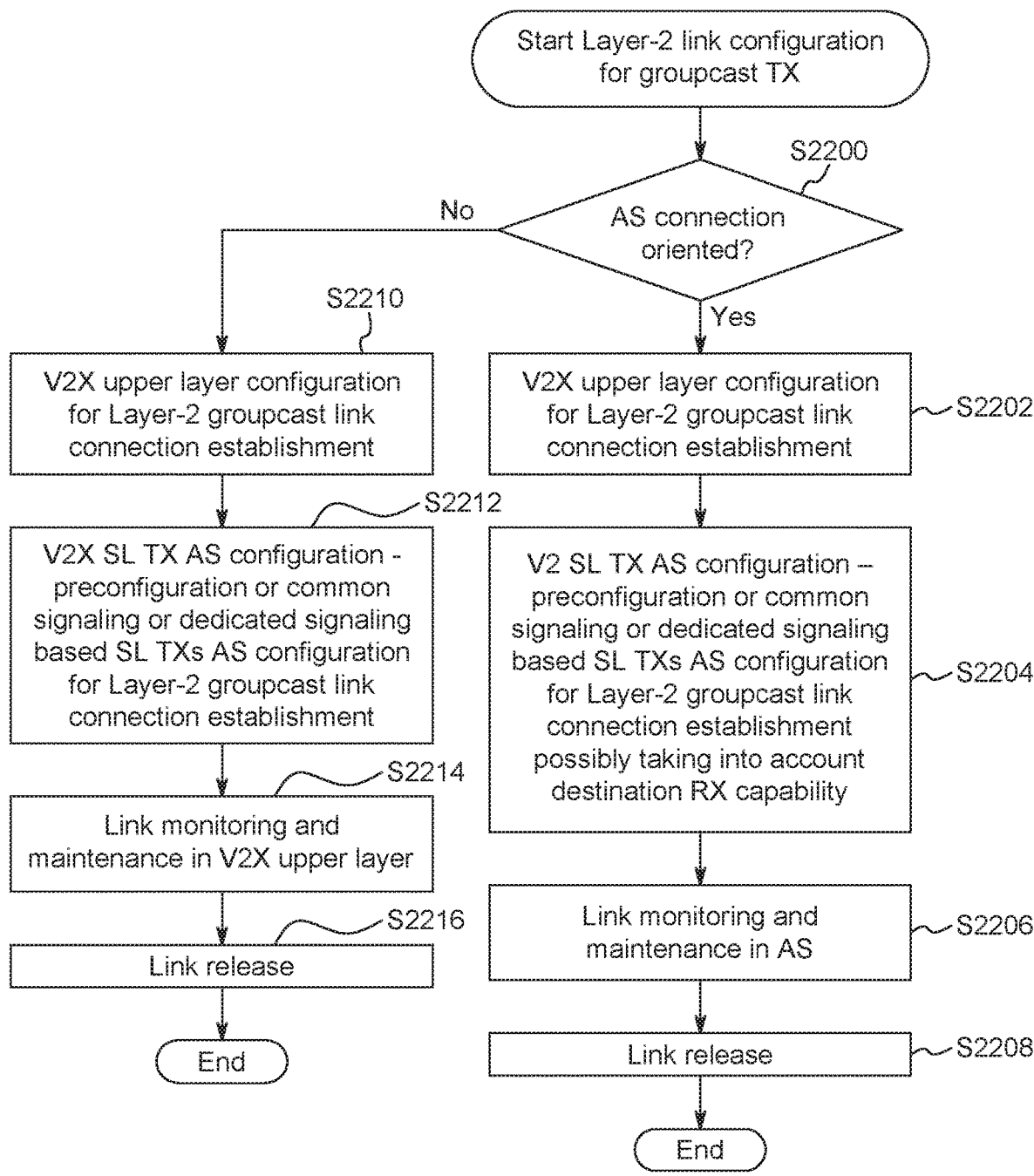
FIG. 22 shows a transmission side groupcast method for Layer-2 link management in accordance with an exemplary embodiment.

FIG. 22 is a high-level illustration of a transmitter side operation for groupcast layer-2 link management including connection establishment. In step S2200, it is determined whether AS is connection oriented. Step S2202 and Step S2210 refer to groupcast connection establishment and connection context associations in V2X upper layer (V2X UpL) between peer V2X UEs. A groupcast connection can also be established in the AS layer, with connection establishment signaling between the group lead UE and group member V2X UEs for configuration and associations of AS contexts between the group UE and the group member V2X UEs, before transfer of groupcast packets as depicted in step S2204. In this case, the receiver of group member V2X UEs is configured with dedicated configuration possibly including dedicated radio resource configuration for unicast reception taking into account the group member UEs capability. As part of the groupcast connection establishment procedure, the UE involved in the group cast communication can associate the groupcast AS context with the corresponding V2X upper layer groupcast context. In an alternative embodiment illustrated in step S2210, the AS can support the V2X upper layer groupcast connection with an AS connectionless configuration.

In this case, the AS is configured in an AS connectionless manner where AS resources are configured in a connectionless manner without taking into account, for example, the group members UE capability. In this case, there is no signaling for the receiver group members UE configuration required before reception of a V2X packet. The receiver group member AS is configured to common default parameters for V2X groupcast packet reception, and the transmitter transmit packet in broadcast manner from AS MAC perspective, where filtering of a received packet is performed based on source ID and destination ID encapsulated in the received MAC PDU. For connection-oriented AS resource configuration depicted in step S2204, PHY, MAC, RLC, PDCP and SDAP (when applicable) are configured for this specific groupcast connection in the receiver UE and transmitter UE before transfer of data packets takes place. A groupcast AS context consisting of configuration such as PHY channel configuration possibly including physical layer multicast radio resource configuration, transport channel configuration, HARQ entity configuration, logical channel configuration, bearer configuration possibly including security configuration, QoS flow configuration and association of these configurations across the AS protocol sublayers are created in both the transmitter UE and the receiver UE before transfer of a group cast data packet. Once step S2202 and step S2204 or step S2210 and step S2212 are completed, the transmitter UE and the receiver UE can exchange a packet (data or signaling) in a groupcast connection-oriented communication manner.

Step S2206 refers to link monitoring in the case of AS groupcast connection-oriented communication. The link monitoring can be realized in the AS, for example, based on radio link monitoring and beam management procedures. The link monitoring can trigger the execution of connection maintenance procedures such as connection reconfiguration, beam recovery, connection relocation or connection release. Link maintenance procedure can be triggered by the transmitter UE, the receiver UE or a third entity such as the scheduling entity. In the case of AS groupcast connectionless communication, the link monitoring referred to in step S2214 can be realized in the V2X upper layer, for example, based on a link keep-alive procedure carried out by the V2X upper layer. In this case, the link monitoring can trigger the execution of the transmitter side reconfiguration, connection relocation, connection release, or group reconfiguration including leaving a group and joining a new group. Also, in this case, a link maintenance procedure can be triggered by the transmitter UE, the receiver UE or a third entity such as the scheduling entity. In step S2208, link release is performed. Also, in step S2216, link release is performed.

Figure 23:
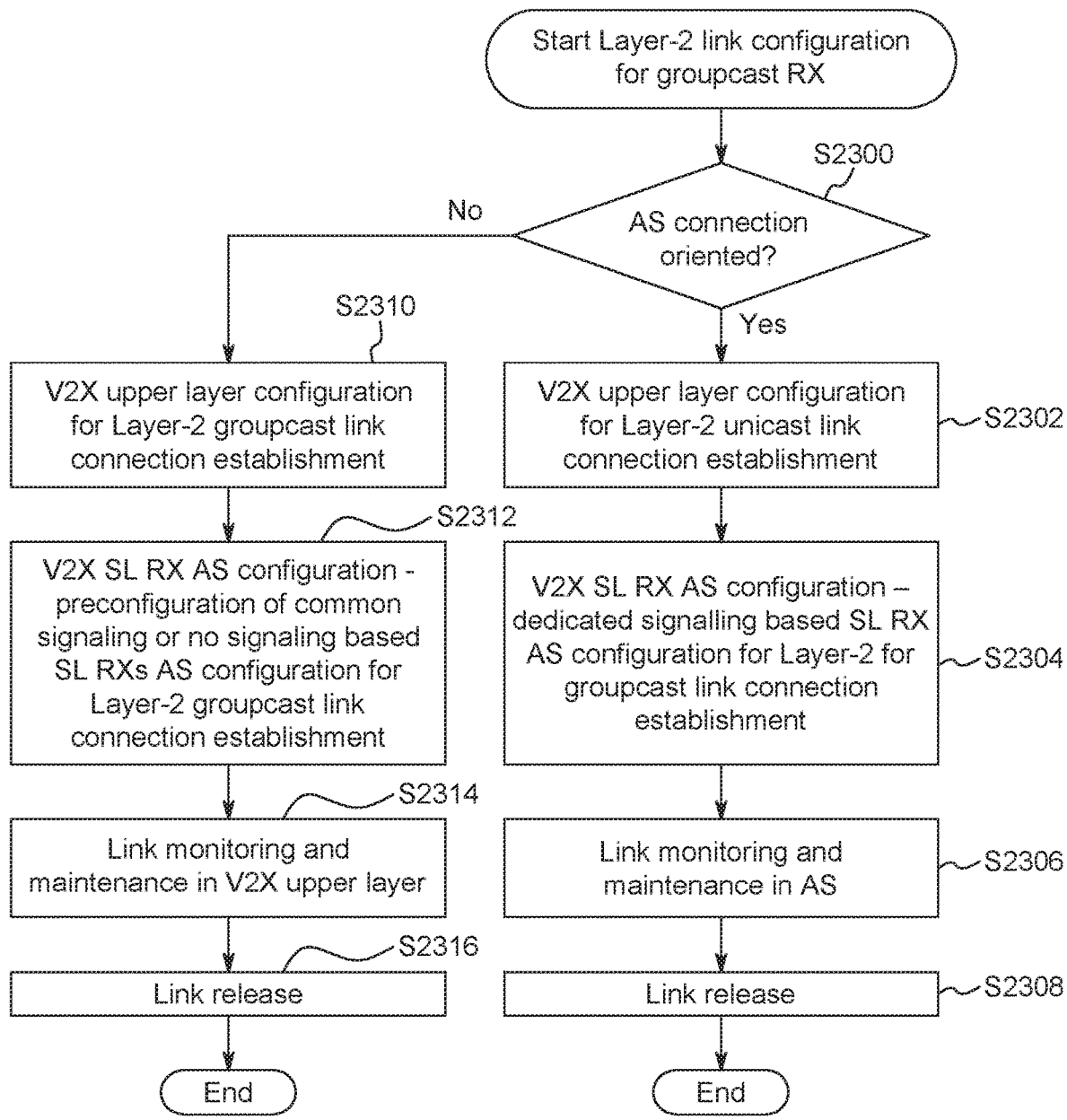
FIG. 23 shows a reception side groupcast method for Layer-2 link management in accordance with an exemplary embodiment.

FIG. 23 provides a high-level illustration of the receiver side operation for groupcast layer-2 link management including connection establishment. In step S2300, it is determined whether AS is connection oriented. If yes, in step S2302, V2X upper layer configuration is performed for Layer-2 unicast link connection establishment. If no, in step S2310, V2X upper layer configuration is performed for Layer-2 groupcast link connection establishment. In step S2304, V2X SL RX AS configuration—dedicated signaling based SL RX AS configuration for Layer-2 for groupcast link connection establishment is performed. In step S2306, link monitoring and maintenance in AS is performed. In step S2308, link release is performed. In step S2312, V2X SL RX AS configuration—preconfiguration of common signaling or no signaling based SL RXs AS configuration for Layer-2 groupcast link connection establishment is performed. In step S2314, link monitoring and maintenance in V2X upper layer is performed. In step S2316, link release is performed.

The details of the groupcast connection establishment procedure is similar to that of the unicast procedure. The configuration parameters are similar to the ones described above in the sections entitled "Configuration Parameters of T-UE or the I-EU" and "UE Assistance Information."

In one embodiment, groupcast communication can be configured by configuration individually, the group member UEs using the unicast configuration procedure described in the section entitled "Unicast Connection Management." Similarly, a connection for a new group member can be added using a unicast connection configuration procedure.

In an alternative embodiment, the groupcast connection is configured in a group manner. For a given group, certain UE capability in support of connection-oriented communication for a given group can be required from the group member UEs. Such capability can be preconfigured into the UE (e.g., SIM or ME), configured into the UE, for example, through broadcast signaling by a scheduling entity, for example, a UE or group lead acting as a scheduling entity or assisting the scheduling entity for resource configuration, or provisioned into the UE by the V2X control function. Assistance information including, e.g., scheduling formation for group member to request connection configuration or to discover connection configuration information can be configured into the UE. Such information can be provided in dedicated signaling to group member UE, or can be provided in a groupcast manner using, for example, the SL-MCCH (SL Multicast Control Channel), or can be provided in a broadcast manner using SCCH (Sidelink Control Channel) over SL-SCH (SL Shared Channel) or using STCH (Sidelink traffic channel) over SL-SCH (SL Shared Channel, or using SBCCH (Sidelink Broadcast Control Channel). Groupcast connection configuration information can be signaled on SL-MCCH or can be provided in a broadcast manner using SCCH (Sidelink Control Channel) over SL-SCH (SL Shared Channel) or using STCH (Sidelink traffic channel) over SL-SCH (SL Shared Channel) or using SBCCH (Sidelink Broadcast Control Channel). The configuration information can be periodically signaled.

In the configuration parameter described in the section entitled "Configuration Parameters of T-UE or the I-UE," the destination ID in the bearer configuration will be the groupcast group Identifier.

When the group management function is performed by the V2X upper layer or the application layer, the group as provided by the V2X upper layer to the AS might be too large, for groupcast connection management that is effective and efficient from a radio resource management perspective. The AS can subdivide an upper layer V2X group in subgroups which is communicated to the PHY layer in support of groupcast communication. The AS can assign a layer-2 destination ID to each subgroup with a mapping between AS subgroup IDs and the corresponding larger group layer-2 destination ID. The AS maintains a table of mappings between a subgroup layer-2 destination ID and the corresponding larger group ID. A groupcast connection configuration configured into a UE can include a table of mappings between a subgroup layer-2 destination ID and a corresponding larger group layer-2 destination ID. In one embodiment, in addition to the table of association between subgroup destination ID and group destination IDs, the groupcast connection configuration into UE can include an indication for whether V2X data for a subgroup destination ID should be relayed, and an indication indicating if the UE is requested to relay received data. For a given groupcast, the AS can configure the PHY with one or more of the following information:
   The group layer-2 destination ID;
   List of V2X UE ID (e.g., ProSe UE ID, UE ID or any other identifier that can be used by the UE as a source ID for the member UE) of the group members;
   The subgroup layer-2 destination ID;
   List of V2X UE ID (e.g., ProSe UE ID, U ID or any other identifier that can be used by the UE as a source ID for the member UE) of the subgroup members;
   For each subgroup, an indication requesting that data received for the subgroup is relayed or not relayed.

Configuration for V2X Broadcast Communication

Figure 24:
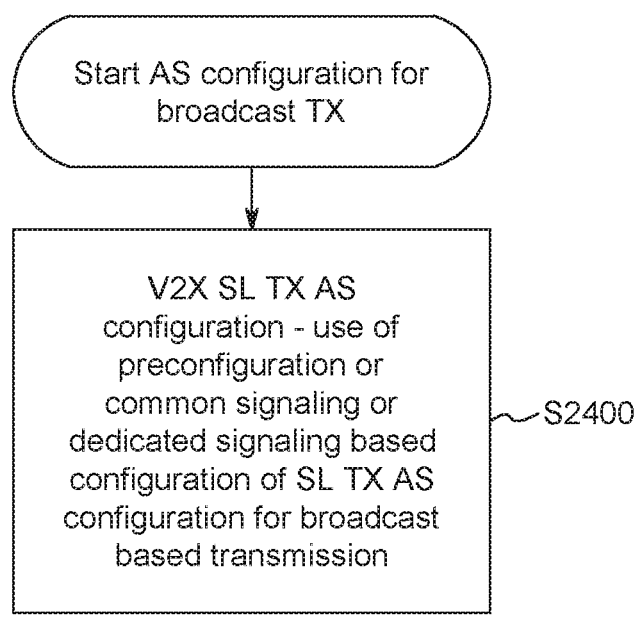
FIG. 24 shows a transmission side broadcast transmission configuration in accordance with an exemplary embodiment.
Figure 25:
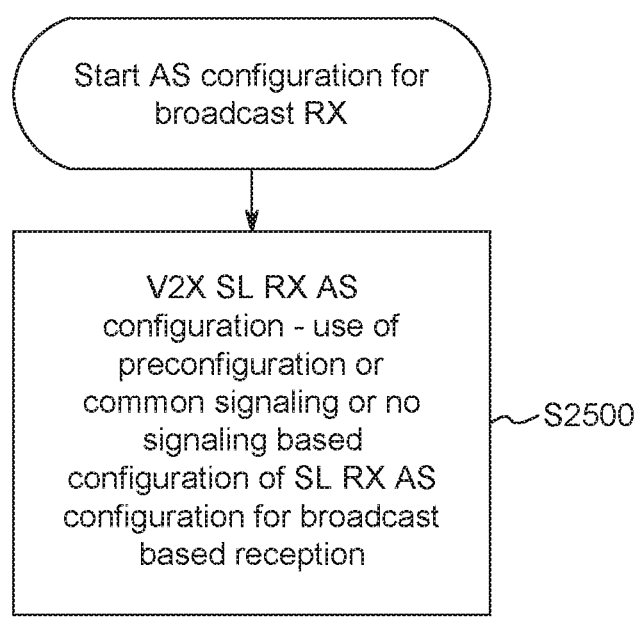
FIG. 25 shows a reception side broadcast transmission configuration in accordance with an exemplary embodiment.

A high-level Illustration of AS configuration for broadcast V2X communication is provided in FIG. 24 for the transmitter side and FIG. 25 for the receiver side. In the AS broadcast V2X communication scenario, the T-UE, i.e., the UE that is the receiving UE of the configuration request, is not provided with a dedicated configuration based on, e.g., the UE capability. Instead, the AS protocol stack is configured based on a configuration specified to default parameters, e.g., in the specification or based on configuration preconfigured into the UE (SIM or ME) or provisioned into the UE, e.g., by the V2X control function. It should be noted that although AS is configured with broadcast resources with each MAC PDU carrying a layer-2 source ID and a layer-2 destination ID, making therefore the transmission connectionless from AS protocol stack configuration point of view, the upper layer can still maintain a unicast connection or group cast connection in the V2X upper layer where a layer-2 context is configured, and association between peer V2X upper layer contexts maintained at the V2X upper layer. In step S2400 of FIG. 24, V2X SL TX AS configuration—use of preconfiguration or common signaling or dedicated signaling based configuration of SL TX AS configuration for broadcast based transmission is performed. The signaling for the configuration of upper layer V2X connection and context configuration including association between Peer V2X UEs, e.g., in support of a secure data link can use one or more of the following:
   PC5-S signaling over a user plane in a connectionless manner where each MAC PDU carries a source ID and a destination ID.
   PC5-S signaling over a user plane in an AS connection-oriented manner. This might be the case if there is an AS connection (e.g., unicast) already between the two V2X UEs involved in this sidelink communication
   PC5-S message embedded in an RRC signaling message.

In step S2500 of FIG. 25, V2X SL RX AS configuration—use of preconfiguration or common signaling or no signaling based configuration of SL RX AS configuration for broadcast based reception is performed.

In the following sections, methods for UE handling of multiple simultaneous sidelink RRC connections are described.

PC5 RRC Connection States

Figure 26:
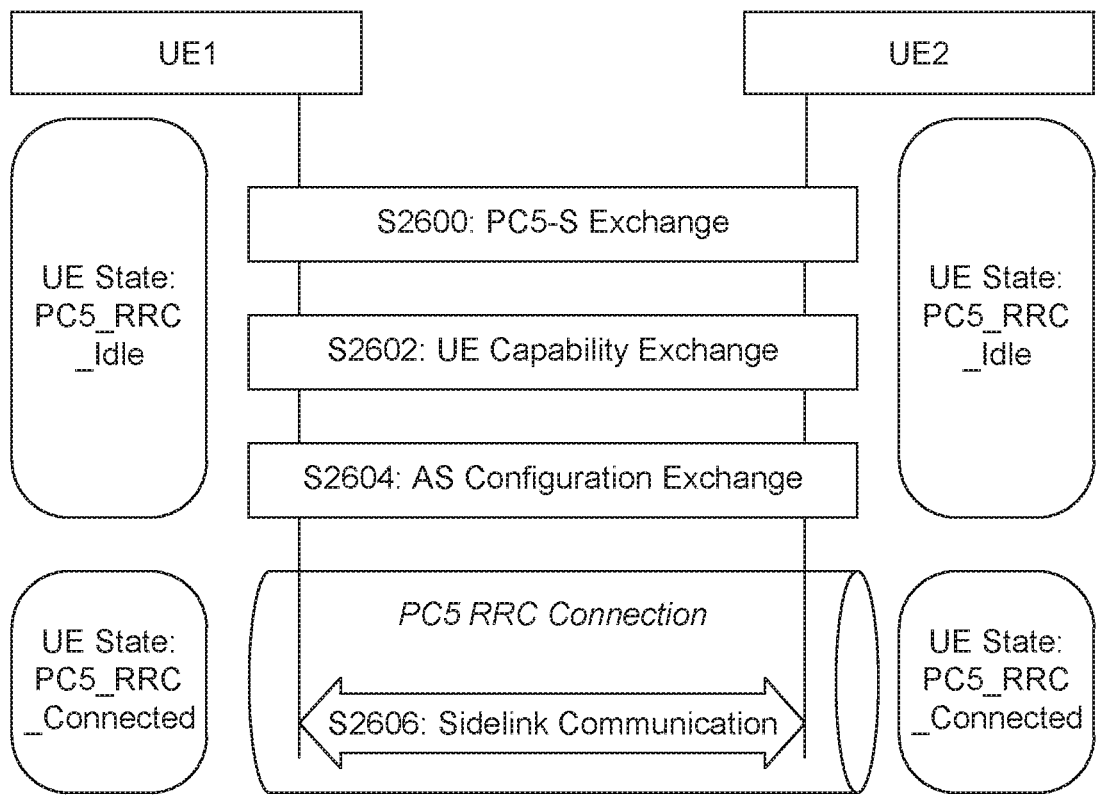
FIG. 26 shows PC5 RRC connection states between two UEs.

Based on the description in the previous sections, the two peer UEs may need to start a PC5 RRC connection prior to communicating over the V2X communication link. The steps to establish this PC5 RRC connection are as described below and shown in FIG. 26:

Step S2600: PC5-S signaling for determining if peers are willing to communicate over the PC5 interface (DIRECT_COMMUNICATION_REQUEST)

Step S2602: UE capability exchange between the 2 peer UEs

Step S2604: Access Stratum (AS) configuration of the peer UEs to allow V2X communication Step S2606: UE to UE communication over PC5

During step S2600 to step S1604, the UE can be in a PC5_RRC_IDLE state. In this state, the UE is monitoring the (pre)configured communication receive pools to determine any possible PC5-S signaling messages from peer UEs. In this state, all communication to and from the UE can be considered to go over a sidelink common control channel (SL_CCCH). Upon reception of a valid DIRECT_COMMUNICATION_REQUEST, the PC5 Signaling layer in the UE will determine if the direct link is allowed, and respond to the peer UE. If allowed, the UE will send a DIRECT_COMMUNICATON_ACCEPT. Subsequently, the RRC layer will initiate a UE capability exchange and Access Stratum configuration exchange with the peer UE. These exchanges can also be over the SL_CCCH. After successful completion of these exchanges, the UEs can be considered to have established a PC5 RRC Connection, and the can transition to PC5_RRC_CONNECTED state. In this state, the UEs:

can transmit control information over sidelink dedicated control channels (S_DCCH) and user data over sidelink dedicated traffic channels (SL_DTCH);

can have sidelink radio bearers setup for communication to and from the peer UEs;

can be required to send reference signals to assist the peer UE for channel quality measurements;

can be required to act as a synchronization reference source and send system information signals; and can monitor the status of the sidelink to evaluate link quality, declare link failure, and take actions in response to the link failure.

In the above, it is assumed that the PC5 RRC Connection is immediately established after the AS configuration exchange. Alternatively, the PC5 RRC connection can be established after a subsequent signaling exchange between UE1 and UE2, using a form of PC5RRCConnectionSetup message.

A PC5 RRC Connection between two peer UEs can have one UE behave as the master of the connection and one UE behave as the slave of the connection. Only the master of the connection can modify or delete the PC5 RRC connection. For example, if UE1 starts a PC5 RRC connection with UE2, UE can be the master of the PC5 RRC connection and UE2 can be the slave. Alternatively, after the capability exchange shown in step S2602, UE1 can determine that UE2 should be the master of the PC5 RRC Connection, and it can request that UE2 behave as the master (for example in the AS configuration step or optionally in the dedicated PC5RRCConnecctionSetup step). UE1 can base its decision on a number of factors, including one or more of the following:

current load: for example, if it has to many active RRC connections it can ask UE2 to act as the master;

connectivity to cellular network/quality of Uu link: If UE1 is out of coverage, it can ask UE2 to act as the master;

power status: If UE2 has more available power or is powered by mains (e.g. plugged into an outlet), UE1 can ask UE2 to act as the master;

capability: UE1 can not possess the capability to act as master and can ask UE2 to act as the master.

Multiple PC5 RRC Connections for a UE

Figure 27:
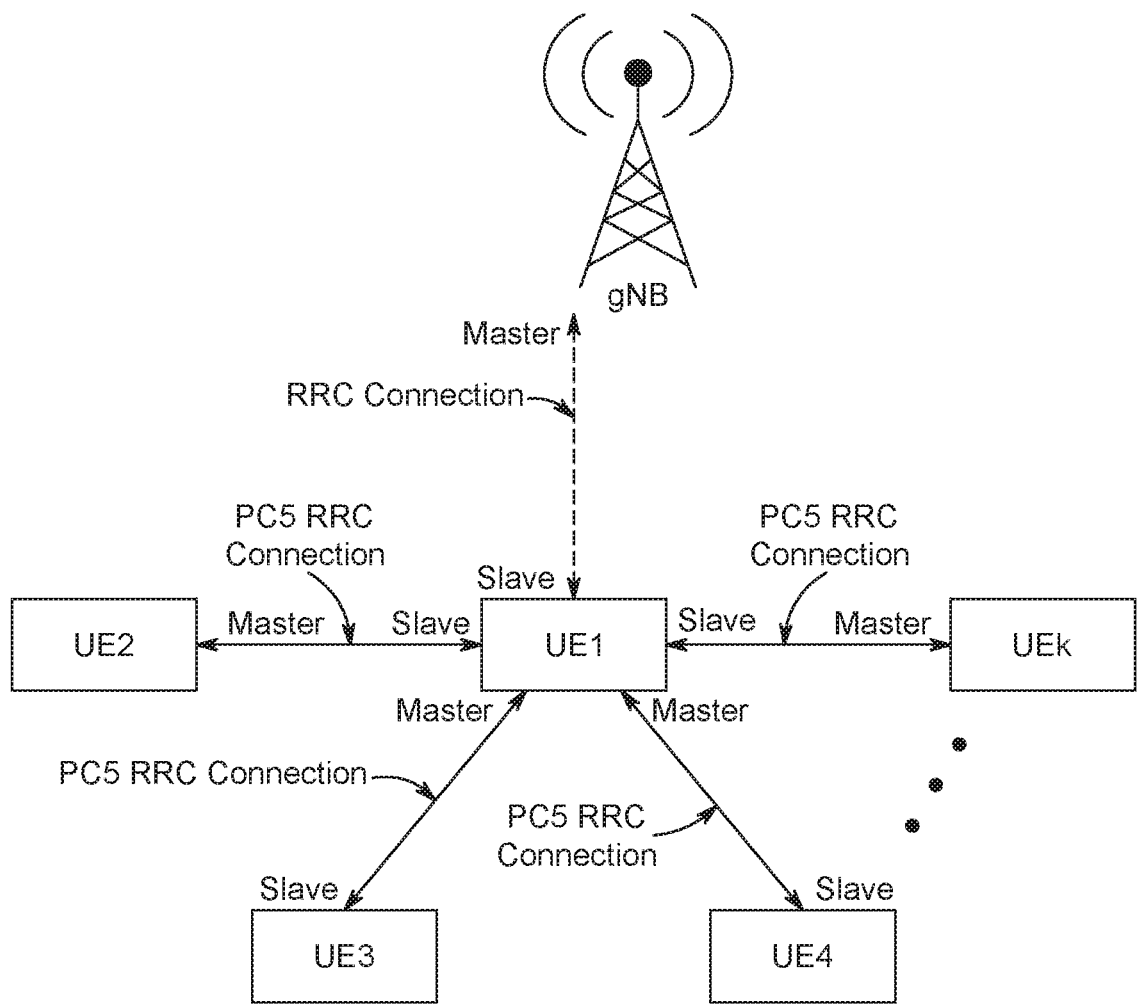
FIG. 27 shows a UE with multiple RRC connections with a gNB and multiple UEs.

A typical UE will have one or more RRC connections (See FIG. 27). One of these connections can be to a gNB and one or more of these connections can be to peer UEs. These latter connections are PC5 RRC Connections. For each of the PC5 RRC connections, the UE can be the master of the connection or the slave. For example, FIG. 27 shows 4 PC5 RRC connections:

1. PC5 RRC Connection 1: UE1←→UE2
   a. UE2 is master, UE 1 is slave of connection
2. PC5 RRC Connection 2: UE1←→UE3
   a. UE1 is master, UE3 is slave of connection
3. PC5 RRC Connection 3: UE1←→UE4
   a. UE1 is master, UE4 is slave of connection
4. PC5 RRC Connection 4: UE 1←→UEk
   a. UEk is master, UE1 is slave of connection When a UE has multiple simultaneous RRC connections (as shown in FIG. 27 for UE1), the UE can need to have a process which manages the links/relations between these connections.

Keeping UE1 in Connected Mode

This process can monitor the number of simultaneous PC5 RRC connections, If this number is greater than a configurable threshold (K), UE1 should keep the RRC Connection to the gNB in RRC_CONNECTED mode. This will allow UE1 to send buffer status request (BSR) reports to the gNB without needing to first send a Scheduling Request. This can expedite the resource allocation for the sidelink transmissions on the PC5. If UE1 is in RRC_IDLE mode (with respect to the gNB), and the number of PC5 RRC connections exceeds this threshold, the UE can initiate an RRC Connection with the gNB with an establishment cause set to indicate to the gNB that UE1 is requesting the connection to be able to send BSR for sidelink transmissions. For example, the establishment cause can be "sidelinkResourceAllocation".

Release all RRC Connections

This process can receive a request from the gNB to stop all sidelink communications. A UE in RRC_IDLE mode (with respect to the gNB) can still transmit on the sidelink using autonomous resource selection. In some cases, the gNB can need to stop all sidelink transmissions to limit interference to neighbour cells and/or reduce the load on the cell. In such cases, it can be useful to provide the gNB with a mechanism to tell the UEs to go to RRC_IDLE and stop all sidelink transmissions. For example, the gNB can move UE1 to RRC_IDLE by releasing the RRC Connection. This message can also include an indication to release one or more or all of the PC5 RRC connections. Upon reception of the message from the gNB, UE1 will release all PC5 RRC connections for which it is a master. Based on FIG. 27, this would be for PC5 RRC Connection 2 and PC5 RRC Connection 3. At the same time, UE1 can send a PC5RRCConnectionReleaseIndication message to UE2 and UEk, to have these UEs release their PC5 RRC connections to UE1. The PC5RRCConnectionReleaseIndication can contain a reason for the release (e.g 'gNBRelease').

Manage Priority of PC5 RRC Connections

Each PC5 RRC connection can be assigned a priority upon being setup. The process in UE1 can monitor the priority of all PC5 RRC connections and can decide to pause or release one or more of these PC5 RRC connections based on a number of factors, such as available power, load, proximity to a peer UE, etc. Using FIG. 27 as an example, PC5 RRC Connection 3 can be of the highest priority. If necessary, UE can pause or release PC5 RRC connections 1, 2, and 4. UE1 will release all PC5 RRC connections for which it is a master. Based on FIG. 27, this would be for PC5 RRC Connection 2. At the same time, UE1 can send a PC5RRCConnectionReleaseIndication message to UE2 and UEk, to have these UEs release their PC5 RRC connections to UE1. The PC5RRCConnectionReleaseIndication can contain a reason for the release (e.g 'priority Release').

Granularity of PC5 Unicast Link, Unicast Link Update and Unicast Link Addition Procedures In LTE D2D, the direct link setup procedure is used to establish a secure direct link between two ProSe-enabled UEs. No AS configuration is exchanged between the initiating UE and the target UE. As discussed in this document, in NR V2X, unicast link establishment require AS (Access Stratum) configuration exchanges between the initiating UE and the target UE. One example of such configuration is bearers related configuration. Such bearer configuration in the AS level requires configuration in the V2X layer of the corresponding QoS Flows associated with the V2X services to be supported over the unicast link. QoS Flows (identified by QoS Flow Identifiers—QFI) i.e. the finest granularity QoS level available include QoS characteristics identified by PQI and QoS rules with packet filter sets, that maps to the AS bearers configuration, associated with V2X services to be supported over the PC5 unicast link. A V2X application running on the UE can support one or more services where data traffic associated with each service can be mapped to one or more QoS Flows. Several V2X applications can run concurrently on the UE, which in each application can generate data in support of different services, wherein data from each service can mapped to one or more QoS flows.

Based on the above, it is proposed that for NR V2X, the direct PC5-S link setup procedure, in addition to configuring QoS flows in V2X layer in support of the services data to be carried over the PC5 link, also configure a secure link between the two V2X peer UEs. It is therefore proposed that the PC5 direct unicast link setup procedure be used for both the establishment of a secure link security context between the peer V2X UEs as well as the configuration of QoS Flows in support of the service(s) data transported over the unicast links.

Unicast Link Modelling

Model 1

Figure 28:
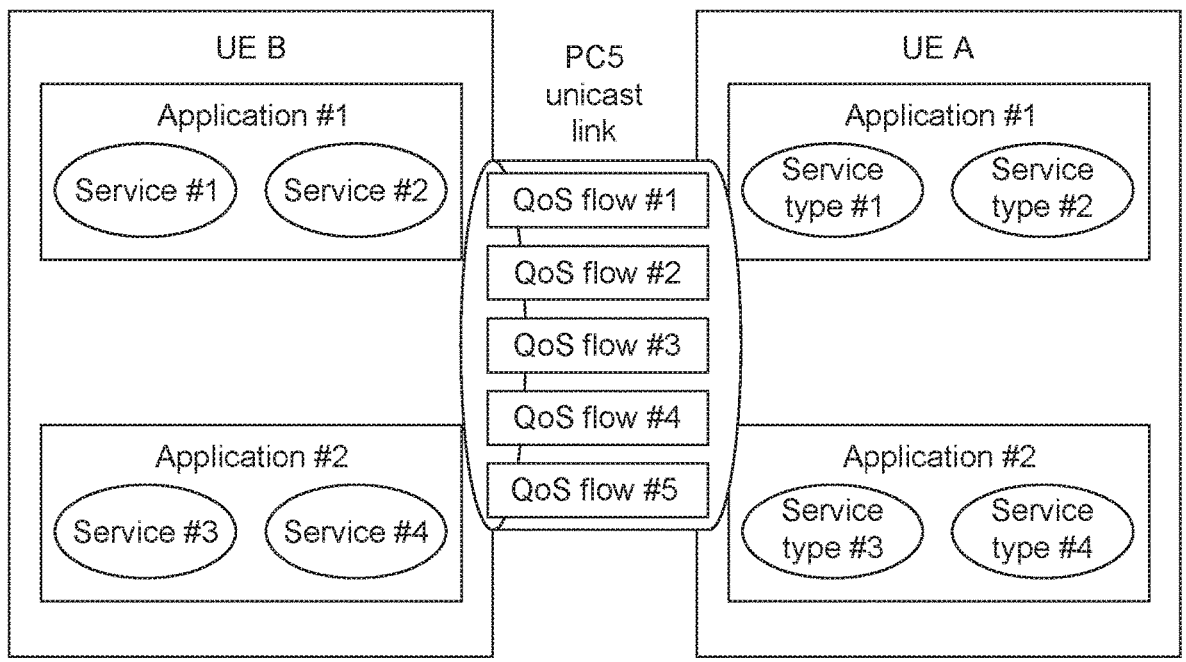
FIG. 28 shows a first exemplary PC5 Unicast link model.

There is only one unicast link between two peer V2X UEs as shown in FIG. 28. The PC5 unicast link establishment procedure creates a secure link between the two peer V2X UEs and also configures the QoS Flows for one or more services, wherein the services mapped to one or more applications. Establishment of security context during the unicast link establishment procedure is mandatory. In this model, it is proposed that subsequent QoS Flow addition be realized by PC5 unicast link update procedure. This procedure essentially configures additional QoS Flows, after the establishment of the unicast link, and that mapped to data of one or more services to be transported over the PC5 unicast link. Security contexts may not be updated as part of the unicast link update procedure, and therefore security parameters might not be exchanged between the V2X peer UEs during the unicast link update procedure.

Model 2

Figure 29:
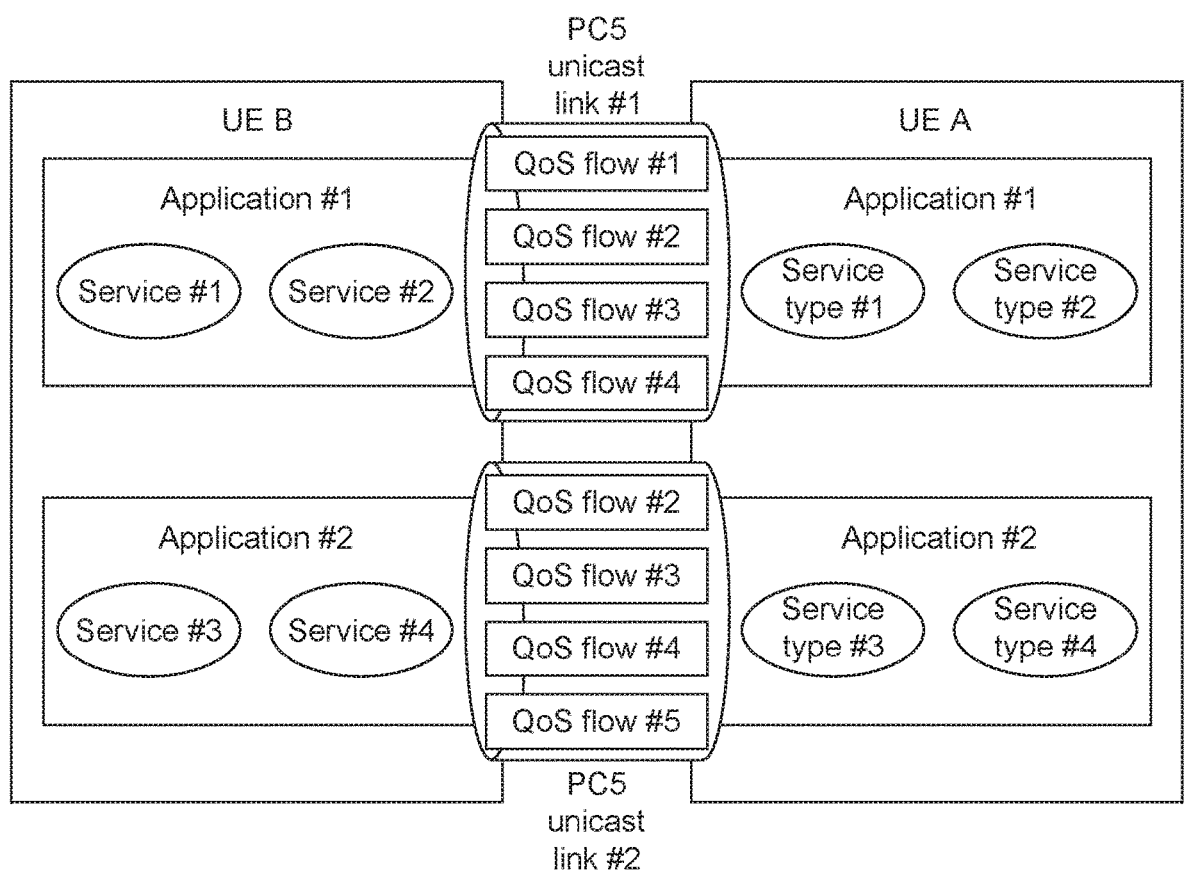
FIG. 29 shows a secondary exemplary PC5 Unicast link model.

In this model, there can be more than one PC5 unicast link between two peer UEs, wherein there is one unicast cast link between two peer applications for each pair of two peer UEs as shown in FIG. 29.

In this embodiment, the PC5 unicast link establishment procedures creates a secure link between the two peer V2X UEs and also configures the QoS Flows for one or more services, wherein the services are mapped to one application. In alternative embodiment, more than one unicast link can be concurrently created during the same unicast link establishment procedure, wherein the PC5 unicast link establishment procedures creates a secure link between the two peer V2X UEs and also configures the QoS Flows for one or more services, wherein the services are mapped to more than one application. In this model, it is proposed that subsequent QoS Flow addition be realized by PC5 unicast link update procedure. This procedure essentially configures additional QoS Flows, after the establishment of the unicast link, which map to data of one or more services to be transported over the PC5 unicast link. The one or more services added over the PC5 unicast link can belong to existing applications which have unicast link(s) established during unicast link establishment procedure. In this model, it is also proposed to introduce a new unicast link management procedure, that is PC5 unicast link addition procedure. This procedure adds additional link between two peer V2X applications and configures one or more QoS flows in support of one or more services of the V2X application for which a new unicast link is being added. More than one unicast link can concurrently be added with this procedure. Security contexts may not be updated as part of the unicast link update procedure, and therefore security parameters might not be exchanged between the V2X peer UEs during the unicast link update procedure.

Model 3

Figure 30:
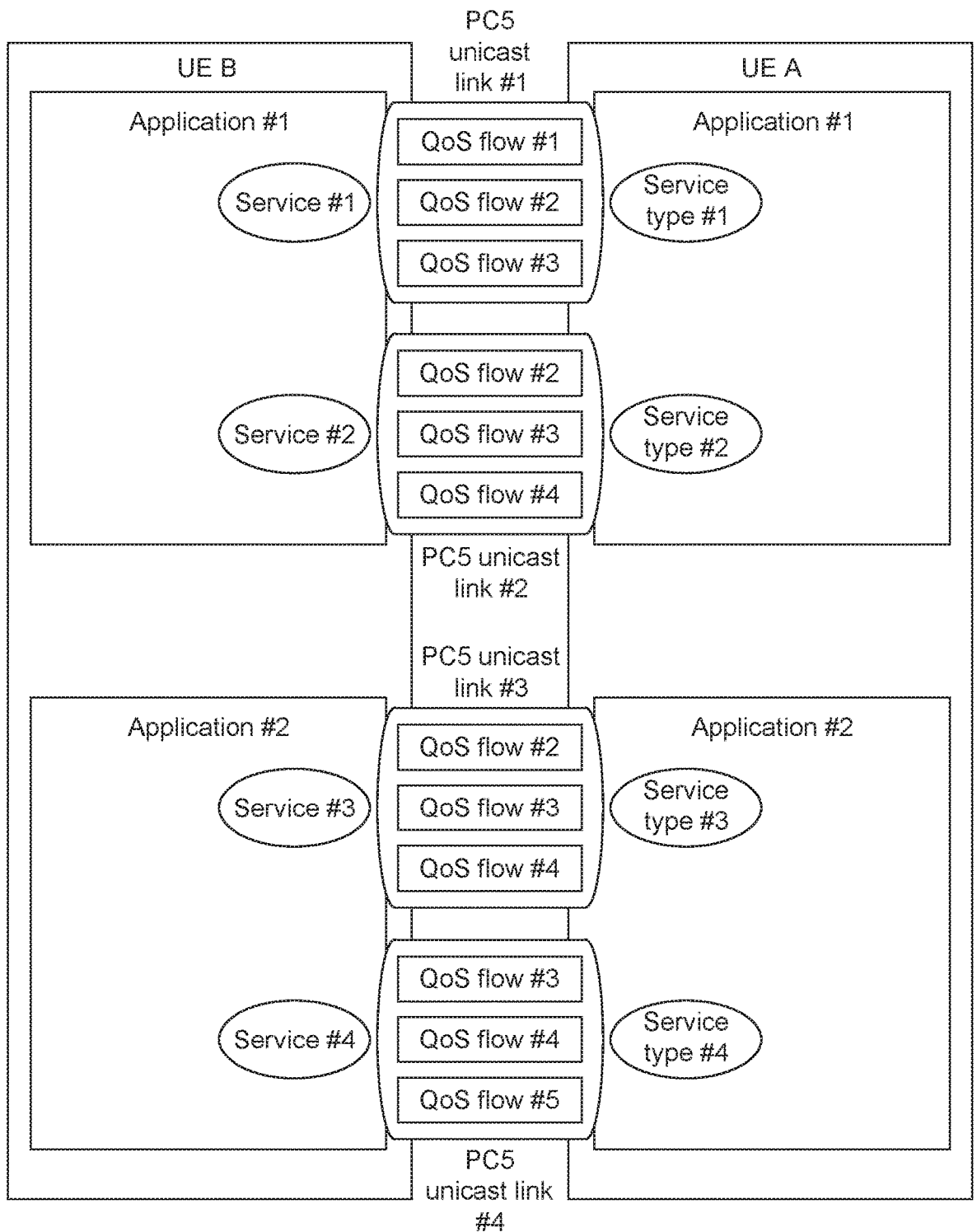
FIG. 30 shows a third exemplary PC5 Unicast link model.

In this model, there can be more than one PC5 unicast link between two peer UEs, wherein there is one unicast cast link per service for each two peer UEs as shown in FIG. 30.

In this embodiment, the PC5 unicast link establishment procedures creates a secure link between the two peer V2X UEs and also configures the QoS Flows for one service. In alternative embodiment, more than one unicast link can be concurrently created during the same unicast link establishment procedure, wherein the PC5 unicast link establishment procedures creates a secure link between the two peer V2X UEs and also configures the QoS Flows for one or more V2X services, wherein the services mapped to one or more application. In this model, it is proposed that subsequent QoS Flow addition be realized by PC5 unicast link update procedure. This procedure essentially configures additional QoS Flows, after the establishment of the unicast link, which map to data of one or more of the existing services to being transported over the PC5 unicast link. The one or more services added over the PC5 unicast link can belong to existing applications which have unicast link(s) established during unicast link establishment procedure. In this model, it is also proposed to introduce a new unicast link management procedure, that is a PC5 unicast link addition procedure. This procedure adds additional link between two peer UEs for a new service, and configures one or more QoS flows in support of the V2X service for which a new unicast link is being added. More than one unicast link can concurrently be added with this procedure. Security contexts may not be updated as part of the unicast link update procedure, and therefore security parameters might not be exchanged between the V2X peer UEs during the unicast link update procedure.

An exemplary embodiment of the present disclosure provides a first apparatus (a UE, e.g., a mobile device 102a, a computer, a vehicle (e.g., a car 102b, motorcycle, boat, etc.), etc.) including: a processor (e.g., processor 118); a memory (e.g., non-removeable memory 130, removeable memory 132, etc.); and communication circuitry (which includes, e.g., transceiver 120). The first apparatus is connected to a communications network (e.g., RAN 103/104/105/103b/104b/105b) via the communication circuitry. The first apparatus further includes computer-executable instructions stored in the memory which, when executed by the processor, causes the first apparatus to: discover a second apparatus (a second UE, e.g., a mobile device 102a, a computer, a vehicle (e.g., a car 102b, motorcycle, boat, etc.), etc.) that the first apparatus can communicate with; obtain device information related to the second apparatus; and configure a radio protocol (e.g., a PC5 signaling protocol) of the first apparatus for direct sidelink communication with the second apparatus.

In an exemplary embodiment, the first apparatus can initiate the obtainment of the device information related to the second apparatus by sending, to the second apparatus, a request for the device information related to the second apparatus (see, e.g., FIG. 16A, SL RRC signaling-target device info request).

In an exemplary embodiment, the first apparatus can receive a response to the request for the device information related to the second apparatus. The response (see, e.g., FIG. 16A, SL RRC signaling-target device info response) includes the device information related to the second apparatus.

In an exemplary embodiment, the device information related to the second apparatus includes one or more of: device capability, QoS configuration parameters of V2X communication, and sidelink measurements. The device capability can be, for example, related to one or more of the following: V2X Upper layer capability (e.g., security capability), SDAP capability, PDCP capability, RLC capability, MAC capability, baseband capability, RF including RF band and subband capability, etc. The sidelink measurements can be, for example, RSRP, RSRQ, RSSI, CBR, CR, etc.

In an exemplary embodiment, the first apparatus can determine radio protocol configuration parameters of the first apparatus, and determine radio protocol configuration parameters of the second apparatus. Alternatively, the first apparatus can request from a third apparatus (e.g., a scheduling entity), the radio protocol configuration parameters of the first apparatus and the radio protocol configuration parameters of the second apparatus, and receive the radio protocol configuration parameters of the first apparatus and the radio protocol configuration parameters of the second apparatus.

In an exemplary embodiment, the determination of the radio protocol configuration parameters of the second apparatus takes into account the device information related to the second apparatus. In an exemplary embodiment, the determination of the radio protocol configuration parameters of the second apparatus takes into account the device information related to the second apparatus and device information related to the first apparatus.

In an exemplary embodiment, the first apparatus can send radio protocol configuration parameters of the second apparatus to the second apparatus or the second apparatus receives the radio protocol configuration parameters of the second apparatus from the third apparatus. In an exemplary embodiment, the radio configuration parameters of the second apparatus that are sent to the second apparatus are used by the second apparatus to configure its radio protocol.

In an exemplary embodiment, the first apparatus can send, to the second apparatus, device information related to the first apparatus. In an exemplary embodiment, the device information related to the first apparatus includes one or more of: device capability, QoS configuration parameters of V2X communication, and sidelink measurements.

In an exemplary embodiment, a PC5 interface (see, e.g., FIG. 10) allows communication between the first apparatus and the second apparatus, and PC5 RRC signaling or PC5-S signaling is used over the PC5 interface. In an exemplary embodiment, a PC5 interface allows communication between the first apparatus and the third apparatus or a PC5 interface allows communication between the second apparatus and the third apparatus. In an exemplary embodiment, PC5 RRC signaling or PC5-S signaling can be used over the PC5 interface.

In an exemplary embodiment, the radio protocol includes, for example, an SDAP layer, a PDCP layer, an RLC layer, a MAC layer, and a PHY layer. See, e.g., FIGS. 2 and 6.

In an exemplary embodiment, the first apparatus or the second apparatus is a vehicle. The first apparatus and the second apparatus can both be vehicles. One of the first apparatus and the second apparatus can be a mobile device, and the other can be a vehicle.

In an exemplary embodiment, the first apparatus can transmit, by a transceiver (e.g., transceiver 120), data from the first apparatus to a second apparatus.

In an exemplary embodiment, the third apparatus is a road side unit (e.g., RSU 120b), a base station (e.g., base station 114a, 114b), a relay node, a vehicle (e.g., vehicle 102b), or an integrated access and backhaul unit.

In an exemplary embodiment, the second apparatus includes a processor (e.g., processor 118), a memory (e.g., non-removeable memory 130, removable memory 132) and communication circuitry (including, for example, transceiver 120). The second apparatus is connected to the communications network via the communication circuitry. The second apparatus includes computer-executable instructions stored in the memory which, when executed by the processor, causes the second apparatus to: 1) determine radio protocol configuration parameters of the first apparatus, and determine radio protocol configuration parameters of the second apparatus; or 2) request from a third apparatus, the radio protocol configuration parameters of the first apparatus and the radio protocol configuration parameters of the second apparatus, and receive the radio protocol configuration parameters of the first apparatus and the radio protocol configuration parameters of the second apparatus. In an exemplary embodiment, the determination of the radio protocol configuration parameters of the first apparatus takes into account the device information related to the first apparatus or the determination of the radio protocol configuration parameters of the first apparatus takes into account the device information related to the second apparatus and device information related to the first apparatus. In an exemplary embodiment, the second apparatus can send radio protocol configuration parameters of the first apparatus to the first apparatus or the first apparatus receives the radio protocol configuration parameters of the first apparatus from the third apparatus. In an exemplary embodiment, the radio configuration parameters of the first apparatus that are sent to the first apparatus are used by the first apparatus to configure its radio protocol.

In an exemplary embodiment, the first apparatus can send, to the second apparatus, device information related to the first apparatus. The device information related to the first apparatus includes one or more of: device capability, QoS configuration parameters of V2X communication, and sidelink measurements. The second apparatus includes a processor, a memory, and communication circuitry. The second apparatus is connected to the communications network via the communication circuitry. The second apparatus includes computer-executable instructions stored in the memory which, when executed by the processor, causes the second apparatus to: determine radio protocol configuration parameters of the first apparatus, and determine radio protocol configuration parameters of the second apparatus. Alternatively, the second apparatus can request from a third apparatus, the radio protocol configuration parameters of the first apparatus and the radio protocol configuration parameters of the second apparatus, and receive the radio protocol configuration parameters of the first apparatus and the radio protocol configuration parameters of the second apparatus.

An exemplary embodiment of the present disclosure provides a method for direct sidelink communication using a first apparatus that includes a processor, a memory, communication circuitry, and the first apparatus is connected to a communications network via the communication circuitry. The method includes: discovering a second apparatus that the first apparatus can communicate with; obtaining device information related to the second apparatus; and configuring a radio protocol of the first apparatus for direct sidelink communication with the second apparatus.

An exemplary embodiment of the present disclosure provides a non-transitory computer readable storage medium having computer-readable instructions tangibly recorded thereon which, when executed by processing circuitry, cause the processing circuitry to perform a method for direct sideling communication using a first apparatus. The method including: discovering a second apparatus that the first apparatus can communicate with; obtaining device information related to the second apparatus; and configuring a radio protocol of the first apparatus for direct sidelink communication with the second apparatus.

In an exemplary embodiment, the PC5 interface is a unicast link between the first apparatus and the second apparatus which allows communication between one or more pairs of peer services in the first apparatus and the second apparatus.

In an exemplary embodiment, all services using the same PC5 unicast link use the same application.

In an exemplary embodiment, one PC5 unicast link supports one or more service types if the one or more service types are at least associated with a pair of peer applications for this one PC5 unicast link.

It will be understood that any of the methods and processes described herein can be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above can be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or can be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features can sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B and C can be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus. The scope of the invention is indicated by the appended claims rather than the foregoing description and all changes that come within the meaning and range and equivalence thereof are intended to be embraced therein.

What is claimed is:

1. A first wireless transmit/receive unit (WTRU) comprising:
   a processor and a memory, wherein the processor and the memory are configured to:
   discover a second WTRU that the first WTRU can communicate with, the first WTRU configured to conduct vehicle-to-everything (V2X) communication via a PC5 interface that allows communication between the first WTRU and the second WTRU;
   obtain device information related to the second WTRU; and
   configure a radio protocol of the first WTRU for direct sidelink V2X communication with the second WTRU over the PC5 interface using PC5 radio resource control (RRC) signaling, wherein the PC5 interface comprises one or more unicast links between the first WTRU and the second WTRU that allows for communication between one or more pairs of peer services of the first WTRU and the second WTRU, wherein each of the one or more unicast links supports one or more service types and the one or more service types are at least associated with a pair of peer applications for the unicast link.

2. The first WTRU of claim 1, wherein the processor and the memory are further configured to: send, to the second WTRU, a request for the device information related to the second WTRU.

3. The first WTRU of claim 2, wherein the processor and the memory are further configured to:
   receive a response to the request for the device information related to the second WTRU, wherein the response comprises the device information related to the second WTRU.

4. The first WTRU of claim 3, wherein the device information related to the second WTRU comprises one or more of: a device capability, a quality of service (QoS) configuration parameter of V2X communication, and a sidelink measurement.

5. The first WTRU of claim 1, wherein the processor and the memory are further configured to:
   determine radio protocol configuration parameters of the first WTRU, and determine radio protocol configuration parameters of the second WTRU, wherein the determination of the radio protocol configuration parameters of the second WTRU comprises at least one of the device information related to the second WTRU or the device information related to the WTRU and the device information related to the first WTRU.

6. The first WTRU of claim 5, wherein the processor and the memory are further configured to:
   request from a third WTRU, the radio protocol configuration parameters of the first WTRU and the radio protocol configuration parameters of the WTRU; and
   receive, from the third WTRU, the radio protocol configuration parameters of the first WTRU and the radio protocol configuration parameters of the WTRU.

7. The first WTRU of claim 5, wherein the processor and the memory are further configured to:
   send information indicating the determined radio protocol configuration parameters of the WTRU to the WTRU.

8. The first WTRU of claim 7, wherein the information indicating the determined radio protocol configuration parameters of the WTRU cause the WTRU to configure a radio protocol associated with the WTRU.

9. The first WTRU of claim 1, wherein the processor and the memory are further configured to:
   send, to the WTRU, device information related to the first WTRU.

10. The first WTRU of claim 9, wherein the device information related to the first WTRU includes comprises one or more of: a device capability, a quality of service (QoS) configuration parameter of V2X communication, and a sidelink measurement.

11. The first WTRU of claim 5, wherein a PC5 interface allows communication between the first WTRU and the third WTRU or a PC5 interface allows communication between the WTRU and the WTRU apparatus, and
   wherein PC5 RRC signaling or PC5-S signaling is used over the PC5 interface.

12. The first WTRU of claim 1, wherein the radio protocol comprises a service data adaptation protocol (SDAP) layer, a packet data convergence protocol (PDCP) layer, a radio link control (RLC) layer, a medium access control (MAC) layer, and a physical (PHY) layer.

13. The first WTRU of claim 1, wherein the first WTRU or the WTRU is a vehicle.

14. The first WTRU of claim 1, wherein the processor and the memory are further configured to:
   transmit, by a transceiver, data from the first WTRU to the WTRU.

15. The first WTRU of claim 6, wherein the third WTRU is a road side unit, a base station, a relay node, a vehicle, or an integrated access and backhaul unit.

16. A method implemented by a first wireless transmit/receive unit (WTRU), the method comprising:
   discovering a WTRU that the first WTRU can communicate with, the first WTRU configured to conduct vehicle-to-everything (V2X) communication via a PC5 interface that allows communication between the first WTRU and the WTRU;
   obtaining device information related to the WTRU; and
   configuring a radio protocol of the first WTRU for direct sidelink V2X communication with the WTRU over the PC5 interface using PC5 radio resource control (RRC) signaling, wherein the PC5 interface comprises one or more unicast links between the first WTRU and the WTRU that allows for communication between one or more pairs of peer services of the first WTRU and the WTRU, wherein each of the one or more unicast links supports one or more service types and the one or more service types are at least associated with a pair of peer applications for the unicast link.

17. The method of claim 16, further comprising:
   sending, to the WTRU, a request for the device information related to the WTRU.

18. The method of claim 17, further comprising:
   receiving a response to the request for the device information related to the WTRU, wherein the response includes the device information related to the WTRU.

19. The method of claim 18, wherein the device information related to the WTRU comprises one or more of: a device capability, a quality of service (QoS) configuration parameter of V2X communication, and a sidelink measurement.

20. A non-transitory computer readable storage medium having computer-readable instructions tangibly recorded thereon which, when executed by processing circuitry, cause the processing circuitry to perform a method for direct sidelink communication using a first wireless transmit/receive unit (WTRU), the method comprising:

discovering a WTRU that the first WTRU can communicate with, the first WTRU configured to conduct vehicle-to-everything (V2X) communication via a PC5 interface that allows communication between the first WTRU and the WTRU;

obtaining device information related to the WTRU; and configuring a radio protocol of the first WTRU for direct sidelink V2X communication with the WTRU over the PC5 interface using PC5 radio resource control (RRC) signaling, wherein the PC5 interface comprises one or more unicast links between the first WTRU and the WTRU that allows for communication between one or more pairs of peer services of the first WTRU and the WTRU, wherein each of the one or more unicast links supports one or more service types and the one or more service types are at least associated with a pair of peer applications for the unicast link.

* * * * *

UNITED STATES PATENT AND TRADEMARK OFFICE
CERTIFICATE OF CORRECTION

| | | |
|---|---|---|
| PATENT NO. | : 12,137,490 B2 | Page 1 of 2 |
| APPLICATION NO. | : 17/429837 | |
| DATED | : November 5, 2024 | |
| INVENTOR(S) | : Pascal Adjakple et al. | |

It is certified that error appears in the above-identified patent and that said Letters Patent is hereby corrected as shown below:

In the Claims

In Claim 6: Column 67, Line 56, delete "protocol configuration parameters of the WTRU; and" and insert -- protocol configuration parameters of the second WTRU; and --.

In Claim 6: Column 67, Line 59, delete "protocol configuration parameters of the WTRU." and insert -- protocol configuration parameters of the second WTRU. --.

In Claim 7: Column 67, Line 63, delete "configuration parameters of the WTRU to the WTRU." and insert -- configuration parameters of the second WTRU to the second WTRU. --.

In Claim 8: Column 67, Line 66-67, delete "parameters of the WTRU cause the WTRU to configure a radio protocol associated with the WTRU." and insert -- parameters of the second WTRU cause the second WTRU to configure a radio protocol associated with the second WTRU. --.

In Claim 9: Column 68, Line 3-4, delete "send, to the WTRU, device information related to the first WTRU." and insert -- send, to the second WTRU, device information related to the first WTRU. --.

In Claim 10: Column 68, Line 6, delete "information related to the first WTRU includes comprises" and insert -- information related to the first WTRU comprises --.

In Claim 11: Column 68, Line 14, delete "between the WTRU and the WTRU apparatus, and" and insert -- between the second WTRU and the WTRU apparatus --.

In Claim 13: Column 68, Line 23, delete "or the WTRU is a vehicle." and insert -- or the second WTRU is a vehicle. --.

In Claim 14: Column 68, Line 26-27, delete "transmit, by a transceiver, data from the first WTRU to the WTRU." and insert -- transmit, by a transceiver, data from the first WTRU to the second WTRU. --.

Signed and Sealed this
Twenty-second Day of April, 2025

Coke Morgan Stewart
*Acting Director of the United States Patent and Trademark Office*

CERTIFICATE OF CORRECTION (continued)
U.S. Pat. No. 12,137,490 B2

In Claim 16: Column 68, Line 33, delete "discovering a WTRU that the first WTRU can" and insert -- discovering a second WTRU that the first WTRU can --.

In Claim 16: Column 68, Line 37, delete "WTRU and the WTRU;" and insert -- WTRU and the second WTRU; --.

In Claim 16: Column 68, Line 38, delete "obtaining device information related to the WTRU; and" and insert -- obtaining device information related to the second WTRU; and --.

In Claim 16: Column 68, Line 40, delete "sidelink V2X communication with the WTRU over the" and insert -- sidelink V2X communication with the second WTRU over the --.

In Claim 16: Column 68, Line 44, delete "WTRU that allows for communication between one or" and insert -- second WTRU that allows for communication between one or --.

In Claim 16: Column 68, Line 46, delete "WTRU, wherein each of the one or more unicast links" and insert -- second WTRU, wherein each of the one or more unicast links --.

In Claim 17: Column 68, Line 51-52, delete "sending, to the WTRU, a request for the device information related to the WTRU." and insert -- sending, to the second WTRU, a request for the device information related to the second WTRU. --.

In Claim 18: Column 68, Line 55-56, delete "related to the WTRU, wherein the response includes the device information related to the WTRU." and insert -- related to the second WTRU, wherein the response includes the device information related to the second WTRU. --.

In Claim 19: Column 68, Line 58, delete "related to the WTRU comprises one or more of: a" and insert -- related to the second WTRU comprises one or more of: a --.

In Claim 20: Column 69, Line 1, delete "discovering a WTRU that the first WTRU can" and insert -- discovering a second WTRU that the first WTRU can --.

In Claim 20: Column 69, Line 5-6, delete "WTRU and the WTRU; obtaining device information related to the WTRU; and" and insert -- WTRU and the second WTRU; obtaining device information related to the second WTRU; and --.

In Claim 20: Column 69, Line 8, delete "sidelink V2X communication with the WTRU over the" and insert -- sidelink V2X communication with the second WTRU over the --.

In Claim 20: Column 69, Line 12, delete "WTRU that allows for communication between one or" and insert -- second WTRU that allows for communication between one or --.

In Claim 20: Column 69, Line 14, delete "WTRU, wherein each of the one or more unicast links" and insert -- second WTRU, wherein each of the one or more unicast links --.